US009022889B2

(12) United States Patent
Miller

(10) Patent No.: US 9,022,889 B2
(45) Date of Patent: May 5, 2015

(54) ELECTROMOTIVE DRIVES

(71) Applicant: Fallbrook Intellectual Property Company LLC, Cedar Park, TX (US)

(72) Inventor: Donald C Miller, Encinitas, CA (US)

(73) Assignee: Fallbrook Intellectual Property Company LLC, Cedar Park, TX (US)

( * ) Notice: Subject to any disclaimer, the term of this patent is extended or adjusted under 35 U.S.C. 154(b) by 0 days.

(21) Appl. No.: 14/047,819

(22) Filed: Oct. 7, 2013

(65) Prior Publication Data

US 2014/0038771 A1 Feb. 6, 2014

Related U.S. Application Data

(63) Continuation of application No. 13/718,572, filed on Dec. 18, 2012, now Pat. No. 8,550,949, which is a continuation of application No. 13/287,790, filed on Nov. 2, 2011, now Pat. No. 8,342,999, which is a (Continued)

(51) Int. Cl.

| | |
|---|---|
| ***F16H 48/06*** | (2006.01) |
| ***F16H 15/40*** | (2006.01) |
| ***B60K 6/36*** | (2007.10) |

(Continued)

(52) U.S. Cl.

CPC . *F16H 15/40* (2013.01); *B60K 6/26* (2013.01); *B60K 6/36* (2013.01); *B60K 6/405* (2013.01); *B60K 6/48* (2013.01); *B60K 6/543* (2013.01); *F16H 15/28* (2013.01); *F16H 15/52* (2013.01); *H02K 7/116* (2013.01); *Y02T 10/6221* (2013.01); *H02K 7/10* (2013.01); *B62M 6/65* (2013.01)

(58) Field of Classification Search

None

See application file for complete search history.

(56) References Cited

U.S. PATENT DOCUMENTS

| | | | |
|---|---|---|---|
| 719,595 | A | 2/1903 | Huss |
| 971,148 | A | 9/1910 | Rhodes |

(Continued)

FOREIGN PATENT DOCUMENTS

| | | |
|---|---|---|
| CH | 118064 | 12/1926 |
| CN | 1054340 | 9/1991 |

(Continued)

OTHER PUBLICATIONS

Office Action dated Mar. 1, 2011 for U.S. Appl. No. 12/039,578.

(Continued)

*Primary Examiner* — Dirk Wright

(74) *Attorney, Agent, or Firm* — Knobbe Martens Olson & Bear LLP

(57) ABSTRACT

A transmission having a plurality of tilting balls and opposing input and output discs provides an infinite number of speed combinations over its transmission ratio range. The transmission provides multiple powerpaths and can be combined with electrical components to provide motor/generator functionality, which reduces the overall size and complexity of the motor and transmission compared to when they are constructed separately. In one embodiment, rotatable components of a continuously variable transmission are coupled separately to an electrical rotor and to an electrical stator so that the rotor and stator rotate simultaneously in opposite directions relative to one another. In other embodiments, an electrical rotor is configured to transfer torque to or from a disc that is in contact with a plurality of speed adjusters, while an electrical stator is configured to transfer torque to a shaft that is operationally coupled to the speed adjusters via an idler.

15 Claims, 31 Drawing Sheets

Related U.S. Application Data continuation of application No. 12/039,578, filed on Feb. 28, 2008, now Pat. No. 8,070,635, which is a continuation of application No. 11/585,677, filed on Oct. 24, 2006, now Pat. No. 7,632,203.

(60) Provisional application No. 60/731,362, filed on Oct. 28, 2005, provisional application No. 60/730,995, filed on Oct. 28, 2005.

(51) Int. Cl.

| | |
|---|---|
| ***B60K 6/405*** | (2007.10) |
| ***B60K 6/48*** | (2007.10) |
| ***B60K 6/543*** | (2007.10) |
| ***F16H 15/28*** | (2006.01) |
| ***F16H 15/52*** | (2006.01) |
| ***H02K 7/116*** | (2006.01) |
| ***H02K 7/10*** | (2006.01) |
| ***B62M 6/65*** | (2010.01) |
| *B60K 6/26* | (2007.10) |

(56) References Cited

U.S. PATENT DOCUMENTS 1,121,210 A 12/1914 Techel
1,175,677 A 3/1916 Barnes
1,207,985 A 12/1916 Null et al.
1,380,006 A 5/1921 Nielson
1,390,971 A 9/1921 Samain
1,558,222 A 10/1925 Beetow
1,610,666 A 12/1926 Farrell
1,629,092 A 5/1927 Arter et al.
1,629,902 A 5/1927 Arter et al.
1,686,446 A 10/1928 Gilman
1,774,254 A 8/1930 Daukus
1,793,571 A 2/1931 Vaughn
1,847,027 A 2/1932 Thomsen et al.
1,850,189 A 3/1932 Weiss
1,858,696 A 5/1932 Weiss
1,865,102 A 6/1932 Hayes
1,978,439 A 10/1934 Sharpe
2,030,203 A 2/1936 Gove et al.
2,060,884 A 11/1936 Madle
2,086,491 A 7/1937 Dodge
2,088,599 A 8/1937 Johnson
2,100,629 A 11/1937 Chilton
2,109,845 A 3/1938 Madle
2,112,763 A 3/1938 Cloudsley
2,134,225 A 10/1938 Christiansen
2,152,796 A 4/1939 Erban
2,153,252 A 4/1939 Hunsdorf
2,191,872 A 2/1940 Upton
2,196,064 A 4/1940 Erban
2,209,254 A 7/1940 Ahnger
2,259,933 A 10/1941 Holloway
2,269,434 A 1/1942 Brooks
2,325,502 A 7/1943 Auguste
RE22,761 E 5/1946 Wemp
2,461,258 A 2/1949 Brooks
2,469,653 A 5/1949 Kopp
2,480,968 A 9/1949 Ronai
2,561,131 A 7/1951 Oropeza
2,586,725 A 2/1952 Henry
2,596,538 A 5/1952 Dicke
2,597,849 A 5/1952 Alfredeen
2,675,713 A 4/1954 Acker
2,696,888 A 12/1954 Chillson et al.
2,730,904 A 1/1956 Rennerfelt
2,748,614 A 6/1956 Weisel
2,868,038 A 1/1959 Billeter
2,959,070 A 1/1959 Flinn
2,873,911 A 2/1959 Perrine
2,874,592 A 2/1959 Oehrli
2,883,883 A 4/1959 Chillson
2,885,579 A 5/1959 Lemp
2,891,213 A 6/1959 Kern
2,913,932 A 11/1959 Oehrli
2,931,234 A 4/1960 Hayward
2,931,235 A 4/1960 Hayward
2,949,800 A 8/1960 Neuschotz
2,959,063 A 11/1960 Perry
2,959,972 A 11/1960 Madson
2,964,959 A 12/1960 Beck
2,974,547 A 3/1961 Egan
3,008,061 A 11/1961 Mims et al.
3,048,056 A 8/1962 Wolfram
3,051,020 A 8/1962 Hartupee
3,086,704 A 4/1963 Hurtt
3,087,348 A 4/1963 Kraus
3,154,957 A 11/1964 Kashihara
3,163,050 A 12/1964 Kraus
3,176,542 A 4/1965 Monch
3,184,983 A 5/1965 Kraus
3,204,476 A 9/1965 Rouverol
3,209,606 A 10/1965 Yamamoto
3,211,364 A 10/1965 Wentling et al.
3,216,283 A 11/1965 General
3,246,531 A 4/1966 Kashihara
3,248,960 A 5/1966 Schottler
3,273,468 A 9/1966 Allen
3,280,646 A 10/1966 Lemieux
3,283,614 A 11/1966 Hewko
3,292,443 A 12/1966 Felix
3,340,895 A 9/1967 Osgood, Jr. et al.
3,407,687 A 10/1968 Hayashi
3,440,895 A 4/1969 Fellows
3,464,281 A 9/1969 Hiroshi et al.
3,477,315 A 11/1969 Macks
3,487,726 A 1/1970 Burnett
3,487,727 A 1/1970 Gustafsson
3,488,533 A 1/1970 Pope
3,574,289 A 4/1971 Scheiter et al.
3,661,404 A 5/1972 Bossaer
3,695,120 A 10/1972 Titt
3,707,888 A 1/1973 Schottler
3,727,473 A 4/1973 Bayer
3,727,474 A 4/1973 Fullerton
3,736,803 A 6/1973 Horowitz et al.
3,768,715 A 10/1973 Tout
3,800,607 A 4/1974 Zurcher
3,802,284 A 4/1974 Sharpe et al.
3,810,398 A 5/1974 Kraus
3,820,416 A 6/1974 Kraus
3,866,985 A 2/1975 Whitehurst
3,891,235 A 6/1975 Shelly
3,934,493 A 1/1976 Hillyer
3,954,282 A 5/1976 Hege
3,987,681 A 10/1976 Keithley et al.
3,996,807 A 12/1976 Adams
4,056,746 A 11/1977 Burtis
4,098,146 A 7/1978 McLarty
4,103,514 A 8/1978 Grosse-Entrup
4,159,653 A 7/1979 Koivunen
4,169,609 A 10/1979 Zampedro
4,175,650 A * 11/1979 Miller ........................ 192/84.51
4,177,683 A 12/1979 Moses
4,227,712 A 10/1980 Dick
4,314,485 A 2/1982 Adams
4,345,486 A 8/1982 Olesen
4,369,667 A 1/1983 Kemper
4,382,188 A 5/1983 Cronin
4,391,156 A 7/1983 Tibbals
4,459,873 A 7/1984 Black
4,464,952 A 8/1984 Stubbs
4,468,984 A 9/1984 Castelli et al.
4,494,524 A 1/1985 Wagner
4,496,051 A 1/1985 Ortner
4,526,255 A 7/1985 Hennessey et al.
4,546,673 A 10/1985 Shigematsu et al.
4,560,369 A 12/1985 Hattori
4,567,781 A 2/1986 Russ
4,574,649 A 3/1986 Seol
4,585,429 A 4/1986 Marier

(56) References Cited

U.S. PATENT DOCUMENTS 4,617,838 A 10/1986 Anderson
4,630,839 A 12/1986 Seol
4,631,469 A 12/1986 Tsuboi et al.
4,651,082 A 3/1987 Kaneyuki
4,663,990 A 5/1987 Itoh et al.
4,700,581 A 10/1987 Tibbals, Jr.
4,713,976 A 12/1987 Wilkes
4,717,368 A 1/1988 Yamaguchi et al.
4,735,430 A 4/1988 Tomkinson
4,738,164 A 4/1988 Kaneyuki
4,744,261 A 5/1988 Jacobson
4,756,211 A 7/1988 Fellows
4,781,663 A 11/1988 Reswick
4,838,122 A 6/1989 Takamiya et al.
4,856,374 A 8/1989 Kreuzer
4,869,130 A 9/1989 Wiecko
4,881,925 A 11/1989 Hattori
4,900,046 A 2/1990 Aranceta-Angoitia
4,909,101 A 3/1990 Terry
4,918,344 A 4/1990 Chikamori et al.
4,928,543 A 5/1990 Johannesen et al.
4,964,312 A 10/1990 Kraus
5,006,093 A 4/1991 Itoh et al.
5,020,384 A 6/1991 Kraus
5,027,023 A 6/1991 Koivikko
5,033,322 A 7/1991 Nakano
5,037,361 A 8/1991 Takahashi
5,044,214 A 9/1991 Barber
5,069,655 A 12/1991 Schivelbusch
5,089,734 A 2/1992 Bickraj
5,099,710 A 3/1992 Nakano
5,121,654 A 6/1992 Fasce
5,125,677 A 6/1992 Ogilvie et al.
5,138,894 A 8/1992 Kraus
5,156,412 A 10/1992 Meguerditchian
5,230,258 A 7/1993 Nakano
5,236,211 A 8/1993 Meguerditchian
5,236,403 A 8/1993 Schievelbusch
5,260,617 A 11/1993 Leibowitz
5,267,920 A 12/1993 Hibi
5,273,501 A 12/1993 Schievelbusch
5,318,486 A 6/1994 Lutz
5,319,486 A 6/1994 Vogel et al.
5,330,396 A 7/1994 Lohr et al.
5,355,749 A 10/1994 Obara et al.
5,375,865 A 12/1994 Terry, Sr.
5,379,661 A 1/1995 Nakano
5,383,677 A 1/1995 Thomas
5,387,000 A 2/1995 Sato
5,401,221 A 3/1995 Fellows et al.
5,451,070 A 9/1995 Lindsay et al.
5,487,438 A 1/1996 Kinoshita
5,489,003 A 2/1996 Ohyama et al.
5,508,574 A 4/1996 Vlock
5,562,564 A 10/1996 Folino
5,564,998 A 10/1996 Fellows
5,601,301 A 2/1997 Liu
5,607,373 A 3/1997 Ochiai et al.
5,645,507 A 7/1997 Hathaway
5,651,750 A 7/1997 Imanishi et al.
5,664,636 A 9/1997 Ikuma et al.
5,669,845 A 9/1997 Muramoto et al.
5,690,346 A 11/1997 Keskitalo
5,722,502 A 3/1998 Kubo
5,746,676 A 5/1998 Kawase et al.
5,755,303 A 5/1998 Yamamoto et al.
5,799,541 A 9/1998 Arbeiter
5,823,052 A 10/1998 Nobumoto
5,833,564 A 11/1998 Harris
5,846,155 A 12/1998 Taniguchi et al.
5,888,160 A 3/1999 Miyata et al.
5,899,827 A 5/1999 Nakano et al.
5,902,207 A 5/1999 Sugihara
5,967,933 A 10/1999 Valdenaire
5,984,826 A 11/1999 Nakano
6,000,707 A 12/1999 Miller
6,004,239 A 12/1999 Makino
6,006,151 A 12/1999 Graf
6,015,359 A 1/2000 Kunii
6,019,701 A 2/2000 Mori et al.
6,029,990 A 2/2000 Busby
6,042,132 A 3/2000 Suenaga et al.
6,045,477 A 4/2000 Schmidt
6,045,481 A 4/2000 Kumagai
6,053,833 A 4/2000 Masaki
6,053,841 A 4/2000 Kolde et al.
6,054,844 A 4/2000 Frank
6,066,067 A 5/2000 Greenwood
6,071,210 A 6/2000 Kato
6,076,846 A 6/2000 Clardy
6,079,726 A 6/2000 Busby
6,086,506 A 7/2000 Petersmann et al.
6,095,940 A 8/2000 Ai et al.
6,099,431 A 8/2000 Hoge et al.
6,113,513 A 9/2000 Itoh et al.
6,119,539 A 9/2000 Papanicolaou
6,119,800 A 9/2000 McComber
6,159,126 A 12/2000 Oshidan
6,171,210 B1 1/2001 Miyata et al.
6,174,260 B1 1/2001 Tsukada et al.
6,186,922 B1 2/2001 Bursal et al.
6,217,473 B1 4/2001 Ueda et al.
6,239,524 B1 5/2001 Leibowitz
6,241,636 B1 6/2001 Miller
6,243,638 B1 6/2001 Abo et al.
6,251,038 B1 6/2001 Ishikawa et al.
6,258,003 B1 7/2001 Hirano et al.
6,261,200 B1 7/2001 Miyata et al.
6,311,113 B1 10/2001 Danz et al.
6,312,358 B1 11/2001 Goi et al.
6,322,475 B2 11/2001 Miller
6,325,386 B1 12/2001 Shoge
6,358,178 B1 3/2002 Wittkopp
6,375,412 B1 4/2002 Dial
6,390,945 B1 5/2002 Young
6,390,946 B1 5/2002 Hibi et al.
6,406,399 B1 6/2002 Ai
6,414,401 B1 7/2002 Kuroda et al.
6,419,608 B1 7/2002 Miller
6,425,838 B1 7/2002 Matsubara et al.
6,434,960 B1 8/2002 Rousseau
6,440,037 B2 8/2002 Takagi et al.
6,461,268 B1 10/2002 Milner
6,482,094 B2 11/2002 Kefes
6,492,785 B1 12/2002 Kasten et al.
6,494,805 B2 12/2002 Ooyama et al.
6,499,373 B2 12/2002 Van Cor
6,514,175 B2 2/2003 Taniguchi et al.
6,532,890 B2 3/2003 Chen
6,551,210 B2 4/2003 Miller
6,575,047 B2 6/2003 Reik et al.
6,659,901 B2 12/2003 Sakai et al.
6,672,418 B1 1/2004 Makino
6,676,559 B2 1/2004 Miller
6,679,109 B2 1/2004 Gierling et al.
6,682,432 B1 1/2004 Shinozuka
6,689,012 B2 2/2004 Miller
6,707,190 B2 3/2004 Leibowitz
6,721,637 B2 4/2004 Abe et al.
6,723,016 B2 4/2004 Sumi
6,805,654 B2 10/2004 Nishii
6,808,053 B2 10/2004 Kirkwood et al.
6,839,617 B2 1/2005 Mensler et al.
6,849,020 B2 2/2005 Sumi
6,859,709 B2 2/2005 Joe et al.
6,931,316 B2 8/2005 Joe et al.
6,932,739 B2 8/2005 Miyata et al.
6,942,593 B2 9/2005 Nishii et al.
6,945,903 B2 9/2005 Miller
6,949,049 B2 9/2005 Miller
6,958,029 B2 10/2005 Inoue
6,991,575 B2 1/2006 Inoue
6,991,579 B2 1/2006 Kobayashi et al.
7,011,600 B2 3/2006 Miller et al.

(56) References Cited

U.S. PATENT DOCUMENTS 7,011,601 B2 3/2006 Miller
7,014,591 B2 3/2006 Miller
7,029,418 B2 4/2006 Taketsuna et al.
7,032,914 B2 4/2006 Miller
7,036,620 B2 5/2006 Miller et al.
7,044,884 B2 5/2006 Miller
7,063,640 B2 6/2006 Miller
7,074,007 B2 7/2006 Miller
7,074,154 B2 7/2006 Miller
7,074,155 B2 7/2006 Miller
7,077,777 B2 7/2006 Miyata et al.
7,083,545 B2 8/2006 Ibamoto et al.
7,086,979 B2 8/2006 Frenken
7,086,981 B2 8/2006 Ali et al.
7,094,171 B2 8/2006 Inoue
7,111,860 B1 9/2006 Grimaldos
7,112,158 B2 9/2006 Miller
7,112,159 B2 9/2006 Miller et al.
7,125,297 B2 10/2006 Miller et al.
7,131,930 B2 11/2006 Miller et al.
7,140,999 B2 11/2006 Miller
7,147,586 B2 12/2006 Miller et al.
7,153,233 B2 12/2006 Miller et al.
7,156,770 B2 1/2007 Miller
7,160,220 B2 1/2007 Shinojima et al.
7,160,222 B2 1/2007 Miller
7,163,485 B2 1/2007 Miller
7,163,486 B2 1/2007 Miller et al.
7,166,052 B2 1/2007 Miller et al.
7,166,056 B2 1/2007 Miller et al.
7,166,057 B2 1/2007 Miller et al.
7,166,058 B2 1/2007 Miller et al.
7,169,076 B2 1/2007 Miller et al.
7,172,529 B2 2/2007 Miller et al.
7,175,564 B2 2/2007 Miller
7,175,565 B2 2/2007 Miller et al.
7,175,566 B2 2/2007 Miller et al.
7,192,381 B2 3/2007 Miller et al.
7,197,915 B2 4/2007 Luh et al.
7,198,582 B2 4/2007 Miller et al.
7,198,583 B2 4/2007 Miller et al.
7,198,584 B2 4/2007 Miller et al.
7,198,585 B2 4/2007 Miller et al.
7,201,693 B2 4/2007 Miller et al.
7,201,694 B2 4/2007 Miller et al.
7,201,695 B2 4/2007 Miller et al.
7,204,777 B2 4/2007 Miller et al.
7,214,159 B2 5/2007 Miller et al.
7,217,215 B2 5/2007 Miller et al.
7,217,216 B2 5/2007 Inoue
7,217,219 B2 5/2007 Miller
7,217,220 B2 5/2007 Careau et al.
7,226,379 B2 6/2007 Ibamoto et al.
7,232,395 B2 6/2007 Miller et al.
7,234,873 B2 6/2007 Kato et al.
7,235,031 B2 6/2007 Miller et al.
7,238,136 B2 7/2007 Miller et al.
7,238,137 B2 7/2007 Miller et al.
7,238,138 B2 7/2007 Miller et al.
7,238,139 B2 7/2007 Roethler et al.
7,246,672 B2 7/2007 Shirai et al.
7,250,018 B2 7/2007 Miller et al.
7,261,663 B2 8/2007 Miller et al.
7,275,610 B2 10/2007 Kuang et al.
7,285,068 B2 10/2007 Hosoi
7,288,042 B2 10/2007 Miller et al.
7,288,043 B2 10/2007 Shioiri et al.
7,320,660 B2 1/2008 Miller
7,322,901 B2 1/2008 Miller et al.
7,347,801 B2 3/2008 Guenter et al.
7,384,370 B2 6/2008 Miller
7,393,300 B2 7/2008 Miller et al.
7,393,302 B2 7/2008 Miller
7,393,303 B2 7/2008 Miller
7,395,731 B2 7/2008 Miller et al.
7,396,209 B2 7/2008 Miller et al.
7,402,122 B2 7/2008 Miller
7,410,443 B2 8/2008 Miller
7,419,451 B2 9/2008 Miller
7,422,541 B2 9/2008 Miller
7,422,546 B2 9/2008 Miller et al.
7,427,253 B2 9/2008 Miller
7,431,677 B2 10/2008 Miller et al.
7,452,297 B2 11/2008 Miller et al.
7,455,611 B2 11/2008 Miller et al.
7,455,617 B2 11/2008 Miller et al.
7,462,123 B2 12/2008 Miller et al.
7,462,127 B2 12/2008 Miller et al.
7,470,210 B2 12/2008 Miller et al.
7,481,736 B2 1/2009 Miller et al.
7,510,499 B2 3/2009 Miller et al.
7,540,818 B2 6/2009 Miller et al.
7,547,264 B2 6/2009 Usoro
7,574,935 B2 8/2009 Rohs et al.
7,591,755 B2 9/2009 Petrzik et al.
7,632,203 B2 12/2009 Miller
7,651,437 B2 1/2010 Miller et al.
7,654,928 B2 2/2010 Miller et al.
7,670,243 B2 3/2010 Miller
7,686,729 B2 3/2010 Miller et al.
7,727,101 B2 6/2010 Miller
7,727,107 B2 6/2010 Miller
7,727,108 B2 6/2010 Miller et al.
7,727,110 B2 6/2010 Miller et al.
7,727,115 B2 6/2010 Serkh
7,731,615 B2 6/2010 Miller et al.
7,762,919 B2 7/2010 Smithson et al.
7,762,920 B2 7/2010 Smithson et al.
7,785,228 B2 8/2010 Smithson et al.
7,828,685 B2 11/2010 Miller
7,837,592 B2 11/2010 Miller
7,871,353 B2 1/2011 Nichols et al.
7,882,762 B2 2/2011 Armstrong et al.
7,883,442 B2 2/2011 Miller et al.
7,885,747 B2 2/2011 Miller et al.
7,887,032 B2 2/2011 Malone
7,909,723 B2 3/2011 Triller et al.
7,909,727 B2 3/2011 Smithson et al.
7,914,029 B2 3/2011 Miller et al.
7,959,533 B2 6/2011 Nichols et al.
7,963,880 B2 6/2011 Smithson et al.
7,967,719 B2 6/2011 Smithson et al.
7,976,426 B2 7/2011 Smithson et al.
8,066,613 B2 11/2011 Smithson et al.
8,066,614 B2 11/2011 Miller et al.
8,070,635 B2 12/2011 Miller
8,087,482 B2 1/2012 Miles et al.
8,123,653 B2 2/2012 Smithson et al.
8,133,149 B2 3/2012 Smithson et al.
8,142,323 B2 3/2012 Tsuchiya et al.
8,167,759 B2 5/2012 Pohl et al.
8,171,636 B2 5/2012 Smithson et al.
8,230,961 B2 7/2012 Schneidewind
8,262,536 B2 9/2012 Nichols et al.
8,267,829 B2 9/2012 Miller et al.
8,313,404 B2 11/2012 Carter et al.
8,313,405 B2 11/2012 Bazyn et al.
8,317,650 B2 11/2012 Nichols et al.
8,317,651 B2 11/2012 Lohr
8,321,097 B2 11/2012 Vasiliotis et al.
8,342,999 B2 1/2013 Miller
8,360,917 B2 1/2013 Nichols et al.
8,376,903 B2 2/2013 Pohl et al.
8,382,637 B2 2/2013 Tange
8,393,989 B2 * 3/2013 Pohl .............................. 475/196
8,398,518 B2 3/2013 Nichols et al.
8,469,853 B2 6/2013 Miller et al.
8,469,856 B2 6/2013 Thomassy
8,480,529 B2 7/2013 Pohl et al.
8,496,554 B2 7/2013 Pohl et al.
8,506,452 B2 8/2013 Pohl et al.
8,512,195 B2 8/2013 Lohr et al.
8,535,199 B2 9/2013 Lohr et al.
8,550,949 B2 10/2013 Miller

(56) References Cited

U.S. PATENT DOCUMENTS 8,585,528 B2 11/2013 Carter et al.
8,622,866 B2 1/2014 Bazyn et al.
8,626,409 B2 1/2014 Vasiliotis et al.
8,628,443 B2 1/2014 Miller et al.
8,641,572 B2 2/2014 Nichols et al.
8,641,577 B2 2/2014 Nichols et al.
8,784,248 B2 7/2014 Murakami et al.
8,852,050 B2 10/2014 Thomassy
2001/0008192 A1 7/2001 Morisawa
2001/0041644 A1 11/2001 Yasuoka et al.
2001/0044361 A1 11/2001 Taniguchi et al.
2002/0019285 A1 2/2002 Henzler
2002/0028722 A1 3/2002 Sakai et al.
2002/0045511 A1 4/2002 Geiberger et al.
2002/0169051 A1 11/2002 Oshidari
2003/0015358 A1 1/2003 Abe et al.
2003/0015874 A1 1/2003 Abe et al.
2003/0022753 A1 1/2003 Mizuno et al.
2003/0036456 A1 2/2003 Skrabs
2003/0132051 A1 7/2003 Nishii et al.
2003/0135316 A1 7/2003 Kawamura et al.
2003/0216216 A1 11/2003 Inoue et al.
2003/0221892 A1 12/2003 Matsumoto et al.
2004/0038772 A1 2/2004 McIndoe et al.
2004/0058772 A1 3/2004 Inoue et al.
2004/0067816 A1 4/2004 Taketsuna et al.
2004/0082421 A1 4/2004 Wafzig
2004/0119345 A1 6/2004 Takano
2004/0171457 A1 9/2004 Fuller
2004/0204283 A1 10/2004 Inoue
2004/0231331 A1 11/2004 Iwanami et al.
2004/0254047 A1 12/2004 Frank et al.
2005/0037876 A1 2/2005 Unno et al.
2005/0085979 A1 4/2005 Carlson et al.
2005/0227809 A1 10/2005 Bitzer et al.
2006/0006008 A1 1/2006 Brunemann et al.
2006/0052204 A1 3/2006 Eckert et al.
2006/0108956 A1 5/2006 Clark
2006/0111212 A9 5/2006 Ai et al.
2006/0180363 A1 8/2006 Uchisasai
2006/0223667 A1 10/2006 Nakazeki
2006/0234822 A1 10/2006 Morscheck et al.
2006/0276299 A1 12/2006 Imanishi
2007/0004552 A1 1/2007 Matsudaira et al.
2007/0004556 A1 1/2007 Rohs et al.
2007/0142161 A1* 6/2007 Miller .............................. 476/4
2007/0149342 A1 6/2007 Guenter et al.
2007/0155567 A1 7/2007 Miller et al.
2007/0228687 A1 10/2007 Parker
2008/0032852 A1 2/2008 Smithson et al.
2008/0032854 A1 2/2008 Smithson et al.
2008/0039269 A1 2/2008 Smithson et al.
2008/0039273 A1 2/2008 Smithson et al.
2008/0039276 A1 2/2008 Smithson et al.
2008/0081728 A1 4/2008 Faulring et al.
2008/0139363 A1 6/2008 Williams
2008/0141809 A1 6/2008 Miller et al.
2008/0149407 A1 6/2008 Shibata et al.
2008/0200300 A1 8/2008 Smithson et al.
2008/0228362 A1 9/2008 Muller et al.
2008/0284170 A1 11/2008 Cory
2008/0305920 A1 12/2008 Nishii et al.
2009/0023545 A1 1/2009 Beaudoin
2009/0082169 A1 3/2009 Kolstrup
2009/0107454 A1 4/2009 Hiyoshi et al.
2009/0251013 A1 10/2009 Vollmer et al.
2010/0093479 A1 4/2010 Carter et al.
2011/0088503 A1 4/2011 Armstrong et al.
2011/0127096 A1 6/2011 Schneidewind
2011/0184614 A1 7/2011 Keilers et al.
2011/0230297 A1 9/2011 Shiina et al.
2011/0291507 A1 12/2011 Post
2011/0319222 A1 12/2011 Ogawa et al.
2012/0035015 A1 2/2012 Ogawa et al.
2012/0258839 A1 10/2012 Smithson et al.
2013/0035200 A1 2/2013 Noji et al.
2013/0053211 A1 2/2013 Fukuda et al.
2013/0079191 A1 3/2013 Lohr
2013/0095977 A1 4/2013 Smithson et al.
2013/0102434 A1 4/2013 Nichols et al.
2013/0146406 A1 6/2013 Nichols et al.
2013/0152715 A1 6/2013 Pohl et al.
2013/0190123 A1 7/2013 Pohl et al.
2013/0288848 A1 10/2013 Carter et al.
2013/0310214 A1 11/2013 Pohl et al.
2013/0324344 A1 12/2013 Pohl et al.
2013/0331218 A1 12/2013 Lohr et al.
2013/0337971 A1 12/2013 Kostrup
2014/0011619 A1* 1/2014 Pohl et al. .................... 475/149
2014/0011628 A1 1/2014 Lohr et al.
2014/0073470 A1 3/2014 Carter et al.
2014/0121922 A1 5/2014 Vasiliotis et al.
2014/0128195 A1 5/2014 Miller et al.
2014/0141919 A1 5/2014 Bazyn et al.
2014/0144260 A1 5/2014 Nichols et al.
2014/0148303 A1 5/2014 Nichols et al.
2014/0179479 A1 6/2014 Nichols et al.
2014/0206499 A1 7/2014 Lohr
2014/0248988 A1 9/2014 Lohr et al.
2014/0257650 A1 9/2014 Carter et al.

FOREIGN PATENT DOCUMENTS

CN 1157379 8/1997
CN 1281540 A 1/2001
CN 1283258 2/2001
CN 1940348 4/2007
DE 498 701 5/1930
DE 1171692 6/1964
DE 2 310880 9/1974
DE 2 136 243 1/1975
DE 2436496 2/1975
DE 39 40 919 A1 6/1991
DE 19851738 A 5/2000
DE 10155372 A1 5/2003
EP 0 432 742 12/1990
EP 0 528 381 2/1993
EP 0 528 382 2/1993
EP 0 635 639 1/1995
EP 0 638 741 2/1995
EP 0 832 816 4/1998
EP 0 976 956 2/2000
EP 1 136 724 9/2001
EP 1 366 978 3/2003
EP 1 347 251 9/2003
EP 1 433 641 6/2004
EP 1 624 230 2/2006
EP 1 811 202 7/2007
FR 620375 4/1927
FR 2460427 1/1981
FR 2590638 5/1987
FR 2909938 6/2008
GB 391448 4/1933
GB 592320 9/1947
GB 906002 9/1962
GB 919430 2/1963
GB 1132473 11/1968
GB 1165545 10/1969
GB 1376057 12/1974
GB 2031822 4/1980
GB 2035482 6/1980
GB 2080452 8/1982
JP 44-1098 1/1944
JP 38-025315 11/1963
JP 41-3126 2/1966
JP 42-2843 2/1967
JP 42-2844 2/1967
JP 47-000448 7/1972
JP 47-29762 11/1972
JP 48-54371 7/1973
JP 49-12742 3/1974
JP 50-114581 9/1975
JP 51-25903 8/1976
JP 51-150380 12/1976

(56) References Cited

FOREIGN PATENT DOCUMENTS

| | | |
|---|---|---|
| JP | 47-20535 | 8/1977 |
| JP | 53-048166 | 1/1978 |
| JP | 55-135259 | 4/1979 |
| JP | 56-047231 | 4/1981 |
| JP | 56-127852 | 10/1981 |
| JP | 58-065361 | 4/1983 |
| JP | 59-069565 | 4/1984 |
| JP | 59-144826 | 8/1984 |
| JP | 60-247011 | 12/1985 |
| JP | 61-031754 | 2/1986 |
| JP | 61-053423 | 3/1986 |
| JP | 61-144466 | 7/1986 |
| JP | 61-173722 | 10/1986 |
| JP | 61-270552 | 11/1986 |
| JP | 62-075170 | 4/1987 |
| JP | 63-219953 | 9/1988 |
| JP | 63-160465 | 10/1988 |
| JP | 01-286750 | 11/1989 |
| JP | 01-308142 | 12/1989 |
| JP | 02-130224 | 5/1990 |
| JP | 02-157483 | 6/1990 |
| JP | 02-271142 | 6/1990 |
| JP | 04-166619 | 6/1992 |
| JP | 04-272553 | 9/1992 |
| JP | 4-351361 | 12/1992 |
| JP | 5-87154 | 4/1993 |
| JP | 52-35481 | 9/1993 |
| JP | 06-050169 | 2/1994 |
| JP | 06-50358 | 2/1994 |
| JP | 7-42799 | 2/1995 |
| JP | 7-139600 | 5/1995 |
| JP | 08-170706 | 7/1996 |
| JP | 09-024743 | 1/1997 |
| JP | 09-089064 | 3/1997 |
| JP | 10-061739 | 3/1998 |
| JP | 10-115355 | 5/1998 |
| JP | 10-115356 | 5/1998 |
| JP | 10-194186 | 7/1998 |
| JP | 41-1063130 | 3/1999 |
| JP | 11-257479 | 9/1999 |
| JP | 2000-46135 | 2/2000 |
| JP | 2001-27298 | 1/2001 |
| JP | 2001-107827 | 4/2001 |
| JP | 2001-165296 | 6/2001 |
| JP | 2001-521109 | 11/2001 |
| JP | 2002-147558 | 5/2002 |
| JP | 2002-250421 | 6/2002 |
| JP | 2002-307956 | 10/2002 |
| JP | 2003-028257 | 1/2003 |
| JP | 2003-56662 | 2/2003 |
| JP | 2003-161357 | 6/2003 |
| JP | 2003-524119 | 8/2003 |
| JP | 2003-336732 | 11/2003 |
| JP | 2004-162652 | 6/2004 |
| JP | 8-247245 | 9/2004 |
| JP | 2004-526917 | 9/2004 |
| JP | 2005-003063 | 1/2005 |
| JP | 2005-240928 | 9/2005 |
| JP | 2006-015025 | 1/2006 |
| JP | 2006-300241 | 11/2006 |
| JP | 2008-002687 | 1/2008 |
| JP | 03-149442 | 1/2009 |
| JP | 2010-069005 | 4/2010 |
| JP | 2007-535715 | 7/2012 |
| NE | 98467 | 7/1961 |
| TW | 74007 | 1/1984 |
| TW | 175100 | 12/1991 |
| TW | 218909 | 1/1994 |
| TW | 227206 | 7/1994 |
| TW | 275872 | 5/1996 |
| TW | 360184 | 6/1999 |
| TW | 366396 | 8/1999 |
| TW | 512211 | 12/2002 |
| TW | 582363 | 4/2004 |
| TW | 590955 | 6/2004 |
| TW | I225129 | 12/2004 |
| TW | I225912 | 1/2005 |
| TW | I235214 | 1/2005 |
| TW | M294598 | 7/2006 |
| TW | 200637745 | 11/2006 |
| WO | WO 99/20918 | 4/1999 |
| WO | WO 01/73319 | 10/2001 |
| WO | WO 03/100294 | 12/2003 |
| WO | WO 2005/083305 | 9/2005 |
| WO | WO 2005/108825 | 11/2005 |
| WO | WO 2005/111472 | 11/2005 |
| WO | WO 2006/014617 | 2/2006 |
| WO | WO 2006/091503 | 8/2006 |
| WO | WO 2008/078047 | 7/2008 |
| WO | WO 2008/095116 | 8/2008 |
| WO | WO 2008/100792 | 8/2008 |
| WO | WO 2008/154437 | 12/2008 |
| WO | WO 2010/017242 | 2/2010 |
| WO | WO 2010/135407 | 11/2010 |
| WO | WO 2011/101991 | 8/2011 |
| WO | WO 2012/030213 | 3/2012 |
| WO | WO 2013/112408 | 8/2013 |

OTHER PUBLICATIONS

Office Action dated Feb. 16, 2012 for U.S. Appl. No. 13/287,790.

Office Action dated Nov. 9, 2012 for Korean Patent Application No. 10-2012-7022667.

International Search Report for International application No. PCT/US2006/041389 dated Sep. 24, 2007.

Office Action dated Oct. 15, 2012 for Taiwan Patent Application No. 95139495.

Thomassy: An Engineering Approach to Simulating Traction EHL. CVT-Hybrid International Conference Mecc/Maastricht/The Netherlands, Nov. 17-19, 2010, p. 97.

Korean Office Action dated Jan. 30, 2013 for Korean Patent Application No. 10-2008-7012665.

Korean Office Action dated Apr. 2, 2013 for Korean Patent Application No. 10-2013-7000086 with English translation.

Office Action dated Feb. 21, 2013 for U.S. Appl. No. 13/718,572.

First Office Action dated Dec. 2, 2013 in Chinese Patent Application No. 201110307194.6.

Second Office Action dated Jun. 23, 2014 in Chinese Patent Application No. 201110307194.6.

Office Action dated Nov. 21, 2013 in Chinese Patent Application No. 201110307049.8.

Office Action dated May 31, 2013 for Korean Patent Application No. 10-2012-7022667.

Notice of Final Rejection received Feb. 4, 2014 in Korean Patent Application No. 10-2012-7022667.

Summary of Notice of Final Rejection dated Oct. 31, 2013 for Korean Patent Application No. 10-2013-7000086 with English translation.

Notification to Submit an Argument dated Mar. 25, 2014 in Korean Patent Application No. 10-2014-7006565.

Notification to Submit an Argument dated Mar. 20, 2014 in Korean Patent Application No. 10-2014-7004801.

* cited by examiner 100
60
98
99
173
196
195
67
66
40
61
62
64
133
13A
17A
18
3
172A
19
13B
21
2
171

402
99
196
195
173
98
97
2
17A
13A
14
417A
172A
417B
1
18
4
3
21
17B
19
13B
172B
171

600
11
101
1
18
34
602
604a
604b
605
608
609
610
612
614
616a
616b
618
620
621
622
624
626
628
632
634
636
650
652a
652b
654a
654b
658
660
668
670
672
674
676
680
682
684
686
694
13a
13b
17a
17b
80a
80b
III
III 600
618
621
612
694
609
34
101
605
604a
608
604b
610
602
1
17b
18
17a
614
601
630
682
680
620
672
670
622

714
712
710
600

870
18
34
101
872
80b
89
860
850
851
852
854
856a
856b
858
866

974
972
978
970
976
968
958b
992
958a
988
950
960
962

988
954

966B
964
966A
962
954

11
602
101
18
804
34
89
680
1016
1
1014
1012
1010
806
1001
1018
1022
1020
1000

ELECTROMOTIVE DRIVES

CROSS REFERENCE TO RELATED APPLICATIONS

This application is a continuation of U.S. application Ser. No. 13/718,572, filed Dec. 18, 2012 and scheduled to issue as U.S. Pat. No. 8,550,949 on Oct. 8, 2013, which is a continuation of U.S. application Ser. No. 13/287,790, filed Nov. 2, 2011 and issued on Jan. 1, 2013 as U.S. Pat. No. 8,342,999, which is a continuation of U.S. patent application Ser. No. 12/039,578, filed on Feb. 28, 2008 and issued on Dec. 6, 2011 as U.S. Pat. No. 8,070,635, which is a continuation of U.S. patent application Ser. No. 11/585,677, filed on Oct. 24, 2006 and issued on Dec. 15, 2009 as U.S. Pat. No. 7,632,203, which claims the benefit of U.S. Provisional Application No. 60/730,995 and U.S. Provisional Application No. 60/731,362, both of which were filed on Oct. 28, 2005. Each of above-identified applications is hereby incorporated by reference in its entirety.

BACKGROUND OF THE INVENTION

1. Field of the Invention

The field of the inventive embodiments relates generally to systems and methods for electromechanical or electromotive drives, and more particularly the inventive embodiments relate to drives that utilize methods and assemblies that integrate electrical devices and mechanical transmissions.

2. Description of the Related Art

In order to provide a continuously variable transmission, various traction roller transmissions in which power is transmitted through traction rollers supported in a housing between torque input and output discs have been developed. In such transmissions, the traction rollers are mounted on support structures which, when pivoted, cause the engagement of traction rollers with the torque discs in circles of varying diameters depending on the desired transmission ratio.

However, the success of these traditional solutions has been limited. For example, in one solution, a driving hub for a vehicle with a variable adjustable transmission ratio is disclosed. This method teaches the use of two iris plates, one on each side of the traction rollers, to tilt the axis of rotation of each of the rollers. However, the use of iris plates can be very complicated due to the large number of parts that are required to adjust the iris plates during transmission shifting. Another difficulty with this transmission is that it has a guide ring that is configured to be predominantly stationary in relation to each of the rollers. Since the guide ring is stationary, shifting the axis of rotation of each of the traction rollers is difficult.

One improvement over this earlier design includes a shaft about which an input disc and an output disc rotate. The input disc and output disc are both mounted on the shaft and contact a plurality of balls disposed equidistantly and radially about the shaft. The balls are in frictional contact with both discs and transmit power from the input disc to the output disc. An idler located concentrically over the shaft and between the balls applies a force to keep the balls separate to make frictional contact against the input disc and output disc. A key limitation of this design is the absence of means for generating and adequately controlling the axial force acting as normal contact force to keep the input disc and output disc in sufficient frictional contact against the balls as the speed ratio of the transmission changes. Due to the fact that rolling traction continuously variable transmissions require more axial force at low speed to prevent the driving and driven rotating members from slipping on the speed changing friction balls, excessive force is applied in high speed and at a 1:1 ratio, when the input and output speeds are equal. This excessive axial force lowers efficiency and causes the transmission to fail significantly faster than if the proper amount of force was applied for any particular gear ratio. The excessive force also makes it more difficult to shift the transmission. Thus, there exists a need for a continuously variable transmission with an improved axial load generating system that changes the force produced as a function of the transmission ratio.

An electric motor producing variable speed and constant power is highly desired in some vehicle and industrial uses. In such constant power applications, torque and speed vary inversely. For example, torque increases as speed decreases or torque decreases as speed increases. Some electric motors can provide constant power above their rated power; for example, a 1750 rpm AC motor can provide constant power when speed increases above 1750 rpm because torque can be designed to decrease proportionally with the speed increase. However, a motor by itself cannot produce constant power when operating at a speed below its rated power. Frequently torque remains constant or even decreases as the motor speed decreases. Controllers can be used to increase current, and torque, into the electric motor at low speeds, but an increase in the wire diameter of the windings is required to accommodate the additional current to avoid overheating. This is undesirable because the motor becomes larger and more expensive than necessary for typical operating conditions. The electronic controller also increases expense and complexity. Another method to achieve sufficient low speed torque is to use a bigger motor. However, this increases cost, size, weight, and makes the motor more difficult to package with the machine it powers. Thus, there exists a need for an improved method to provide variable speed and constant power with an electric motor. The continuously variable transmission can be integrated with an electric motor for some applications.

SUMMARY OF THE INVENTION

The systems and methods illustrated and described herein have several features, no single one of which is solely responsible for its desirable attributes. Without limiting the scope as expressed by the description that follows, its more prominent features will now be discussed briefly. After considering this discussion, and particularly after reading the section entitled "Detailed Description of the Preferred Embodiments" one will understand how the features of the system and methods provide several advantages over traditional systems and methods.

In yet another aspect, a variable speed transmission is disclosed comprising; a longitudinal axis, a plurality of balls distributed radially about the longitudinal axis, each ball having a tiltable axis about which it rotates, a rotatable input disc positioned adjacent to the balls and in contact with each of the balls, a fixed output disc positioned adjacent to the balls opposite the input disc and in contact with each of the balls, a rotatable idler having a constant outside diameter and positioned radially inward of and in contact with each of the balls, a cage, adapted to maintain the radial position and axial alignment of the balls and that is rotatable about the longitudinal axis, and an idler shaft connected to the idler adapted to receive a torque output from the idler and transmit the torque output out of the transmission.

For use with many embodiments described herein there is also disclosed an axial force generator adapted to apply an axial force to increase contact force between the input disc, the output disc and the plurality of speed adjusters, the axial force generator further comprising, a bearing disc coaxial with and rotatable about the longitudinal axis having an outer diameter and an inner diameter and having a threaded bore formed in its inner diameter, a plurality of perimeter ramps attached to a first side of the bearing disc near its outer diameter, a plurality of bearings adapted to engage the plurality of bearing disc ramps, a plurality of input disc perimeter ramps mounted on the input disc on a side opposite of the speed adjusters adapted to engage the bearings, a generally cylindrical screw coaxial with and rotatable about the longitudinal axis and having male threads formed along its outer surface, which male threads are adapted to engage the threaded bore of the bearing disc, a plurality of central screw ramps attached to the screw, and a plurality of central input disc ramps affixed to the input disc and adapted to engage the plurality of central screw ramps.

In another aspect, a support cage is disclosed that supports and positions a plurality of speed adjusting tiltable balls in a rolling traction transmission, which utilizes an input disc and an output disc on either side of the plurality of balls, the cage comprising; first and second flat support discs that are each a generally circular sheet having a plurality of slots extending radially inward from an outer edge, each slot having two sides, and a plurality of flat supporting spacers extending between said first and second support discs each spacer having a front side, a back side, a first end and a second end, wherein the first and second ends each have a mounting surface, wherein each mounting surface has a curved surface, and wherein the spacers are positioned angularly about the support discs between the grooves in the support discs such that the curved surfaces are aligned with the sides of the grooves.

In another embodiment, a shifting mechanism is disclosed for a variable speed rolling traction transmission having a longitudinal axis and that utilizes a plurality of tilting balls distributed in planar alignment about the longitudinal axis and each ball contacted on opposing sides by an input disc and an output disc, in order to control a transmission ratio of the transmission, the shifting mechanism comprising a tubular transmission axle running along the longitudinal axis, a plurality of ball axles each extending through a bore formed through a corresponding one of the plurality of balls and forming a tiltable axis of the corresponding ball about which that ball spins, and each ball axle having two ends that each extend out of the ball, a plurality of legs, one leg connected to each of the ends the ball axles, the legs extending radially inward toward the transmission axle, an idler having a substantially constant outside diameter that is positioned coaxially about the transmission axle and radially inward of and in contact with each of the balls, two disc-shaped shift guides, one on each end of the idler, and each having a flat side facing the idler and a convex curved side facing away from the idler, wherein shift guides extend radially to contact all of the respective legs on the corresponding side of the balls, a plurality of roller pulleys, one for each leg, wherein each roller pulley is attached to a side of its respective leg facing away from the balls, a generally cylindrical pulley stand extending axially from at least one of the shift guides, a plurality of guide pulleys, one for each roller pulley, distributed radially about and attached to the pulley stand, and a flexible tether having first and second ends with the first end extending through the axle and out a slot, which is formed in the axle proximate to the pulley stand, the first end of the tether further wrapping around each of the roller pulleys and each of the guide pulleys, wherein the second end extends out of the axle to a shifter, wherein the guide pulleys are each mounted upon one or more pivot joints to maintain alignment of each guide pulley with its respective roller pulley and wherein when the tether is pulled by the shifter, the second end draws each of the roller pulleys in to shift the transmission.

In another embodiment, a shifting mechanism is disclosed for a variable speed transmission having a longitudinal axis and that utilizes a plurality of tilting balls, each having a ball radius from respective ball centers, in order to control a transmission ratio of the transmission, comprising a plurality of ball axles each extending through a bore formed through a corresponding ball and forming the tiltable axis of the corresponding ball, and each ball axle having two ends that each extend out of the ball, a plurality of legs, one leg connected to each of ends the ball axles, the legs extending radially inward toward the transmission axle, a generally cylindrical idler with a substantially constant radius positioned coaxially and radially inward of and in contact with each of the balls, first and second disc-shaped shift guides, one on each end of the idler, and each having a flat side facing the idler and a convex curved side facing away from the idler, wherein shift guides extend radially to contact all of the respective legs on the corresponding side of the balls, and a plurality of guide wheels each having a guide wheel radius, one guide wheel for each leg, each guide wheel rotatably mounted at a radially inward end of its respective leg, wherein the guide wheels contact the curved surface of its respective shift guide, wherein a shapes of the convex curves are determined by a set of two-dimensional coordinates, the origin of is centered at the intersection of the longitudinal axis and a line drawn through the centers of any two diametrically opposing balls, wherein the coordinates represent the location of the point of contact between the guide wheel surface and the shift guide surface as a function of the axial movement of the idler and shift guide, assuming that the convex curve is substantially tangent to the guide wheel at the point of contact.

In still another embodiment, an automobile is disclosed, comprising an engine, a drivetrain; and a variable speed transmission comprising a longitudinal axis, a plurality of balls distributed radially about the longitudinal axis, each ball having a tiltable axis about which it rotates, a rotatable input disc positioned adjacent to the balls and in contact with each of the balls, a rotatable output disc positioned adjacent to the balls opposite the input disc and in contact with each of the balls, a rotatable idler having a substantially constant outer diameter coaxial about the longitudinal axis and positioned radially inward of and in contact with each of the balls, and a planetary gear set mounted coaxially about the longitudinal axis of the transmission.

In another embodiment, a continuously variable transmission is disclosed that is integrated with an electric motor, the stator of the electric motor attached to a rotating shaft which transfers power to the idler, and the rotor of the electric motor attached to the input disc. The stator and rotor of the electric motor rotate in opposite directions, creating a large speed differential and speed reduction to the output disc.

In another embodiment, a continuously variable transmission is disclosed that is integrated with a generator, the magnets of the rotor attached to a rotating hub shell, and the electric stator attached to a non-rotating stator of the transmission. Electricity is generated when the hub shell rotates relative to the stator.

In another embodiment, a continuously variable transmission is disclosed that is integrated with an electric motor and accepts an input from an outside torque transferring device, such as an internal combustion engine. The electric stator is attached to a rotating shaft which transfers power to the idler, the rotor is attached to a rotating cage of the transmission, and the internal combustion engine is operably attached to the input disc. The continuously variable transmission of this embodiment has three inputs into the balls and one output through the output disc.

In another embodiment, continuously variable transmission is disclosed that is integrated with an electric motor where the balls are constructed of a magnetic material and act as the rotor of an electric motor. Stationary windings surround the balls and produce electricity, which is routed through the cage of the transmission.

In still another embodiment, two alternative designs of an electric motor/generator are disclosed that rotate a continuously variable transmission.

In one aspect, the invention relates to an electromotive drive having a plurality of speed adjusters arranged angularly about an axis, a first disc in contact with the speed adjusters, and a second disc in contact with the speed adjusters, wherein the first and second discs are positioned relative to one another on opposite sides of the plurality of speed adjusters. The drive includes an idler in contact with the speed adjusters, the idler positioned radially inward of the speed adjusters. The drive further includes a plurality of magnets coupled to a first component of the electromotive drive, a plurality of electrical conductors coupled to a second component of the electromotive drive, and wherein the plurality of magnets and the plurality of electrical conductors are configured relative to one another to function as an electrical motor or as an electrical generator. The drive can be further configured such that the plurality of speed adjusters, the first and second discs, the plurality of magnets, and the plurality of conductors are operably coupled to provide at least one powerpath through the electromotive drive.

In one embodiment, the invention concerns an electromotive device having a plurality of balls arranged angularly about an axis, a first disc in contact with the balls, a second disc in contact with the balls, wherein the first and second discs are positioned relative to one another on opposite sides of the plurality of balls. The electromotive device can also include an idler in contact with the balls, the idler positioned radially inward of the balls. The electromotive device can be provided with an electrical stator configured to rotate about said axis, wherein the electrical stator is directly coupled to one of the first disc, second disc, or idler. The electromotive device can include an electrical rotor configured to rotate about said axis, wherein the electrical stator is directly coupled to one of the first disc, second disc, or idler. In one application, the electrical stator and the electrical rotor are configured relative to one another to together function as an electrical motor or as an electrical generator.

In another aspect, the invention relates to an electromotive transmission having a plurality of balls configured angularly about an axis, a first disc in contact with the balls, and a plurality of magnets attached to the first disc. The electromotive transmission can include an idler in contact with the balls and positioned radially inward of the balls, an idler shaft coupled rigidly to the idler, wherein the idler shaft and the idler are configured to rotate and translate axially with each other. The electromotive transmission in some embodiments includes a plurality of electrical conductors configured as windings or coils, and a stator mount coupled to the electrical conductors and configured to transfer torque to the idler shaft.

According to one aspect of the invention, an idler shaft and stator mount assembly for an electromotive device includes an idler shaft and a stator mount. The idler shaft includes a first bore adapted to receive at least one electrical conductor, a second bore adapted to house an electrical receptacle that couples to the electrical conductor, a slot (in communication with the first bore) that allows passage of the electrical conductor to an external side of the idler shaft. The idler shaft can also have a first plurality of axial grooves adapted to receive a plurality of bearings. The stator mount can include a bore having a plurality of grooves adapted to receive the plurality of bearings, whereby the stator mount is capable of transferring torque to or from the idler shaft. The stator mount is configured to support a plurality of electrical conductors.

In one embodiment, the invention concerns a hub shell for an electromotive transmission. The hub shell can have an inner diameter, an outer diameter, and a plurality of magnets coupled annularly to the inner diameter of the hub shell. Another aspect of the invention is directed to a shifter for a transmission. The shifter includes a shift screw coupled to a stationary component of the transmission, a shift nut, a shift ring coupled to the shift nut, a shift pin mount positioned between the shift nut and the shift ring, and a plurality of shift pins supported in the shift pin mount. The shift screw can include at least one slot for receiving the shift pins, and the shift nut is configured to translate axially on the shift screw and thereby actuate an axial shift of the shift pin mount and the shift pins. In one embodiment, the invention concerns a stator plate for an electromotive device having a plurality of speed adjusters. The stator plate includes a plurality of concave surfaces configured to support the plurality of speed adjusters radially and axially, a plurality of slots configured to support the plurality of speed adjusters angularly, and a boss adapted to support a plurality of magnets.

Another aspect of the invention relates to an electromotive device having a plurality of power adjusters arranged angularly about an axis, a cage adapted to support the power adjusters radially and axially, a plurality of electrical coils coupled to the cage, a rotatable hub shell, and a plurality of magnets coupled to the rotatable hub shell. In yet another embodiment, the invention concerns an electromotive drive having a plurality of magnetized power adjusters arranged angularly about an axis, and a plurality of coils positioned between the power adjusters. In one embodiment, the invention is directed to an electromotive transmission having a plurality of generally toroidal electrical conductors arranged angularly about an axis, a plurality of generally toroidal magnets arranged angularly about said axis, a first disc coupled to the magnets, a plurality of power adjusters arranged angularly about said axis and in contact with the first disc, a stator mount configured to support the electrical conductors, and an idler shaft configured to transfer torque to or from the stator mount.

In one embodiment, the invention relates to an electrical assembly for an electromotive transmission. The electrical assembly includes a first set of generally toroidal magnets arranged angularly about an axis, a plurality of generally toroidal electrical conductors arranged angularly about said axis, a second set of generally toroidal magnets arranged angularly about said axis, and wherein the electrical conductors are positioned between the first and second set of magnets.

In some aspects, the invention concerns an electromechanical transmission that includes a plurality of speed adjusters arranged angularly about an axis, an idler in contact with the plurality of speed adjusters and positioned radially inward of the speed adjusters, a first disc in contact with the speed adjusters, and a plurality of magnets coupled to the first disc. The transmission can include means for transferring torque to the first disc from an external source, a rotatable cage configured to support the speed adjusters radially and axially, and a plurality of electrical conductors coupled to the rotatable cage.

One embodiment of the invention is directed to a method of transmitting power in an electromechanical device. The method includes mounting an electrical stator on a rotatable shaft, mounting an electrical rotor on a first rotatable disc, coupling an idler to the shaft, and providing electrical power to the electrical stator. The method can further include transmitting torque generated by the interaction between the stator and the rotor, wherein the torque is transmitted from the stator to the shaft, wherein torque is transmitted from the rotor to the first rotatable disc. The method can also include transmitting torque to a second rotatable disc via a plurality of speed adjusters coupled to the first and second discs and the idler.

In some embodiments, the invention pertains to an electromotive drive having a plurality of speed adjusters arranged angularly about an axis, a first disc in contact with the speed adjusters, and a second disc in contact with the speed adjusters. The drive can have an idler in contact with the speed adjusters and positioned radially inward of the speed adjusters, and an idler shaft rigidly coupled to the idler. The drive can include a rotatable cage configured to support radially and axially the speed adjusters, a plurality of magnets rotationally coupled to the cage, and a plurality of electrical conductors coupled to the idler shaft.

In another aspect, the invention relates to a method of transmitting power in an electromechanical device. The method includes mounting an electrical stator on a rotatable shaft, mounting an electrical rotor on a first rotatable disc, transmitting torque from the shaft to the stator, and transmitting torque from the first rotatable disc to the rotor. In yet another embodiment, the invention pertains to a method of transmitting electromechanical power. The method includes providing rotatable shaft, coupling the rotatable shaft to an electrical stator, and providing a rotatable cage, wherein the cage is adapted to radially and axially support a plurality of speed adjusters. The method further includes coupling the rotatable cage to an electrical rotor. In yet another aspect, the invention is directed to a method of providing a transmission with electrical functionality. The method includes providing plurality of magnetized speed adjusters, the speed adjusters positioned angularly about an axis, and providing a plurality of electrical conductors positioned between individual speed adjusters.

In one embodiment, the invention concerns a method of electromechanical power transmission. The method includes providing a plurality of speed adjusters positioned angularly about an axis, providing cage adapted to support axially and radially the speed adjusters, providing a first disc in contact with the speed adjusters, and providing a second disc in contact with the speed adjusters. The method can further include providing an idler in contact with the speed adjusters and positioned radially inward of the speed adjusters, and providing an idler shaft coupled to the idler. The method can further include coupling a plurality of electrical conductors to the cage, speed adjusters, first disc, second disc, idler, or idler shaft. The method can further include coupling a plurality of magnets to the cage, speed adjusters, first disc, second disc, idler, or idler shaft.

Yet another feature of the invention pertains to a method of power transmission. The method includes providing a continuously variable transmission (CVT), coupling an electrical stator to a first rotatable component of the CVT, and coupling an electrical rotor to a second rotatable component of the CVT. Another aspect of the invention concerns an electromechanical device having a transmission, an electrical rotor coupled to rotate with a first rotatable component of the transmission, and an electrical stator coupled to rotate with a second rotatable component of the transmission.

These and other improvements will become apparent to those skilled in the art as they read the following detailed description and view the enclosed figures.

DETAILED DESCRIPTION OF THE PREFERRED EMBODIMENT

Embodiments of the invention will now be described with reference to the accompanying figures, wherein like numerals refer to like elements throughout. The terminology used in the description presented herein is not intended to be interpreted in any limited or restrictive manner simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

The transmissions described herein are of the type that utilize speed adjuster balls with axes that tilt as described in U.S. Pat. Nos. 6,241,636, 6,322,475, and 6,419,608, which patents are hereby incorporated herein by reference. The embodiments described in these patents and those described herein typically have two sides generally separated by a variator portion, to be described below, an input side and an output side. For convenience, the driving side of the transmission (that is, the side that receives the torque into the transmission) is termed the input side, and the driven side of the transmission (or the side that transfers the torque from the transmission out of the transmission) is termed the output side.

An input disc and an output disc are in contact with the speed adjuster balls. As the balls tilt on their axes, the point of rolling contact on one disc moves toward the pole or axis of the ball, where it contacts the ball at a circle of decreasing diameter, and the point of rolling contact on the other disc moves toward the equator of the ball, thus contacting the disc at a circle of increasing diameter. If the axis of the ball is tilted in the opposite direction, the input and output discs respectively experience the converse relationship. In this manner, the ratio of rotational speed of the input disc to that of the output disc, or the transmission ratio, can be changed over a wide range by simply tilting the axes of the speed adjuster balls.

The centers of the balls define the border between the input side and the output side of the transmission and similar components that are located on both the input side of the balls and the output side of the balls are generally described herein with the same reference numbers. Similar components located on both the input and output sides of the transmission generally have the suffix "a" attached at the end of the reference number if they are located on the input side, and the components located on the output side of the transmission generally have the suffix "b" attached at the end of their respective reference numbers.

Figure 1:
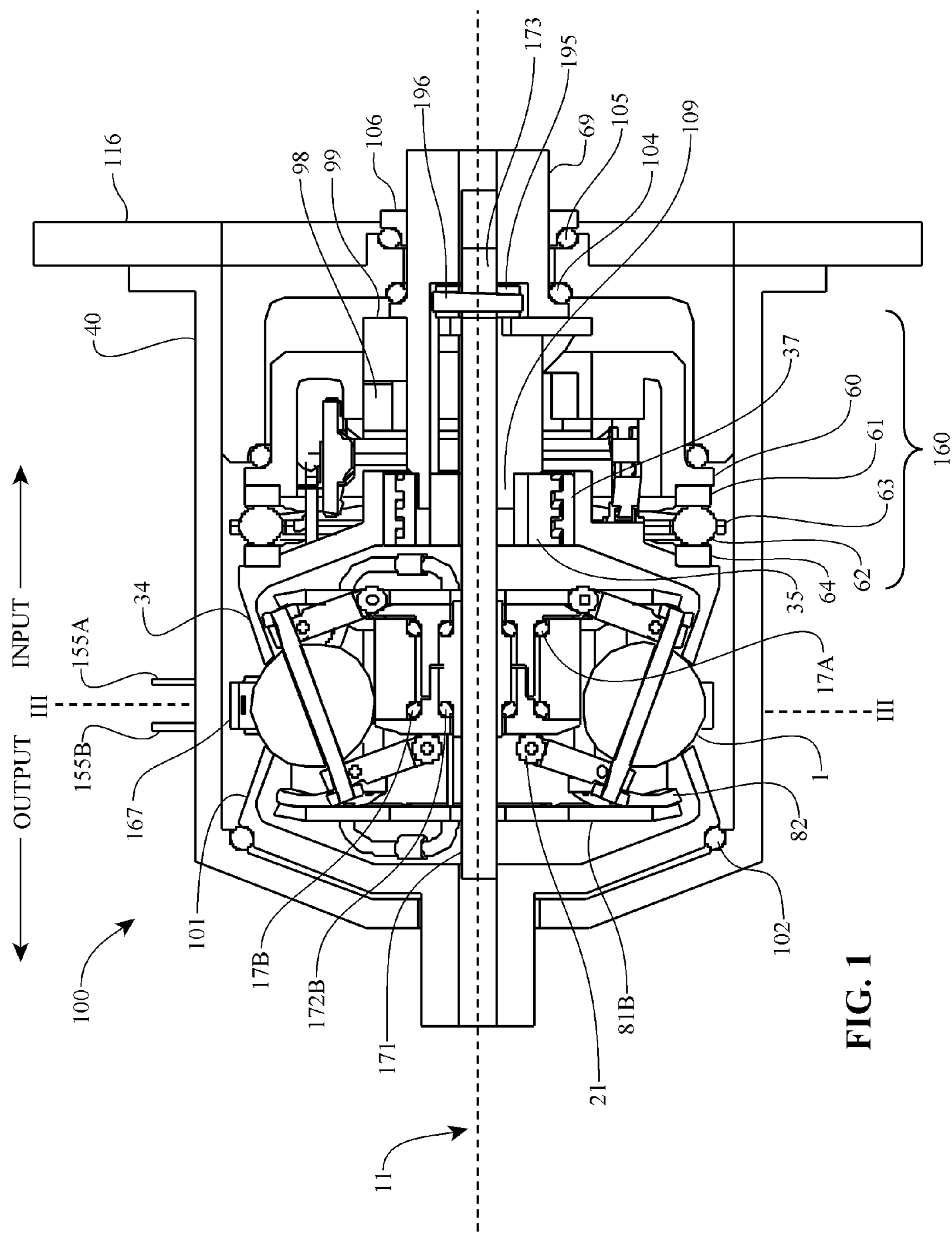
FIG. 1 is a cutaway side view of an embodiment of the transmission shifted into high.

Referring to FIG. 1, an embodiment of a transmission 100 is illustrated having a longitudinal axis 11 about which multiple speed adjusting balls 1 are radially distributed. The speed adjusting balls 1 of some embodiments stay in their angular positions about the longitudinal axis 11, while in other embodiments the balls 1 are free to orbit about the longitudinal axis 11. The balls 1 are contacted on their input side by an input disc 34 and on their output side by an output disc 101. The input and output discs 34, 101 are annular discs extending from an inner bore near the longitudinal axis on their respective input and output sides of the balls 1 to a radial point at which they each make contact with the balls 1. The input and output discs 34, 101 each have a contact surface that forms the contact area between each disc 34 and 101, and the balls 1. In general, as the input disc 34 rotates about the longitudinal axis 11, each portion of the contact area of the input disc 34 rotates and sequentially contacts each of the balls 1 during each rotation. This is similar for the output disc 101 as well.

The input disc 34 and the output disc 101 can be shaped as simple discs or can be concave, convex, cylindrical or any other shape, depending on the configuration of the input and output desired. In one embodiment the input and output discs are spoked to make them lighter for weight sensitive applications. The rolling contact surfaces of the discs where they engage the speed adjuster balls can have a flat, concave, convex or other shaped profile, depending on the torque and efficiency requirements of the application. A concave profile where the discs contact the balls decreases the amount of axial force required to prevent slippage while a convex profile increases efficiency. Additionally, the balls 1 all contact an idler 18 on their respective radially innermost point.

The idler 18 is a generally cylindrical component that rests coaxially about the longitudinal axis 11 and assists in maintaining the radial position of the balls 1. With reference to the longitudinal axis 11 of many embodiments of the transmission, the contact surfaces of the input disc 34 and the output disc 101 can be located generally radially outward from the center of the balls 1, with the idler 18 located radially inward from the balls 1, so that each ball 1 makes three-point contact with the idler 18, the input disc 34, and the output disc 101. The input disc 34, the output disc 101, and the idler 18 can all rotate about the same longitudinal axis 11 in many embodiments, and are described in fuller detail below.

Due to the fact that the embodiments of transmissions 100 described herein are rolling traction transmissions, in some embodiments, high axial forces are required to prevent slippage of the input disc 34 and output disc 101 at the ball 1 contacts. As axial force increases during periods of high torque transfer, deformation of the contact patches where the input disc 34, the output disc 101, and the idler 18 contact the balls 1 becomes a significant problem, reducing efficiency and the life of these components. The amount of torque that can be transferred through these contact patches is finite and is a function of the yield strength of the material from which the balls 1, the input disc, 34, the output disc 101, and the idler 18 are made. The friction coefficient of the balls 1, the input disc, 34, the output disc 101, and the idler 18 has a dramatic effect on the amount of axial force required to transfer a given amount of torque and thus greatly affects the efficiency and life of the transmission. The friction coefficient of the rolling elements in a traction transmission is a very important variable affecting performance.

Certain coatings may be applied to the surfaces of the balls 1, the input disc, 34, the output disc 101, and the idler 18 to improve their performance. In fact, such coatings can be used advantageously on the rolling contacting elements of any rolling traction transmission to achieve the same added benefits that are achieved for the embodiments of transmissions described herein. Some coatings have the beneficial effect of increasing the friction coefficient of the surfaces of these rolling elements. Some coatings have a high friction coefficient and display a variable coefficient of friction, which increases as axial force increases. A high friction coefficient allows less axial force to be required for a given torque, thereby increasing efficiency and life of the transmission. A variable coefficient of friction increases the maximum torque rating of the transmission by decreasing the amount of axial force required to transfer this maximum torque.

Some coatings, such as ceramics and cermets, possess excellent hardness and wear properties, and can greatly extend the life of the highly loaded rolling elements in a rolling traction transmission. A ceramic coating such as silicon nitride can have a high friction coefficient, a variable coefficient of friction which increases as axial force increases, and can also increase the life of the balls 1, the input disc, 34, the output disc 101, and the idler 18 when applied to the surfaces of these components in a very thin layer. The coating thickness depends on the material used for the coating and can vary from application to application but typically is in the range of 0.5 microns to 2 microns for a ceramic and 0.75 microns to 4 microns for a cermet.

The process used to apply the coating is important to consider when the balls 1, the input disc, 34, the output disc 101, and the idler 18 are made from hardened steel, which is the material used in many embodiments of the transmissions described herein. Some processes used to apply ceramics and cermets require high temperatures and will lower the hardness of the balls 1, the input disc, 34, the output disc 101, and the idler 18, harming performance and contributing to premature failure. A low temperature application process is desirable and several are available, including low temperature vacuum plasma, DC pulsed reactive magnetron sputtering, plasma-enhanced chemical vapor deposition (PE-CVD), unbalanced magnetron physical vapor deposition, and plating. The plating process is attractive due to its low cost and because a custom bath can be created to achieve desired coating properties. Immersing the rolling elements in a bath of silicon carbide or silicon nitride with co-deposited electroless nickel or electroplated nickel with silicon carbide or silicon nitride is a low temperature solution that is well suited for high volume production. It should be noted that other materials can be used in addition to those mentioned. With this application process, the parts are contained in a cage, immersed in the bath, and shaken so that the solution contacts all surfaces. Thickness of the coating is controlled by the length of time that the components are immersed in the bath. For instance, some embodiments will soak the components using silicon nitride with co-deposited electroless nickel for four (4) hours to achieve the proper coating thickness, although this is just an example and many ways to form the coating and control its thickness are known and can be used taking into account the desired properties, the desired thickness and the substrate or base metal of which the components are made.

Figure 2:
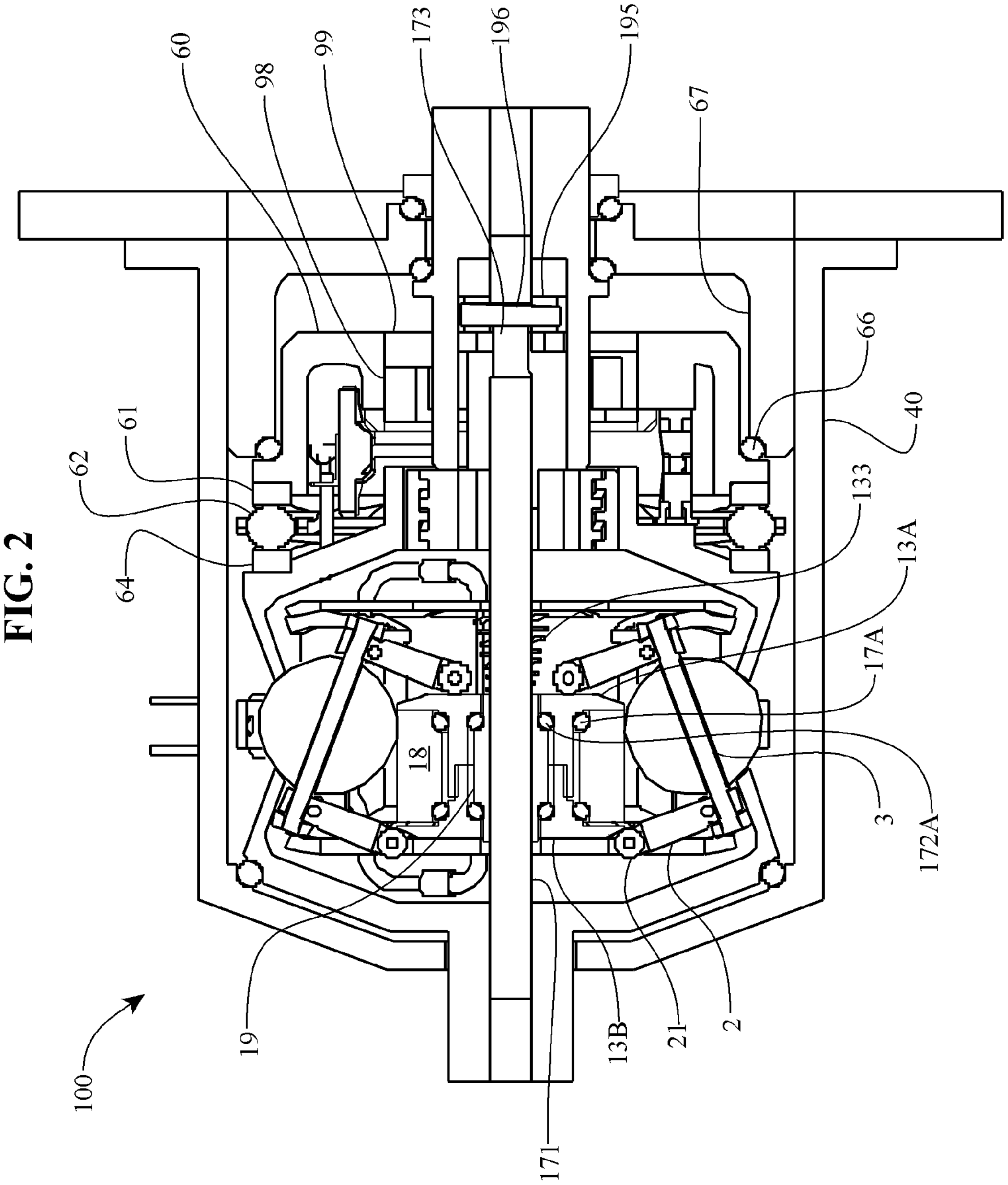
FIG. 2 is a cutaway side view of the transmission of FIG. 1 shifted into low.
Figure 3:
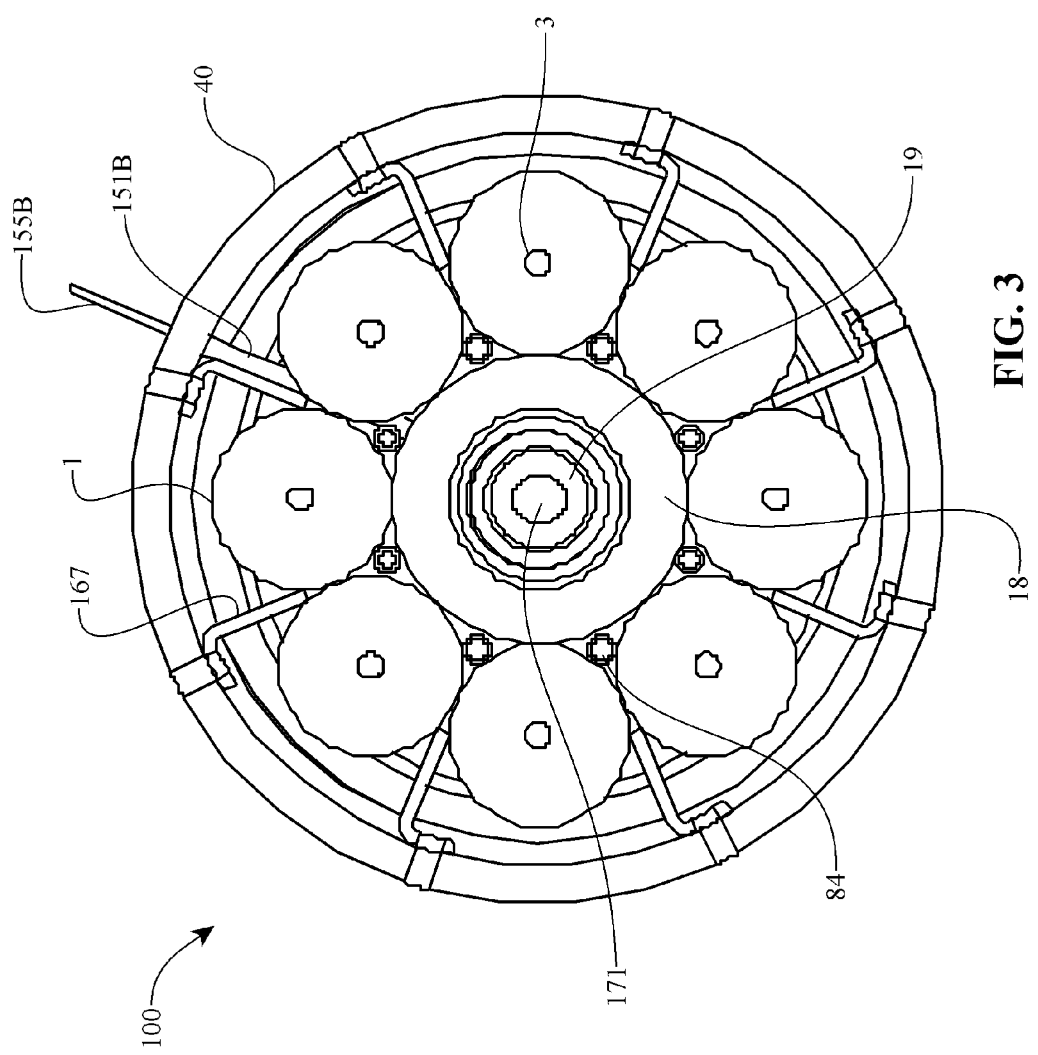
FIG. 3 is a partial end cross-sectional view of the transmission taken on line III-III of FIG. 1.

FIGS. 1, 2, and 3 illustrate an embodiment of a continuously variable transmission 100 that is shrouded in a case 40 which protects the transmission 100, contains lubricant, aligns components of the transmission 100, and absorbs forces of the transmission 100. A case cap 67 can, in certain embodiments, cover the case 40. The case cap 67 is generally shaped as a disc with a bore, through its center through which an input shaft passes, and that has a set of threads at its outer diameter that thread into a corresponding set of threads on the inner diameter of the case 40. Although in other embodiments, the case cap 67 can be fastened to the case 40 or held in place by a snap ring and corresponding groove in the case 40, and would therefore not need to be threaded at its outer diameter. In embodiments utilizing fasteners to attach the case cap 67, the case cap 67 extends to the inside diameter of the case 40 so that case fasteners (not shown) used to bolt the case 40 to the machinery to which the transmission 100 is attached can be passed through corresponding holes in the case cap 67. The case cap 67 of the illustrated embodiment has a cylindrical portion extending from an area near its outer diameter toward the output side of the transmission 100 for additional support of other components of the transmission 100. At the heart of the illustrated transmission 100 embodiment is a plurality of balls 1 that are typically spherical in shape and are radially distributed substantially evenly or symmetrically about the centerline, or longitudinal axis 11 of rotation of the transmission 100. In the illustrated embodiment, eight balls 1 are used. However, it should be noted that more or fewer balls 1 could be used depending on the use of the transmission 100. For example, the transmission may include 3, 4, 5, 6, 7, 8, 9, 10, 11, 12, 13, 14, 15 or more balls. The provision for more than 3, 4, or 5 balls can more widely distribute the forces exerted on the individual balls 1 and their points of contact with other components of the transmission 100 and can reduce the force necessary to prevent the transmission 100 from slipping at the ball 1 contact patches. Certain embodiments in applications with low torque but a high transmission ratio use few balls 1 of relatively larger diameters, while certain embodiments in applications with high torque and a high transmission ratio can use more balls 1 or relatively larger diameters. Other embodiments, in applications with high torque and a low transmission ratio and where high efficiency is not important, use more balls 1 of relatively smaller diameters. Finally, certain embodiments, in applications with low torque and where high efficiency is not important, use few balls 1 of relatively smaller diameters.

Ball axles 3 are inserted through holes that run through the center of each of the balls 1 to define an axis of rotation for each of the balls 1. The ball axles 3 are generally elongated shafts over which the balls 1 rotate, and have two ends that extend out of either side of the hole through the balls 1. Certain embodiments have cylindrically shaped ball axles 3, although any shape can be used. The balls 1 are mounted to rotate freely about the ball axles 3.

In certain embodiments, bearings (not separately illustrated) are utilized to reduce the friction between the outer surface of the ball axles 3 and the surface of the bore through the corresponding ball 1. These bearings can be any type of bearings situated anywhere along the contacting surfaces of the balls 1 and their corresponding ball axles 3, and many embodiments will maximize the life and utility of such bearings through standard mechanical principles common in the design of dynamic mechanical systems. In same of these embodiments, radial bearings are located at each end of the bore through the balls 1. These bearings can incorporate the inner surface of the bore or the outer surface of the ball axles 3 as their races, or the bearings can include separate races that fit in appropriate cavities formed in the bore of each ball 1 and on each ball axle 3. In one embodiment, a cavity (not shown) for a bearing is formed by expanding the bore through each ball 1 at least at both ends an appropriate diameter such that a radial bearing, roller, ball or other type, can be fitted into and held within the cavity thus formed. In another embodiment, the ball axles 3 are coated with a friction reducing material such as babbitt, Teflon or other such material.

Many embodiments also minimize the friction between the ball axles 3 and the balls 1 by introducing lubrication in the bore of the ball axles 3. The lubrication can be injected into the bore around the ball axles 3 by a pressure source, or it can be drawn into the bore by the rifling or helical grooves formed on the ball axles 3 themselves. Further discussion of the lubrication of the ball axles 3 is provided below.

In FIG. 1, the axes of rotation of the balls 1 are shown tilted in a direction that puts the transmission in a high ratio, wherein the output speed is greater than the input speed. If the ball axles 3 are horizontal, that is parallel to the main axis of the transmission 100, the transmission 100 is in a 1:1 input rotation rate to output rotation rate ratio, wherein the input and output rotation speeds are equal. In FIG. 2, the axes of rotation of the balls 1 are shown tilted in a direction where the transmission 100 is in a low ratio, meaning the output rotation speed is slower than the input rotation speed. For the purpose of simplicity, only the parts that change position or orientation when the transmission 100 is shifted are numbered in FIG. 2.

Figure 4:
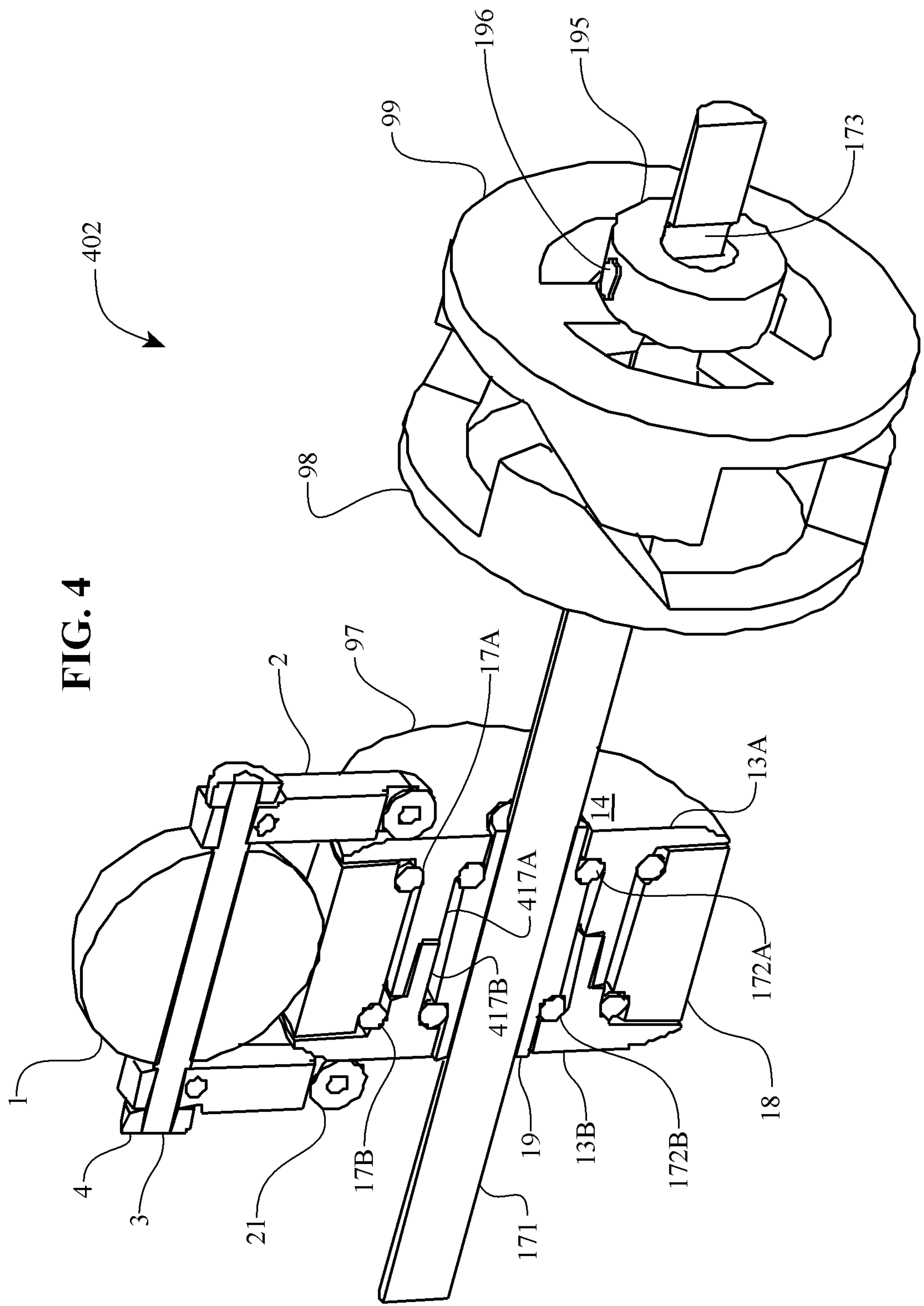
FIG. 4 is a schematic cutaway side view of the idler and ramp sub-assembly of the transmission of FIG. 1.
Figure 5:
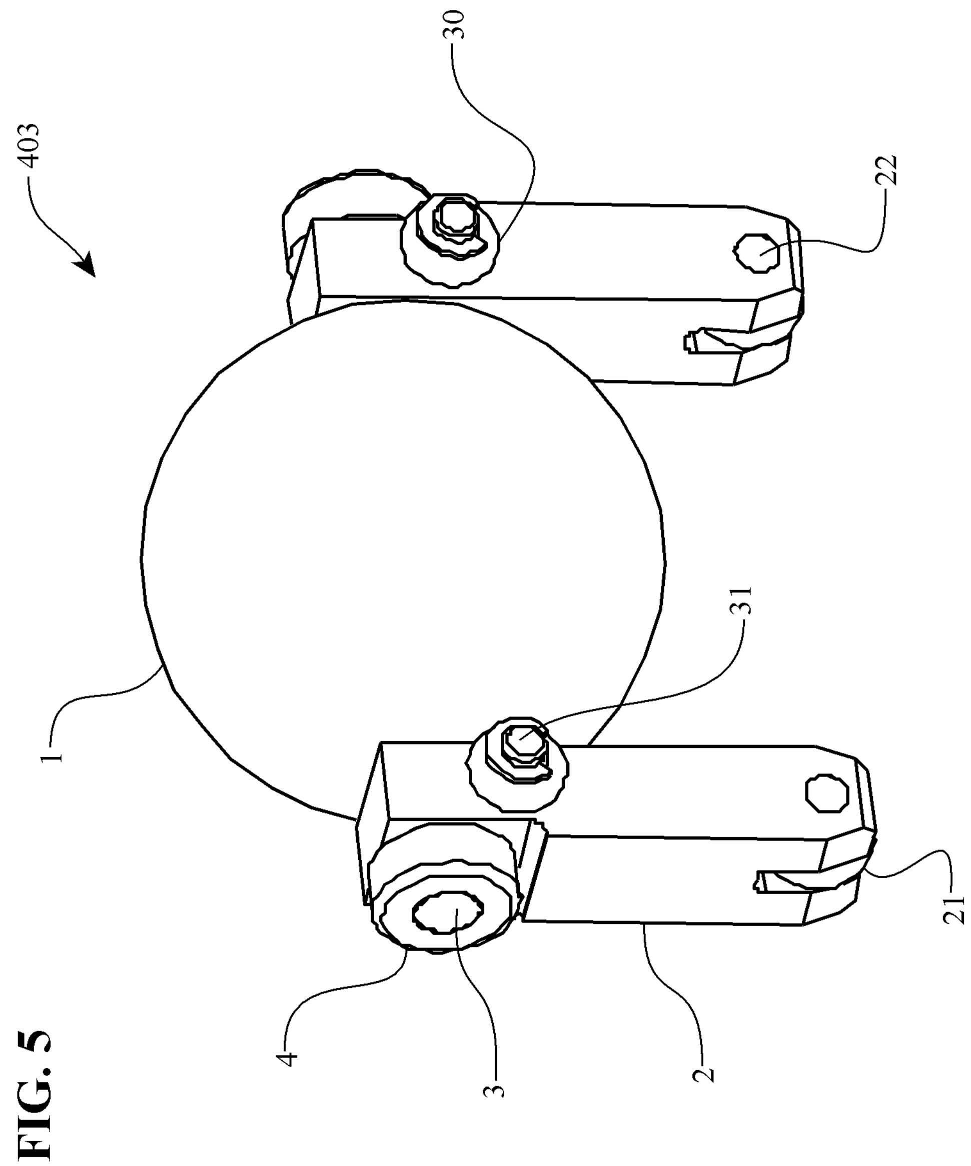
FIG. 5 is a schematic perspective view of the ball sub-assembly of the transmission of FIG. 1.
Figure 7:
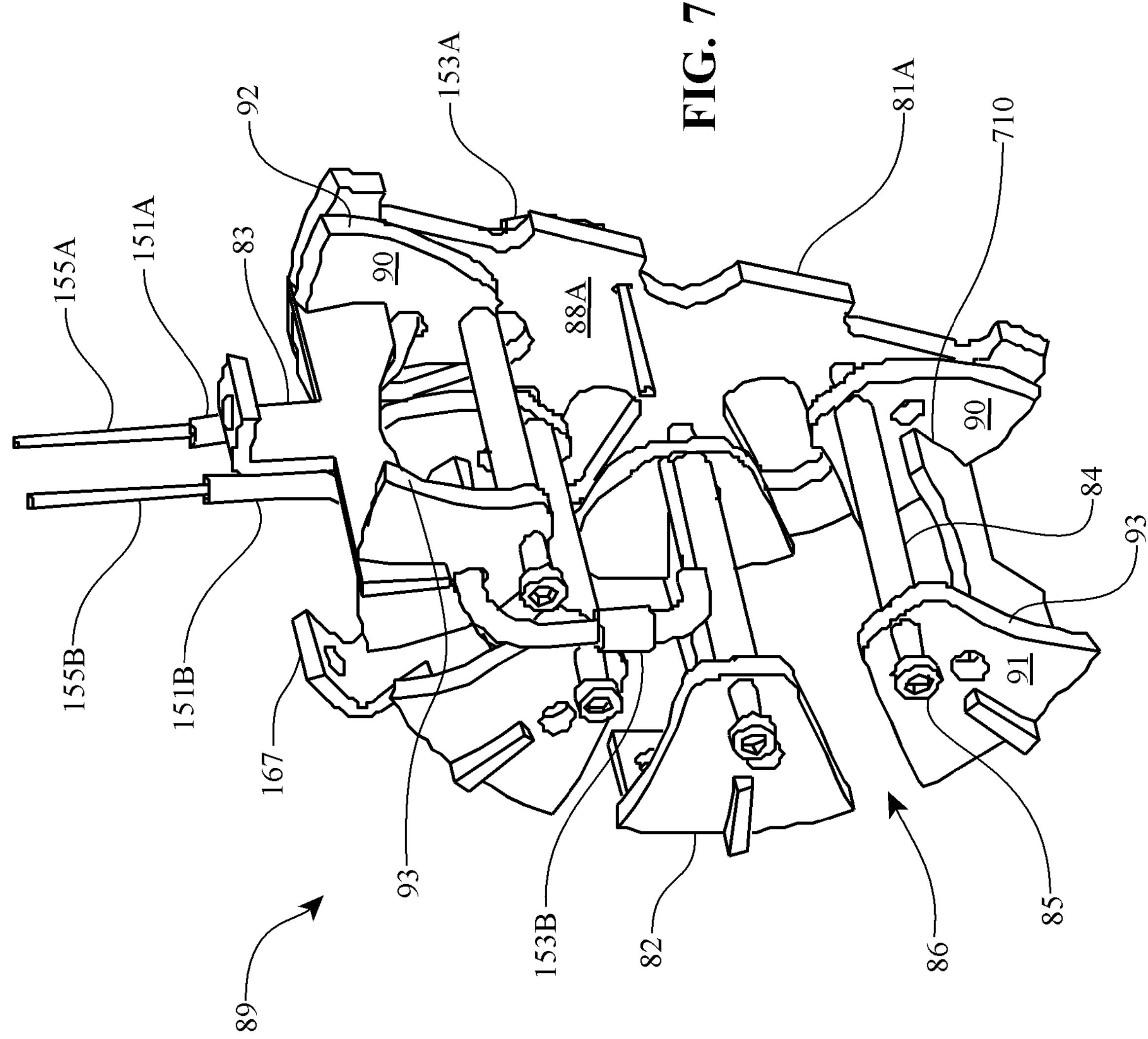
FIG. 7 is a schematic cutaway side view of the cage sub-assembly of the transmission of FIG. 1.

FIGS. 1, 2, 4, and 5 illustrate how the axes of the balls 1 can be tilted in operation to shift the transmission 100. Referring to FIG. 5, a plurality of legs 2, which in most embodiments are generally struts, are attached to the ball axles 3 near each of the ends of the ball axles 3 that extend beyond the ends of the holes bored through the balls 1. Each leg 2 extends from its point of attachment to its respective ball axle 3 radially inward toward the axis of the transmission 100. In one embodiment, each of the legs 2 has a through bore that receives a respective end of one of the ball axles 3. The ball axles 3 preferably extend through the legs 2 such that they have an end exposed beyond each leg 2. In the illustrated embodiments, the ball axles 3 advantageously have rollers 4 coaxially and slidingly positioned over the exposed ends of the ball axles 3. The rollers 4 are generally cylindrical wheels fitted over the ball axles 3 outside of and beyond the legs 2 and rotate freely about the ball axles 3. The rollers 4 can be attached to the ball axles 3 via spring clips or other such mechanism, or they can ride freely over the ball axles 3. The rollers 4 can be radial bearings for instance, where the outer races of the bearings form the wheel or rolling surface. As illustrated in FIGS. 1 and 7, the rollers 4 and the ends of the ball axles 3 fit inside grooves 86 formed by or in a pair of stators 80*a*, 80*b*.

The stators 80*a*, 80*b* of one embodiment are illustrated in FIGS. 5 and 7. The illustrated input stator 80*a* and output stator 80*b* are generally in the form of parallel discs annularly located about the longitudinal axis 11 of the transmission on either side of the balls 1. The stators 80*a*, 80*b* of many embodiments are comprised of input stator discs 81*a* and output stator discs 81*b*, respectively, which are generally annular discs of substantially uniform thickness with multiple apertures to be discussed further below. Each input and output stator disc 81*a*, 81*b* has a first side that faces the balls 1 and a second side that faces away from the balls 1. Multiple stator curves 82 are attached to the first side of the stator discs 81*a*, 81*b*. The stator curves 82 are curved surfaces attached or affixed to the stator discs 81*a*, 81*b* that each has a concave face 90 facing toward the balls 1 and a convex face 91 facing away from the balls 1 and contacting their respective stator discs 81. In some embodiments, the stator curves 82 are integral with the stator discs 81*a*, 81*b*. The stator curves 82 of many embodiments have a substantially uniform thickness and have at least one aperture (not separately shown) used to align and attach the stator curves 82 to each other and to the stator discs 81. The stator curves 82 of many embodiments, or the stator discs 81*a*, 81*b* where integral parts are used, include a slot 710 that accepts a flat spacer 83, which allows further positioning and alignment of the stator curves 82 and stator discs 81*a*, 81*b*. The flat spacers 83 are generally flat and generally rectangular pieces of rigid material that extend between and interconnect the input stator 80*a* and the output stator 80*b*. The flat spacers 83 fit within the slots 710 formed in the stator curves 82. In the illustrated embodiment, the flat spacers 83 are not fastened or otherwise connected to the stator curves 82; however, in some embodiments the flat spacers 83 are attached to the stator curves 82 by welding, adhesive, or fastening.

Also illustrated in FIG. 7, multiple cylindrical spacers 84, of a generally cylindrical shape with bores at least in each end, are radially positioned inside of the flat spacers 83 and also connect and position the stator discs 81 and stator curves 82. The bores of the cylindrical spacers 84 accept one spacer fastener 85 at each end. The spacer fasteners 85 are designed to clamp and hold the stator discs 81*a*, 81*b*, the stator curves 82, the flat spacers 83, and the cylindrical spacers 84 together, which collectively form the cage 89. The cage 89 maintains the radial and angular positions of the balls 1 and aligns the balls 1 with respect to one another.

The rotational axes of the balls 1 are changed by moving either the input-side or output-side legs 2 radially out from the axis of the transmission 100, which tilts the ball axles 3. As this occurs, each roller 4 fits into and follows a groove 86, which is slightly larger than the diameter of the roller 4, and is formed by the space between each pair of adjacent stator curves 82. The rollers 4 therefore roll along the surface of the sides 92, 93 of the stator curves 82, a first side 92 and a second side 93 for each stator curve 82, in order to maintain the plane of movement of the ball axles 3 in line with the longitudinal axis 11 of the transmission 100. In many embodiments, each roller 4 rolls on a first side 92 of the stator curve 82 on the input side of the transmission 100 and on the corresponding first side 92 of the corresponding output stator curve 82. Typically, in such embodiments, the forces of the transmission 100 prevent the rollers 4 from contacting the second side 93 of the stator curves 82 in normal operation. The rollers 4 are slightly smaller in diameter than the width of the grooves 86 formed between the stator curves 82, forming a small gap between the edges of the grooves 86 and the circumference of each corresponding roller. If the opposing sets of stator curves 82 on the input stator 80*a* and output stator 80*b* were in perfect alignment, the small gap between the circumferences of the rollers 4 and the grooves 86 would allow the ball axles to slightly tilt and become misaligned with the longitudinal axis 11 of the transmission 100. This condition produces sideslip, a situation where the balls axles 3 are allowed to move slightly laterally, which lowers overall transmission efficiency. In some embodiments, the stator curves 82 on the input and output sides of the transmission 100 may be slightly offset from each other so that the ball axles 3 remain parallel with the axis of the transmission 100. Any tangential force, mainly a transaxial force, the balls 1 may apply to the ball axles 3 is absorbed by the ball axles 3, the rollers 4 and the first sides 92, 93 of the stator curves 82. As the transmission 100 is shifted to a lower or higher transmission ratio by changing the rotational axes of the balls 1, each one of the pairs of rollers 4, located on the opposite ends of a single ball axle 3, move in opposite directions along their respective corresponding grooves 86 by rolling up or down a respective side of the groove 86.

Referring to FIGS. 1 and 7, the cage 89 can be rigidly attached to the case 40 with one or more case connectors 160. The case connectors 160 extend generally perpendicularly from the radial outermost part of the flat spacers 83. The case connectors 160 can be fastened to the flat spacers 83 or can be formed integrally with the flat spacers 83. The outside diameter formed roughly by the outsides of the case connectors 160 is substantially the same dimension as the inside diameter of the case 40 and holes in both the case 40 and case connectors 160 provide for the use of standard or specialty fasteners, which rigidly attach the case connectors 160 to the case 40, thus bracing and preventing the cage 40 from moving. The case 40 has mounting holes providing for the attachment of the case 40 to a frame or other structural body. In other embodiments, the case connectors 160 can be formed as part of the case 40 and provide a location for attachment of the flat spacers 83 or other cage 89 component in order to mobilize the cage 89.

FIGS. 1, 5, and 7 illustrate an embodiment including a pair of stator wheels 30 attached to each of the legs 2 that roll on the concave face 90 of the curved surfaces 82 along a path near the edge of the sides 92, 93. The stator wheels 30 are attached to the legs 2 generally in the area where the ball axles 3 pass through the legs 2. The stator wheels 30 can be attached to the legs 2 with stator wheel pins 31, which pass through a bore through the legs 2 that is generally perpendicular to the ball axles 3, or by any other attachment method. The stator wheels 30 are coaxially and slidingly mounted over the stator wheel pins 31 and secured with standard fasteners, such as snap rings for example. In some embodiments, the stator wheels 30 are radial bearings with the inner race mounted to the stator wheel pins 31 and the outer race forming the rolling surface. In certain embodiments, one stator wheel 30 is positioned on each side of a leg 2 with enough clearance from the leg 2 to allow the stator wheels 30 to roll radially along the concave faces 90, with respect to the longitudinal axis 11 of the transmission 100, when the transmission 100 is shifted. In certain embodiments, the concave faces 90 are shaped such that they are concentric about a radius from the longitudinal axis 11 of the transmission 100 formed by the center of the balls 1.

Still referring to FIGS. 1, 5, and 7, guide wheels 21 are illustrated that can be attached to the end of the legs 2 that are nearest the longitudinal axis 11 of the transmission 100. In the illustrated embodiment, the guide wheels 21 are inserted into a slot formed in the end of the legs 2. The guide wheels 21 are held in place in the slots of the legs 21 with guide wheel pins 22, or by any other attachment method. The guide wheels 21 are coaxially and slidingly mounted over the guide wheel pins 22, which are inserted into bores formed in the legs 2 on each side of the guide wheels 21 and perpendicular to the plane of the slot. In some embodiments, the legs 2 are designed to deflect elastically relatively slightly in order to allow for manufacturing tolerances of the parts of the transmission 100. The ball 1, the legs 2, the ball axle 3, the rollers 4, the stator wheels 30, the stator wheel pins 31, the guide wheels 21, and the guide wheel pins 22 collectively form the ball/leg assembly 403 seen in FIG. 5.

Figure 6:
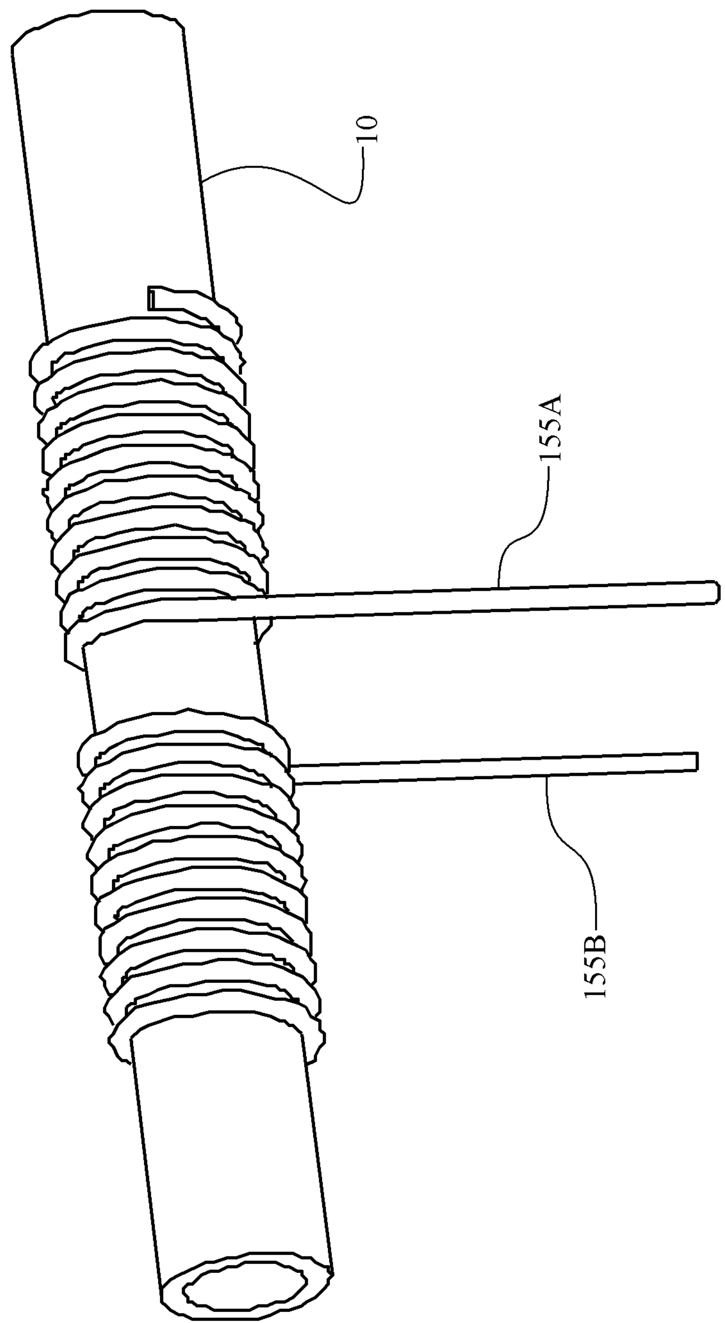
FIG. 6 is a schematic view of the shift rod sub-assembly of the transmission of FIG. 1.

Referring to the embodiment illustrated in FIGS. 4, 6, and 7, shifting is actuated by rotating a rod 10 that is positioned outside of the case 40. The rod 10 is utilized to wrap an unwrap a flexible input cable 155*a* and a flexible output cable 155*b* that are attached to, at their respective first ends, and wrapped around the rod 10, in opposite respective directions. In some embodiments, the input cable 155*a* is wrapped counter-clockwise around the rod 10 and the output cable 155*b* is wrapped clockwise around the rod 10, when looking from right to left as the rod 10 is illustrated in FIG. 6. Both the input cable 155*a* and the output cable 155*b* extend through holes in the case 40 and then through the first end of an input flexible cable housing 151*a*, and an output flexible cable housing 151*b*. The input flexible cable housing 151*a* and the output flexible cable housing 151*b* of the illustrated embodiment are flexible elongated tubes that guide the input cable 155*a* and output cable 155*b* radially inward toward the longitudinal axis 11 then longitudinally out through holes in the stator discs 81*a, b* and then again radially inward where the second end of the input and output flexible cable housings 151*a, b* are inserted into and attach to the first end of input and output rigid cable housings 153*a, b*, respectively. The input and output rigid cable housings 153*a, b*, are inflexible tubes through which the cables 155*a, b*, pass and are guided radially inward from the second ends of the flexible cable housings 151*a, b* and then direct the cables 155*a, b* longitudinally through holes in the stator discs 81*a, b* and toward a second end of the rigid cable housings 153*a, b* near the idler 18. In many embodiments, the cables 155*a, b* are attached at their second ends to an input shift guide 13*a*, and an output shift guide 13*b* (described further below) with conventional cable fasteners, or other suitable attachment means. As will be discussed further below, the shift guides 13*a*, 13*b* position the idler 18 axially along the longitudinal axis 11 and position the legs 3 radially, thereby changing the axes of the balls 1 and the ratio of the transmission 100.

If the rod 10 is rotated counter-clockwise, relative to the axis of the rod 10 from right to left as illustrated in FIG. 6, by the user, either manually or by or assisted with a power source, the input cable 155*a* unwinds from the rod 10 and the output cable 155*b* winds onto the rod 10. Therefore, the second end of the output cable 155*b* applies a tension force to the output shift guide 13*b* and the input cable 155*a* is unwinding a commensurate amount from the rod 10. This moves the idler 18 axially toward the output side of the transmission 100 and shifts the transmission 100 toward low.

Still referring to FIGS. 4, 5, and 7, the illustrated shift guides 13*a, b*, are each generally of the form of an annular ring with inside and outside diameters, and are shaped so as to have two sides. The first side is a generally straight surface that dynamically contacts and axially supports the idler 18 via two sets of idler bearings 17*a*, 17*b*, which are each associated with a respective shift guide 13*a, b*. The second side of each shift guide 13*a, b*, the side facing away from the idler 18, is a cam side that transitions from a straight or flat radial surface 14, towards the inner diameter of the shift guides 13*a, b*, to a convex curve 97 towards the outer diameter of the shift guides 13*a, b*. At the inner diameter of the shift guides 13*a, b* a longitudinal tubular sleeve 417*a, b* extends axially toward the opposing shift guide 13*a, b* in order to mate with the tubular sleeve 417*a, b* from that shift guide 13*a, b*. In some embodiments, as illustrated in FIG. 4, the tubular sleeve of the input side shift guide 13*a* has part of its inner diameter bored out to accept the tubular sleeve of the output shift guide 13*b*. Correspondingly, a portion of the outer diameter of the tubular sleeve of the output shift guide 13*b* has been removed to allow a portion of that tubular sleeve 417*a, b* to be inserted into the tubular sleeve 417*a, b* of the input shift guide 13*a*. This provides additional stability to the shift guides 13*a, b* of such embodiments.

The cross section side view of the shift guides 13*a, b* illustrated in FIG. 4 shows that, in this embodiment, the flat surface 14 profile of the side facing away from the is perpendicular to the longitudinal axis 11 up to a radial point where the guide wheels 21 contact the shift guides 13 *a, b*, if the ball axles 3 are parallel with the longitudinal axis 11 of the transmission 100. From this point moving out toward the perimeter of the shift guide 13*a, b* the profile of the shift guides 13*a, b* curves in a convex shape. In some embodiments, the convex curve 97 of a shift guide 13*a, b* is not a radius but is composed of multiple radii, or is shaped hyperbolically, asymptotically or otherwise. As the transmission 100 is shifted toward low, the input guide wheels 21*a*, roll toward the longitudinal axis 11 on the flat 14 portion of shift guide 13*a*, and the output guide wheels 21*b* roll on the convex curved 97 portion of the shift guide 13*b* away from the longitudinal axis 11. The shift guides 13*a, b*, can be attached to each other by either threading the tubular sleeve of the input shift guide 13*a* with male threads and the tubular sleeve of the output sleeve 13*b* with female threads, or vice versa, and threading the shift guides 13*a, b*, together. One shift guide 13*a, b*, either the input or output, can also be pressed into the other shift guide 13*a, b*. The shift guides 13 *a, b* can also be attached by other methods such as glue, metal adhesive, welding or any other means.

The convex curves 97 of the two shift guides 13*a, b*, act as cam surfaces, each contacting and pushing the multiple guide wheels 21. The flat surface 14 and convex curve 97 of each shift guide 13*a, b* contact the guide wheels 21 so that as the shift guides 13 *a, b*, move axially along the longitudinal axis 11, the guide wheels 21 ride along the shift guide 13*a, b* surface 14, 97 in a generally radial direction forcing the leg 2 radially out from, or in toward, the longitudinal axis 11, thereby changing the angle of the ball axle 3 and the rotational axis of the associated ball 1.

Referring to FIGS. 4 and 7, the idler 18 of some embodiments is located in a trough formed between the first sides and the sleeve portions of the shift guides 13 *a, b*, and thus moves in unison with the shift guides 13*a, b*. In certain embodiments, the idler 18 is generally tubular and of one outside diameter and is substantially cylindrical along the central portion of its inside diameter with an input and output idler bearing 17*a, b*, on each end of its inside diameter. In other embodiments, the outer diameter and inside diameters of the idler 18 can be non-uniform and can vary or be any shape, such as ramped or curved. The idler 18 has two sides, one near the input stator 80*a*, and one near the output stator 80*b*. The idler bearings 17*a*, 17*b* provide rolling contact between the idler 18 and the shift guides 13*a, b*. The idler bearings 17*a*, 17*b* are located coaxially around the sleeve portion of the shift guides 13*a, b*, allowing the idler 18 to rotate freely about the axis of the transmission 100. A sleeve 19 is fit around the longitudinal axis 11 of the transmission 100 and fitting inside the inside diameters of the shift guides 13*a, b*. The sleeve 19 is a generally tubular component that is held in operable contact with an inside bearing race surface of each of the shift guides 13*a, b* by an input sleeve bearing 172*a* and an output sleeve bearing 172*b*. The sleeve bearings 172*a, b*, provide for rotation of the sleeve 19 by rolling along an outer bearing race complimentary to the races of the shift guides 13*a, b*. The idler 18, the idler bearings 17*a*, 17*b*, the sleeve 19, the shift guides 13*a*, 13*b*, and the sleeve bearings 172*a*, 172*b* collectively form the idler assembly 402, seen in FIG. 4.

Figure 8:
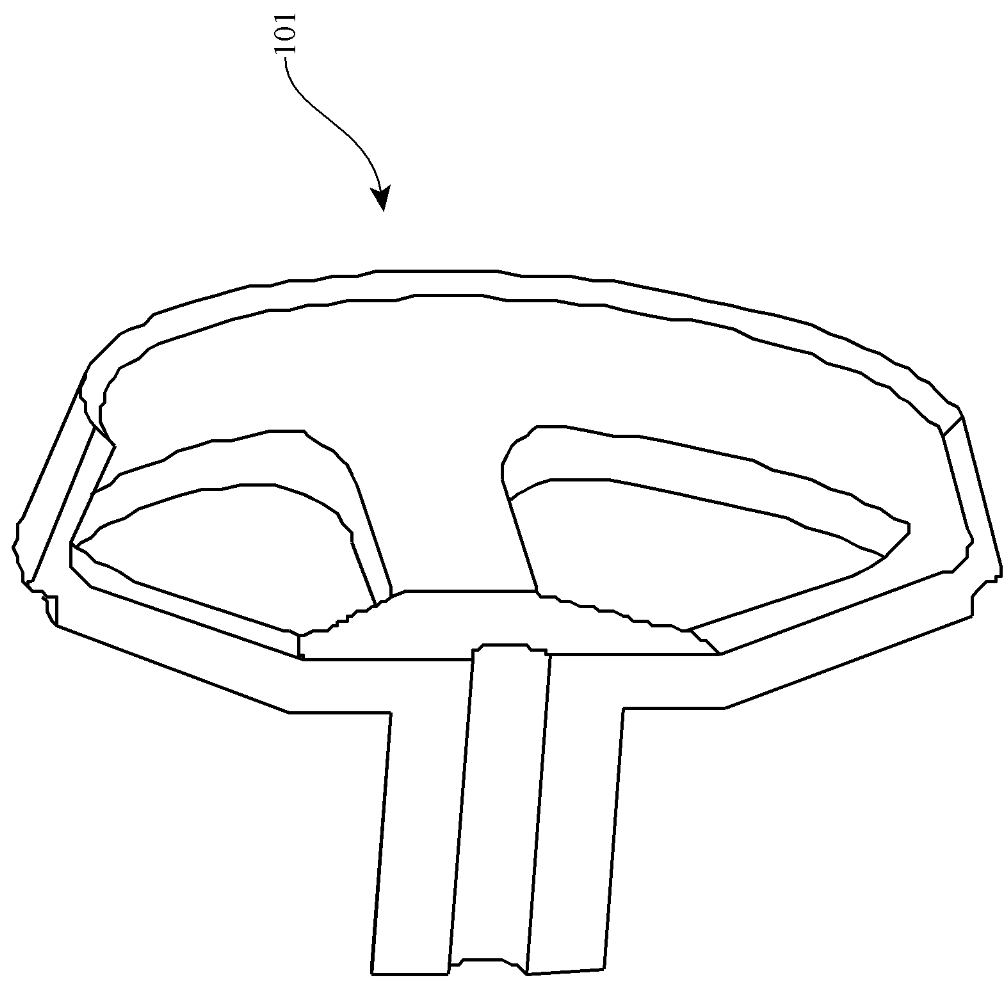
FIG. 8 is a cutaway side view of the output disc of the transmission of FIG. 1.

Referring to FIGS. 4, 7, and 8, the sleeve 19 of some embodiments has its inside diameter threaded to accept the threaded insertion of an idler rod 171. The idler rod 171 is a generally cylindrical rod that lies along the longitudinal axis 11 of the transmission 100. In some embodiments, the idler rod 171 is threaded at least partially along its length to allow insertion into the sleeve 19. The first end of the idler rod 171, which faces the output side of the transmission 100, is preferably threaded through the sleeve 19 and extends out past the output side of the sleeve 19 where it is inserted into the inside diameter of the output disc 101.

As illustrated in FIG. 8, the output disc 101 in some embodiments is generally a conical disc that is spoked to reduce weight and has a tubular sleeve portion extending from its inner diameter axially toward the output side of the transmission 100. The output disc 101 transfers the output torque to a drive shaft, wheel, or other mechanical device. The output disc 101 contacts the balls 1 on their output side and rotates at a speed different from the input rotation of the transmission at ratios other than 1:1. The output disc 101 serves to guide and center the idler rod 171 at its first end so that the sleeve 19, idler 18, and shift guides 13*a, b* stay concentric with the axis of the transmission 100. Alternately, an annular bearing may be positioned over the idler rod 171, between the idler rod 171 and the inside diameter of the output disc 101, to minimize friction. The idler rod 171, sleeve 19, shift guides 13*a, b*, and idler 18 are operably connected, and all move axially in unison when the transmission 100 is shifted.

Referring to FIG. 2, a conical spring 133, positioned between the input shift guide 13*a* and stator 80*a* biases the shifting of the transmission 100 toward low. Referring to FIG. 1, output disc bearings 102, which contact a bearing race near the perimeter of the output disc 101, absorb and transfer axial force generated by the transmission 100 to the case 40. The case 40 has a corresponding bearing race to guide the output disc bearings 102.

Figure 25:
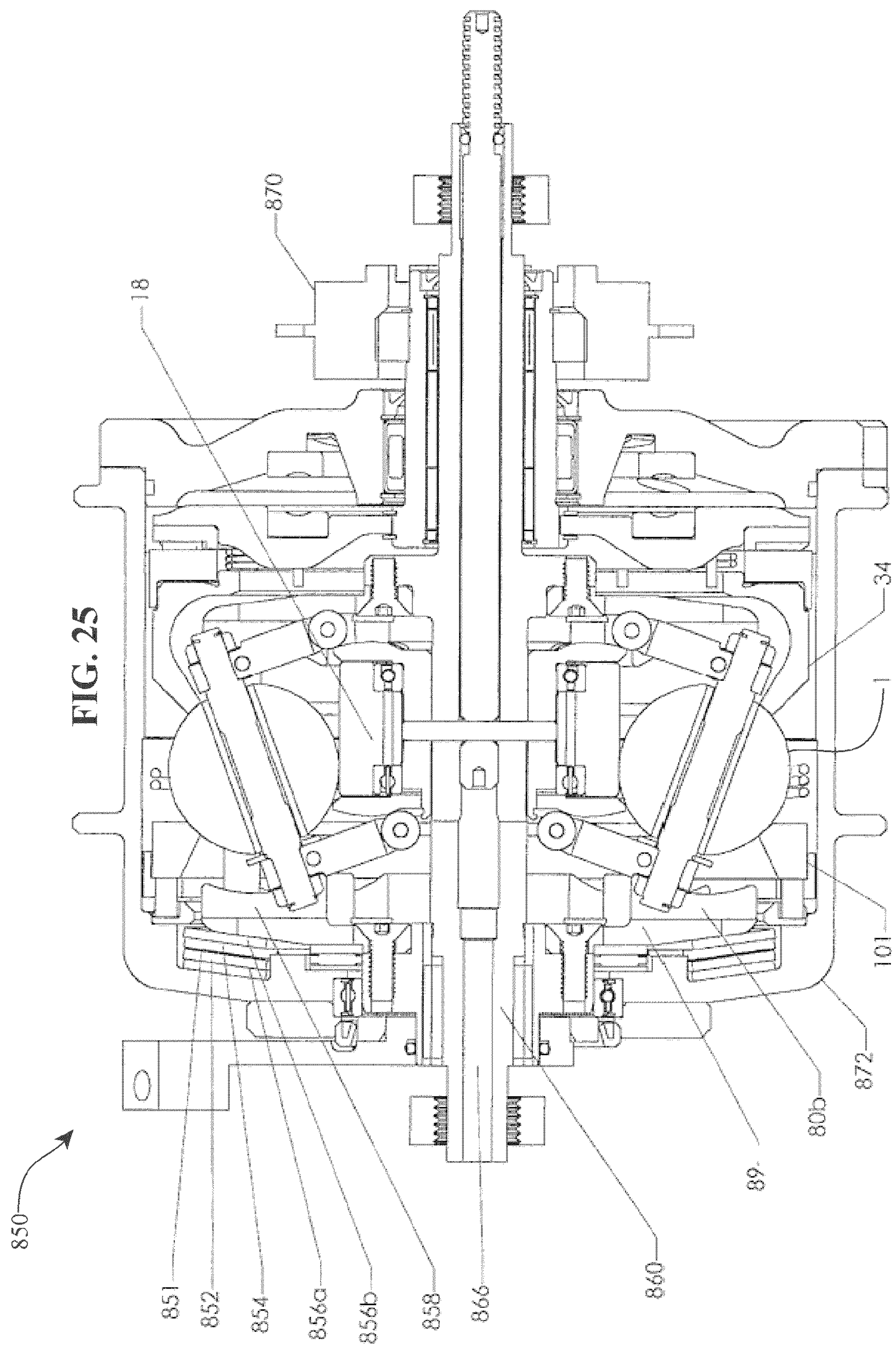
FIG. 25 is a cutaway side view of a transmission with an integrated generator.

Referring to FIGS. 4, 5, and 7, the limits of the axial movement of the shift guides 13*a, b* define the shifting range of the transmission 100. Axial movement is limited by inside faces 88*a, b*, on the stator discs 81*a, b*, which the shift guides 13*a, b*, contact. At an extreme high transmission ratio, shift guide 13*a* contacts the inside face 88*a* on the input stator discs 81*a*, and at an extreme low transmission ratio, the shift guide 13*b* contacts the inside face 88 on the output stator disc 81*b*. In many embodiments, the curvature of the convex curves 97 of the shift guides 13*a, b*, is functionally dependent on the distance from the center of a ball 1 to the center of the guide wheel 21, the radius of the guide wheel 21, the angle between lines formed between the two guide wheels 21 and the center of the ball 1, and the angle of tilt of the ball 1 axis. An example of such a relationship is described below, with respect to FIGS. 25, 26 and 27.

Now referring to embodiments illustrated by FIGS. 1, 5, and 7, one or more stator wheels 30 can be attached to each leg 2 with a stator wheel pin 31 that is inserted through a hole in each leg 2. The stator wheel pins 31 are of the proper size and design to allow the stator wheels 30 to rotate freely over each stator wheel pin 31. The stator wheels 30 roll along the concave curved surfaces 90 of the stator curves 82 that face the balls 1. The stator wheels 30 provide axial support to prevent the legs 2 from moving axially and to ensure that the ball axles 3 tilt easily when the transmission 100 is shifted.

Referring to FIGS. 1 and 7, a spoked input disc 34, located adjacent to the stator 80*a*, partially encapsulates but generally does not contact the stator 80*a*. The input disc 34 may have two or more spokes or may be a solid disc. The spokes reduce weight and aid in assembly of the transmission 100. In other embodiments, a solid disc can be used. The input disc 34 has two sides, a first side that contacts with the balls 1, and a second side that faces opposite the first side. The input disc 34 is generally an annular disk that fits coaxially over, and extends radially from, a set of female threads or nut 37 at its inner diameter. The outside diameter of the input disc 34 is designed to fit within the case 40, if the case 40 used is the type that encapsulates the balls 1 and the input disc 34 and mounts to a rigid support structure 116 such as a chassis or frame with conventional bolts, which are inserted through bolt holes in a flange on the case 40. As mentioned above, the input disc 34 is in rotating contact with the balls 1 along a circumferential ramped or bearing contact surface on a lip of the first side of the input disc 34, the side facing the balls 1. As also mentioned above, some embodiments of the input disc 34 have a set of female threads 37, or a nut 37, inserted into its inside diameter, and the nut 37 is threaded over a screw 35, thereby engaging the input disc 34 with the screw 35.

Referring to FIGS. 1 and 4, the screw 35 is attached to and rotated by a drive shaft 69. The drive shaft 69 is generally cylindrical and has an inner bore, a first end facing axially towards the output side, a second end facing axially toward the input side, and a generally constant diameter. At the first end, the drive shaft 69 is rigidly attached to and rotated by the input torque device, usually a gear, a sprocket, or a crankshaft from a motor. The drive shaft 69 has axial splines 109 extending from its second end to engage and rotate a corresponding set of splines formed on the inside diameter of the screw 35. A set of central drive shaft ramps 99, which on a first side is generally a set of raised inclined surfaces on an annular disk that is positioned coaxially over the drive shaft 69, have mating prongs that mate with the splines 109 on the drive shaft 99, are rotated by the drive shaft 69, and are capable of moving axially along the drive shaft 69. A pin ring 195 contacts a second side of the central drive shaft ramps 99. The pin ring 195 is a rigid ring that is coaxially positioned over the idler rod 171, is capable of axial movement and has a transverse bore that functions to hold an idler pin 196 in alignment with the idler rod 171. The idler pin 196 is an elongated rigid rod that is slightly longer than the diameter of the pin ring 195 and which is inserted through an elongated slot 173 in the idler rod 171 and extends slightly beyond the pin ring 195 at both its first and second ends when it is inserted into the bore of the pin ring 195. The elongated slot 173 in the idler rod 171 allows for axial movement of the idler rod 171 to the right, when viewed as illustrated in FIG. 1, without contacting the pin 196 when the transmission 100 is shifted from 1:1 toward high. However, when the transmission 100 is shifted from 1:1 toward low, the side on the input end of the elongated slot 173 contacts the pin 196, which then operably contacts the central drive shaft ramps 99 via the pin ring 195. The idler rod 171 is thus operably connected to the central drive shaft ramps 99 when the transmission is between 1:1 and low so that when the idler rod 171 moves axially the central drive shaft ramps 99 also move axially in conjunction with the idler rod 171. The ramp surfaces of the central drive shaft ramps 99 can be helical, curved, linear, or any other shape, and are in operable contact with a set of corresponding central bearing disc ramps 98. The central bearing disc ramps 98 have ramp faces that are complimentary to and oppose the central drive shaft ramps 99. On a first side, facing the output side of the transmission 100, the central bearing disc ramps 98 face the central drive shaft ramps 99 and are contacted and driven by the central drive shaft ramps 99.

The central bearing disc ramps 98 are rigidly attached to a bearing disc 60, a generally annular disc positioned to rotate coaxially about the longitudinal axis 11 of the transmission 100. The bearing disc 60 has a bearing race near its perimeter on its side that faces away from the balls 1 that contacts a bearing disc bearing 66. The bearing disc bearing 66 is an annular thrust bearing at the perimeter of the bearing disc 60 and is positioned between the bearing disc 60 and the case cap 67. The bearing disc bearing 66 provides axial and radial support for the bearing disc 60 and in turn is supported by a bearing race on a case cap 67, which acts with the case 40 to encapsulate partially the inner parts of the transmission 100.

Referring to FIG. 1, the case cap 67 is generally an annular disc extending from the drive shaft 69 having a tubular portion extending toward the output end from at or near its perimeter and also having a bore through its center. The case cap 67 absorbs axial and radial forces produced by the transmission 100, and seals the transmission 100, thereby preventing lubricant from escaping and contamination from entering. The case cap 67 is stationary and, in some embodiments, is rigidly attached to the case 40 with conventional fastening methods or can have male threads on its outside diameter, which mate with corresponding female threads on the inside diameter of the case 40. As was mentioned above, the case cap 67 has a bearing race that contacts the bearing disc bearing 66 near the perimeter of the bearing disc 60 that is located at the inside of the output end of the tubular extension from the case cap 67. The case cap 67 also has a second bearing race facing the output side located near the inside diameter of its annular portion that mates with a drive shaft bearing 104. The drive shaft bearing 104 is a combination thrust and radial bearing that provides axial and radial support to the drive shaft 69. The drive shaft 67 has a bearing race formed on its outside diameter facing the input side that mates with the drive shaft bearing 104, which transfers the axial force produced by the screw 35 to the case cap 67. An input bearing 105, adds support to the drive shaft 69. The input bearing 105 is coaxially positioned over the drive shaft 69 and mates with a third race on the inside diameter of the case cap 67 facing the input side of the transmission 100. A cone nut 106, a generally cylindrical threaded nut with a bearing race designed to provide a running surface for the input bearing 105, is threaded over the drive shaft 69 and supports the input bearing 105.

Referring to the embodiment illustrated in FIG. 1, a set of multiple perimeter ramps 61, generally forming a ring about the longitudinal axis 11, are rigidly attached to the bearing disc 60. The perimeter ramps 61 are multiple inclined surfaces that are positioned radially about the longitudinal axis 11 and are positioned against or formed on the bearing disc 60 and face the output side. The inclined surfaces can be curved, helical, linear, or another shape and each one creates a wedge that produces and axial force that is applied to one of multiple ramp bearings 62. The ramp bearings 62 are spherical but can be cylindrical, conical, or another geometric shape, and are housed in a bearing cage 63. The bearing cage 63 of the illustrated embodiment is generally ring shaped with multiple apertures that contain the individual ramp bearings 62. A set of input disc ramps 64 are rigidly attached to, or formed as part of, the input disc 34. The input disc ramps 64 in some embodiments are complimentary to the perimeter ramps 62 with the ramps facing toward the input side. In another embodiment, the input disc ramps 64 are in the form of a bearing race that aligns and centers the ramp bearings 62 radially. The ramp bearings 62 respond to variations in torque by rolling up or down the inclined faces of the perimeter ramps 61 and the input disc ramps 64.

Referring now to FIGS. 1 and 4, an axial force generator 160 is made up of various components that create an axial force that is generated and is applied to the input disc 34 to increase the normal contact force between the input disc 34 and the balls 1, which is a component in the friction the input disc 34 utilizes in rotating the balls 1. The transmission 100 produces sufficient axial force so that the input disc 34, the balls 1, and the output disc 101 do not slip, or slip only an acceptable amount, at their contact points. As the magnitude of torque applied to the transmission 100 increases, an appropriate amount of additional axial force is required to prevent slippage. Furthermore, more axial force is required to prevent slippage in low than in high or at a 1:1 speed ratio. However, providing too much force in high or at 1:1 will shorten the lifespan of the transmission 100, reduce efficiency, and/or necessitate larger components to absorb the increased axial forces. Ideally, the axial force generator 160 will vary the axial force applied to the balls 1 as the transmission 100 is shifted and as torque is varied. In some embodiments, the transmission 100 accomplishes both these goals. The screw

35 is designed and configured to provide an axial force that is separate and distinct from that produced by the perimeter ramps 61. In some embodiments, the screw 35 produces less axial force than the perimeter ramps 61, although in other versions of the transmission 100, the screw 35 is configured to produce more force than the perimeter ramps 61. Upon an increase in torque, the screw 35 rotates slightly farther into the nut 37 to increase axial force by an amount proportional to the increase in torque. If the transmission 100 is in a 1:1 ratio and the user or vehicle shifts into a lower speed, the idler rod 171, moves axially toward the input side, along with the sleeve 19, sleeve bearings 172, shift guides 13*a, b*, and idler 18. The idler rod 171 contacts the central drive shaft ramps 99 through the pin 196 and pin ring 195, causing the central drive shaft ramps 99 to move axially toward the output side. The ramped surfaces of the central drive shaft ramps 99 contact the opposing ramped surfaces of the central bearing disc ramps 98, causing the central bearing disc ramps 98 to rotate the bearing disc 67 and engage the perimeter ramps 61 with the ramp bearings 62 and the input disc ramps 64. The central drive shaft ramps 99 and the central bearing disc ramps 98 perform a torque splitting function, shifting some of the torque from the screw 35 to the perimeter ramps 61. This increases the percentage of transmitted torque that is directed through the perimeter ramps 61, and because the perimeter ramps 61 are torque sensitive as described above, the amount of axial force that is generated increases.

Still referring to FIGS. 1 and 4, when shifting into low, the idler 18 moves axially towards the output side, and is pulled toward low by a reaction of forces in the contact patch. The farther the idler 18 moves toward low, the stronger it is pulled. This "idler pull," which increases with an increase in normal force across the contact as well as shift angle, also occurs when shifting into high. The idler pull occurs due to a collection of transverse forces acting in the contact patch, the effect of which is called spin. Spin occurs at the three contact patches, the points of contact where the balls contact the input disc 34, the output disc 101, and the idler 18. The magnitude of the resultant forces from spin at the contact between the idler 18 and the balls 1 is minimal in comparison to that of the balls 1 and input and output discs 34, 101. Due to the minimal spin produced at the contact patch of the idler 18 and ball 1 interface, this contact patch will be ignored for the following explanation. Spin can be considered an efficiency loss in the contact patches at the input disc 34 and ball 1 and at the output disc 101 and ball 1. Spin produces a transverse force perpendicular to the rolling direction of the balls 1 and discs 34, 101. At a 1:1 ratio, the transverse forces produced by spin, or contact spin, at the input and output contact patches are equal and opposite and are essentially cancelled. There is no axial pull on the idler 18 in this condition. However, as the transmission 100 is shifted toward low for example, the contact patch at the input disc 34 and ball 1 moves farther from the axis or pole of the ball 1. This decreases spin as well as the transverse forces that are produced perpendicular to the rolling direction. Simultaneously the output disc 101 and ball 1 contact patch moves closer to the axis or pole of the ball 1, which increases spin and the resultant transverse force. This creates a situation where the transverse forces produced by spin on the input and output sides of the transmission 100 are not equal and because the transverse force on the output contact is greater, the contact patch between the output disc 101 and ball 1 moves closer to the axis of the ball 1. The farther the transmission 100 is shifted into low the stronger the transverse forces in the contacts become that are exerted on the ball 1. The transverse forces caused by spin on the ball 1 exert a force in the opposite direction when shifting into high. The legs 2 attached to the ball axles 3 transfer the pull to the shift guides 13*a, b*, and because the shift guides 13*a, b*, are operably attached to the idler 18 and sleeve 19, an axial force is transferred to the idler rod 171. As the normal force across the contact increases, the influence of contact spin increases at all ratios and efficiency decreases.

Still referring to FIGS. 1 and 4, as the transmission 100 is shifted into low, the pull transferred to the idler rod 171 results in an axial force toward the left, as viewed in FIG. 1, which causes the input torque to shift from the screw 35 to the perimeter ramps 61. As the transmission 100 is shifted into extreme low, the idler rod 171 pulls more strongly, causing relative movement between the central drive shaft ramps 99 and the central bearing disc ramps 98 and shifts even more torque to the perimeter ramps 61. This reduces the torque transmitted through the screw 35 and increases the torque transmitted through the perimeter ramps 61, resulting in an increase in axial force.

Figure 9:
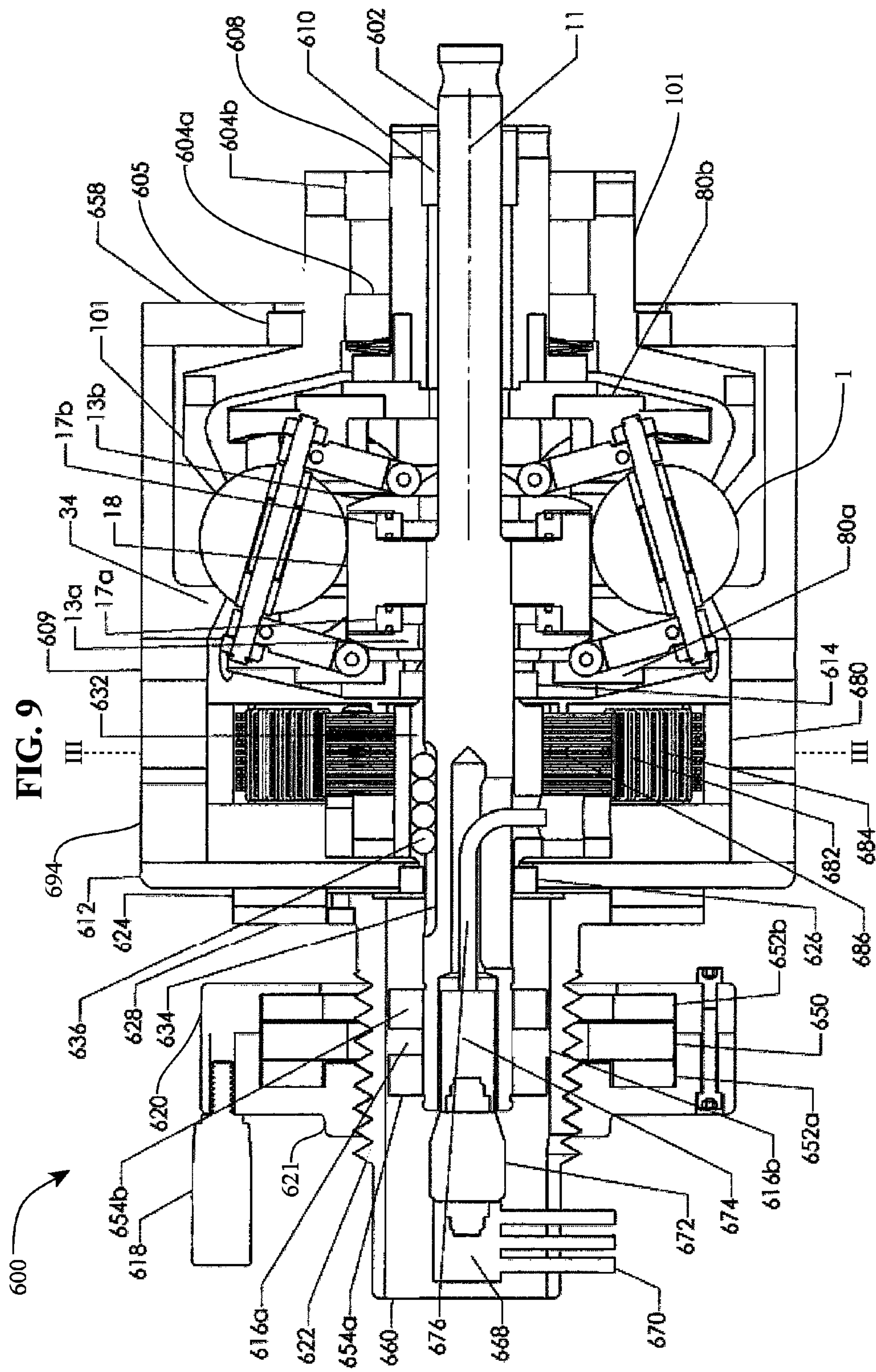
FIG. 9 is a cutaway side view of an alternative embodiment of the transmission of FIG. 1 with an integrated electric motor.
Figure 10:
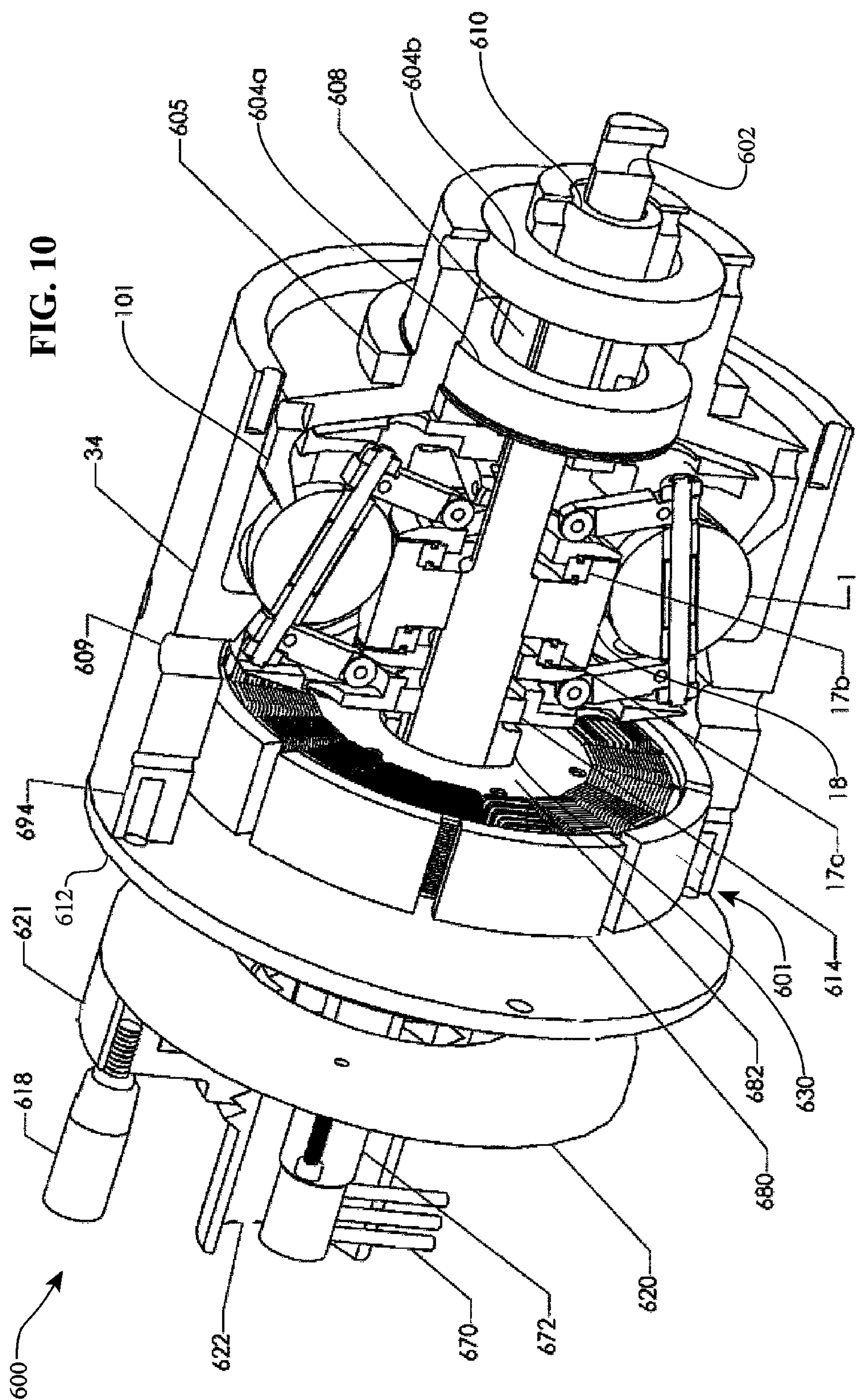
FIG. 10 is a partial cutaway perspective view of the transmission of FIG. 9.
Figure 11:
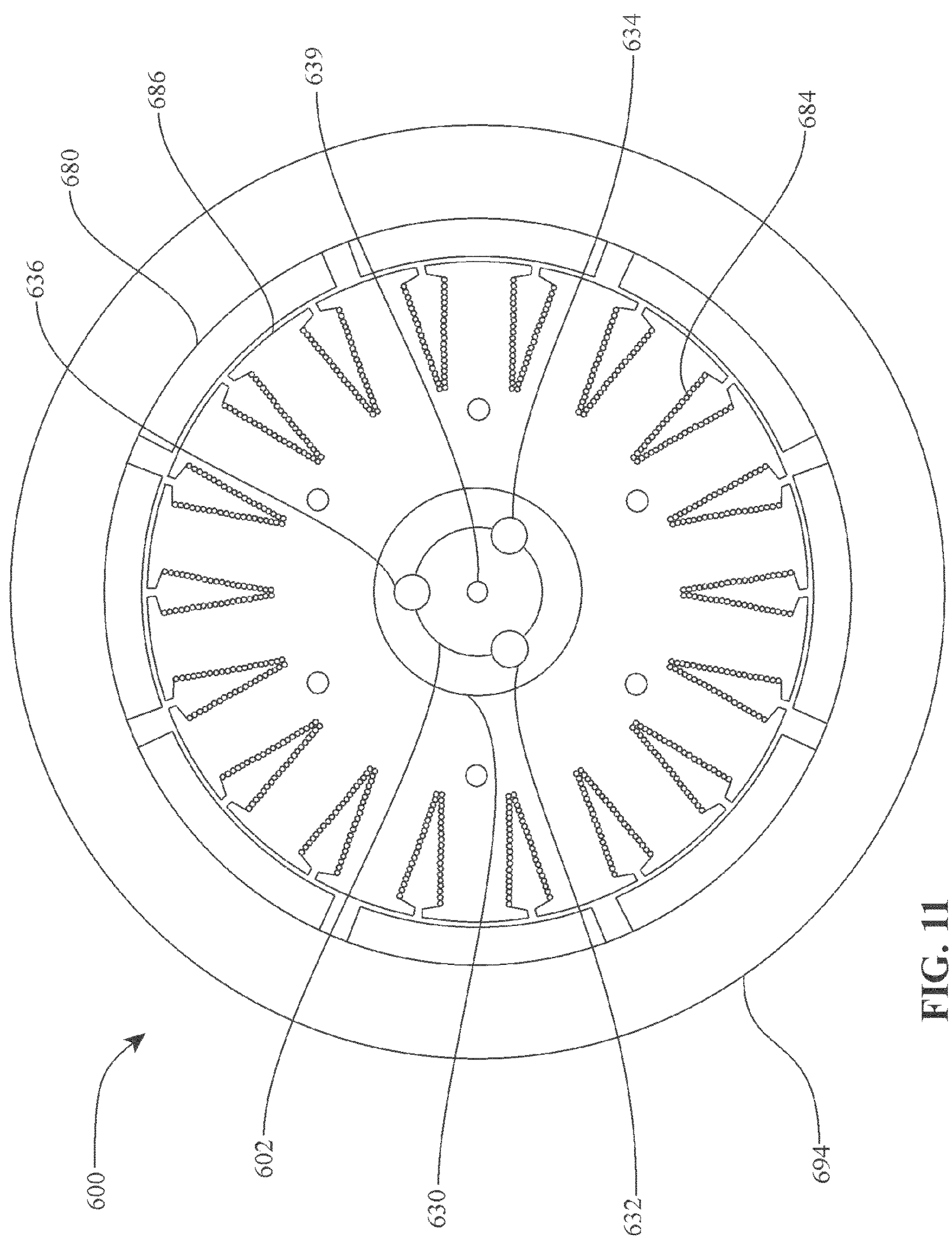
FIG. 11 is a cutaway end view of the transmission of FIG. 9 taken on line III-III of FIG. 9.

Referring now to FIGS. 9, 10, and 11, a transmission 600 is disclosed that incorporates an electric motor/generator 601 (MG 601). For simplicity, only the differences between the transmission 100 and transmission 600 will be described. In one embodiment, the MG 601 is an 8-pole brushless DC motor with 3 stator phases. The MG 601 can be comprised of an electrical stator 682 and an electrical rotor 694 which rotate in opposite directions. The speed of the MG 601 is defined as the relative speed between the electrical rotor 694 and the electrical stator 682. In one embodiment, the electrical stator 682 is operably attached to the idler 18, which due to the planetary effect of the balls 1 reverses the rotation of the input disc 34; hence, the idler 18 rotates in the opposite direction of the input disc 34.

The electrical rotor 694, which in some embodiments is a rotating magnetic steel cylinder and is rigidly attached to the input disc 34, can be made from the same component as the input disc 34, or can be made separately and joined to the input disc 34. In some embodiments the rotor 694 utilizes permanent magnets 680 annularly positioned around and attached to the inside diameter of the rotor 694. In other embodiments, the magnetic field produced by the rotor 694 uses one or more electromagnets.

The electrical stator 682 is comprised of coils 684 wrapped around multiple laminations 686 that are rigidly attached to a stator mount 630. In one embodiment, there are 24 identical silicon steel laminations, each having 18 teeth. The stator mount 630 also positions the electrical stator 682 relative to the rotor 694 and magnets 680, and routes the multiple wires (not shown) that connect the electrical stator 682 to the source of electricity. The stator mount 630 is operably attached to the idler shaft 602 with a plurality of spline bearings 636.

The idler shaft 602 is a long, cylindrically shaped shaft that is positioned at the center of the transmission 600, is coincident with the longitudinal axis 11, and is capable of axial movement to move the idler 18 and thus shift the transmission. A cable 676 houses the wires of the MG 601 which are routed from the electric stator 682, through the stator mount 630, and terminate at a receptacle 674 inside the idler shaft 602. In one embodiment, the cylindrically shaped receptacle 674 accepts three leads from the three phases of the electric stator 682 and routes the three leads to a rotating conductor 672. The rotating conductor 672, a cylindrically shaped component, transfers electricity from a rotating end at the receptacle 674 to a stationary end at the conductor cap 668. In one embodiment, the rotating conductor 672 is of the type that uses liquid metal, such as mercury, to transfer current from the rotating end to the stationary end.

In another embodiment, slip rings are used, although any other suitable method can be employed. Extending from the conductor cap 668 are three leads which are attached to a motor controller (not shown). The motor controller is attached to the source of electricity (not shown).

Referring now to FIGS. 9 and 10, the idler 18 is positioned on the input side of the transmission 600. As the idler 18 moves from the input side of the transmission 600 to the output side, the speed of the output disc 101 decreases. Additionally, if the MG 601 is operating at a constant speed, the speed of the rotor 694 increases because the rotor 694 is joined to the input disc 34 and rotates at a constant speed relative to the electrical stator 682 and the idler 18. The net effect is that there is a significant speed reduction at the output disc 101 in all ratios relative to the speed of the MG 601.

In many applications, such as electric vehicles and industrial drives, a reduction in rpm from the electric motor to the output device is required to achieve the necessary speed. Another benefit of the transmission 600 in combination with an electric motor 601 is an increase in torque, which equals the inverse of the decrease in speed. This allows for a significantly smaller MG 601 to produce the required torque for a given application. Other benefits of combining the transmission 600 with the MG 601 include a shared shaft, case, and bearings. Still another benefit is that in many high torque applications the input disc 34 is made from magnetic steel, and when the input disc 34 and rotor 694 are made as one part, the additional weight and cost of the magnetic steel which surrounds the magnets 680 is eliminated. Yet another benefit is the potential to liquid cool the electrical stator 682 using the same fluid that is in the transmission 600. Depositing the same liquid on the electrical stator 682 provides the opportunity to put significantly more power through the MG 601. In some embodiments, a liquid cooled MG 601 can utilize the same fluid, pump, hoses, and seals used in the transmission 600. Another benefit is the reduced size and weight of the transmission 600, MG 601, and speed reducer when they are combined into one unit as compared to three separate devices. The smaller size and weight reduces inertia and allows the transmission 600 and MG 601 to fit into a smaller space than would otherwise be required. In an electric vehicle, the smaller size and weight provides more room for batteries or fuel cells.

Still another benefit is the elimination of couplers and shafts linking the motor to the transmission to the speed reducer in a conventional electric drivetrain. Another benefit is the increased efficiency attained from reducing the required number of bearings and eliminating shaft misalignment between a motor, transmission, and speed reducer. Yet another benefit is derived from the fact that there is no mechanical input into the MG 601, transmission 600, or speed reducer. This provides opportunities for creative drivetrain designs, including multiple inputs and outputs.

Still referring to FIGS. 9 and 10, the rotor 694 has attached to it on the input side of the transmission 600, a side cap 612, which can be rigidly secured to the rotor 694 using standard fasteners. The side cap 612 is a disc shaped component that in one embodiment is made from steel although other materials can be used. The side cap 612 serves to contain lubricant, cooling fluid, and to protect and contain the components of the transmission 600. On the output side of the transmission 600 an end cap 658 is attached to the rotor 694. The end cap 658 can be rigidly secured to the rotor 694 using standard fasteners and in one embodiment is constructed of steel, although other materials can used.

An output disc bearing 605, which can support radial loads and in some embodiments axial loads, is positioned around the outside diameter of the output disc 101 and inside a bore of the end cap 658, and allows for relative movement between the output disc 101 and the end cap 658. A cap bearing 626, positioned around the idler shaft 602 and inside a bore of the side cap 612, provides for relative movement between the rotor 694 and the idler shaft 602, and can support radial loads and in some embodiments axial loads. A thrust bearing 624, which serves to prevent axial movement of the side cap 612, is positioned between the side cap 612 and a cap washer 628.

The cap washer 628 is rigidly attached to the shift screw 622, a stationary piece which can be mounted by standard fasteners to a rigid, non-moving structure, such as a frame or chassis, which is capable of withstanding the highest torque transferred through the transmission 600. A shift nut 621 is threaded over the shift screw 622, and rotation of the shift nut 621 causes the idler shaft 602 to move axially, shifting the transmission 600. The shift nut 621 is a generally annularly shaped component that is threaded at a bore in its center and does not experience high torque. In some embodiments, the shift nut 621 is constructed from aluminum, although other materials, including plastic and steel can be used.

In the embodiment shown the transmission 600 is manually shifted, although it can be shifted automatically using the centrifugal force of the rotating components, an electric motor, or other suitable method. One or more handles 618 can be attached to the shift nut 621, so that the user can more easily rotate the shift nut 621. The shift nut 621 is attached with standard fasteners to a disc shaped shift ring 620 that has a bore in its center. In one embodiment, the shift ring 620 is constructed from the same material as the shift nut 621 although other materials may be used. The shift nut 621 and shift ring 620 contain two shift bearings 652*a,b* that minimize friction when the shift nut 621 and shift ring 620 rotate relative to a pin mount 650.

The pin mount 650 is a disc shaped component with a bore at its center that provides clearance over the shift screw 622. The pin mount 650 axis is concentric with the longitudinal axis 11 and is aligned by counterbores in the shift nut 621 and shift ring 620. The pin mount 650 has two threaded holes 180 degrees apart extending radially from its center although fewer or more threaded holes can be used. Two shift pins 616*a,b*, which in one embodiment are threaded into the threaded holes of the pin mount 650, but can also be pressed, welded, or inserted using any other suitable method, are threaded pins that extend into the bore of the pin mount 650, through slots in the shift screw 622, and into the bore of the shift screw 622. The shift pins 616*a,b* contact two pin bearings 654*a,b*, which are positioned over the idler shaft 602 and inside the bore of the shift screw 622. The pin bearings 654*a,b* provide relative movement between the rotating idler shaft 602, and the shift pins 616*a,b*, and absorb thrust loads which occur from shifting the transmission 600.

Still referring to FIGS. 9 and 10, a stator bearing 614 is positioned in the bore of the input stator 80*a* and around the idler shaft 602 to allow for axial movement between the idler shaft 602 and the input stator 80*a*, and to withstand radial loads. On the output side of the idler shaft 602 a shaft bearing 610 is positioned over the idler shaft 602 and inside the bore of a stator brace 608. In some embodiments, the shaft bearing 610 is a needle roller or cylindrical roller bearing where the rollers contact a hardened and polished area of the idler shaft 602. This allows the idler shaft 602 to move axially relative to the shaft bearing 610 with minimal friction. The stator brace 608 is a generally cylindrical component that in some embodiments is made from hardened steel, although any suitable material can be used. At a first end the stator brace 608 is rigidly attached to the cage 89 with standard fasteners, although it can be welded, pressed into a bore of the cage 89, or formed integral with the cage 89. At a second end the stator brace 608 is rigidly attached to a stationary structure, such as a frame or chassis. To provide relative movement between the stator brace 608 and the output disc 101, one or more brace bearings 604*a,b* are positioned over the outside diameter of the stator brace 608 and inside the bore of the output disc 101. The brace bearings 604*a,b* also support radial loads and in some embodiments axial loads.

Referring now to FIGS. 11, 15, 16, and 17, the torque transferring method between the idler shaft 602 and the electrical stator 682 is described. The idler shaft 602 can be constructed of any suitable material designed to withstand the torque and speed of the transmission 600 and in some embodiments hardened steel is used, although mild steel, aluminum, titanium, carbon fiber, can also be employed. The idler shaft 602 has formed into its outside diameter one or more shaft grooves 634, generally longitudinal grooves that are parallel with the idler shaft 602 axis and that in some embodiments are of a radius slightly larger than the spline bearings 636. In some embodiments, the spline bearings 636 are generally spherical rolling elements that transfer torque between the electrical stator 682 and the idler shaft 602. The spline bearings 636 can be made from hardened steel or other suitable materials. The number and size of spline bearings 636 used depends on the amount of torque which must be transferred, the radius and length of the shaft grooves 634, and the size of the transmission 600.

Formed into the inside diameter of the stator mount 630 are one or more mount grooves 632, which in some embodiments are identical to the shaft grooves 634, but in other embodiments can be longer or shorter, and also use a different radius. In some embodiments, the spline bearings 636 are positioned so that the center of each spline bearing 636 is halfway between the radial depth of both the shaft grooves 634 and mount grooves 632. The spline bearings 636 have a self centering feature in that they roll tangentially up both the radii of the shaft grooves 634 and mount grooves 632 an equal amount. When two or more shaft grooves 634 and mount grooves 632 are used, and when they are positioned angularly equidistant, the spline bearings 636 will center the electrical stator 682 relative to the idler shaft 602. In some embodiments, a small amount of clearance is provided for the spline bearings 636 to allow the self-centering to occur, and to aid in assembly. If a small amount of clearance is provided, the spline bearings 636 will also locate themselves in the proper position the first time the transmission 600 is shifted. When the transmission 600 is shifted, the spline bearings 636 roll axially along the shaft grooves 634 and mount grooves 632 at half the distance the idler shaft 602 moves axially. The length of the shaft grooves 634 and mount grooves 632 should be at least twice the length of the diameter of a spline bearing 636 times the number of spline bearings 636 in each shaft groove 634. In some embodiments the stator bearing 614 and the cap bearing 626 are used to limit the spline bearings 636 axial movement.

Referring now to FIGS. 9, 11, 15, 16, and 17, the routing of the electrical wires to the electrical stator 682 is described. In some embodiments, three electrical wires are routed into a shaft hole 638 of the idler shaft 602, where as previously described, the rotating conductor 672 converts the non-rotating wires to rotating wires. The wires, housed in a cable 676 are routed into the cable tube 639, a hollow blind hole in the center of the idler shaft 602, and then through a shaft slot 635, a slot that extends axially along a portion of the idler shaft 602 which forms a through hole from the outside diameter of the idler shaft 602 to the cable tube 639. The three electrical wires (not shown) then exit the cable 676 and branch out to each of the three stator phases inside the wire cavity 648 of the stator mount 630. As the idler shaft 602 moves axially from the input side to the output side and back during shifting, it alternately lengthens and shortens the wires connected to the electrical stator 682. The wire cavity 648 provides space for the required additional length of the electrical wires during shifting.

In order to aid the routing of the electrical wires, one or more assembly holes 646 are formed into the outside diameter of the stator mount 630, which provide access to the wires inside the wire cavity 648. Additionally, one or more routing holes 644 formed axially through a wall of the stator mount 630, aid in routing each of the three electrical wires to their respective stator phases. Either the assembly holes 646 or the routing holes 644 can be used to access the electrical wires and the leads from the electrical stator 682 so that the wires and leads can be pulled through the assembly holes 646 or routing holes 644, soldered together, insulated, and then reinserted into the wire cavity 648. In some embodiments, one or more lamination threaded holes 642 are formed into a radially extending wall of the stator mount 630 to secure the electrical stator 682 to the stator mount 630.

Figure 18:
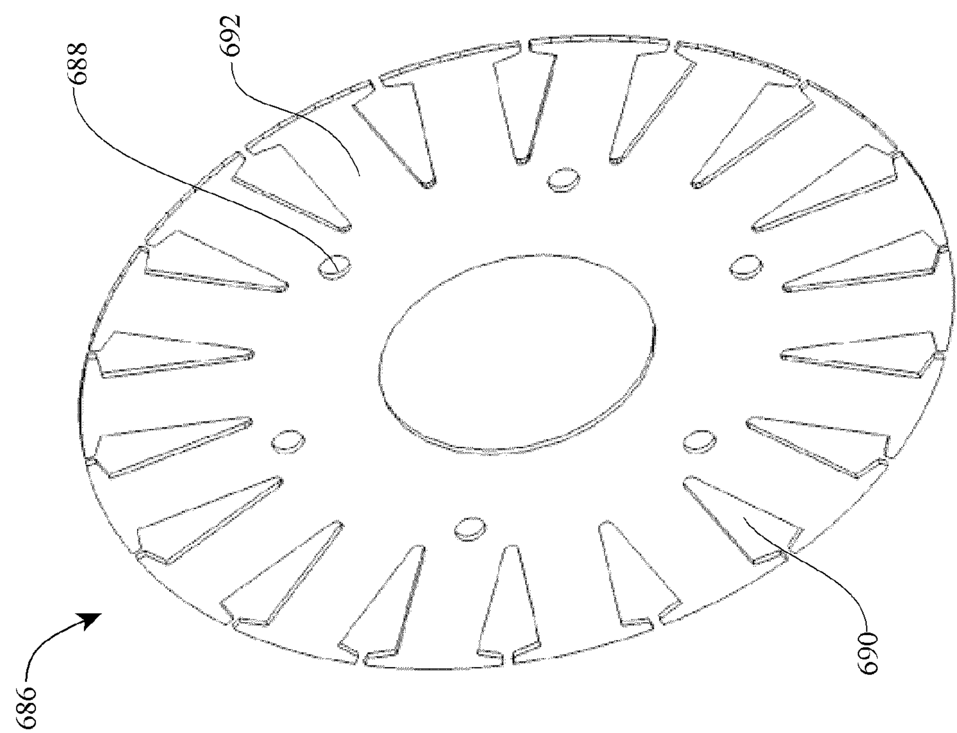
FIG. 18 is a perspective view of a lamination of the transmission of FIG. 9.
Figure 20:
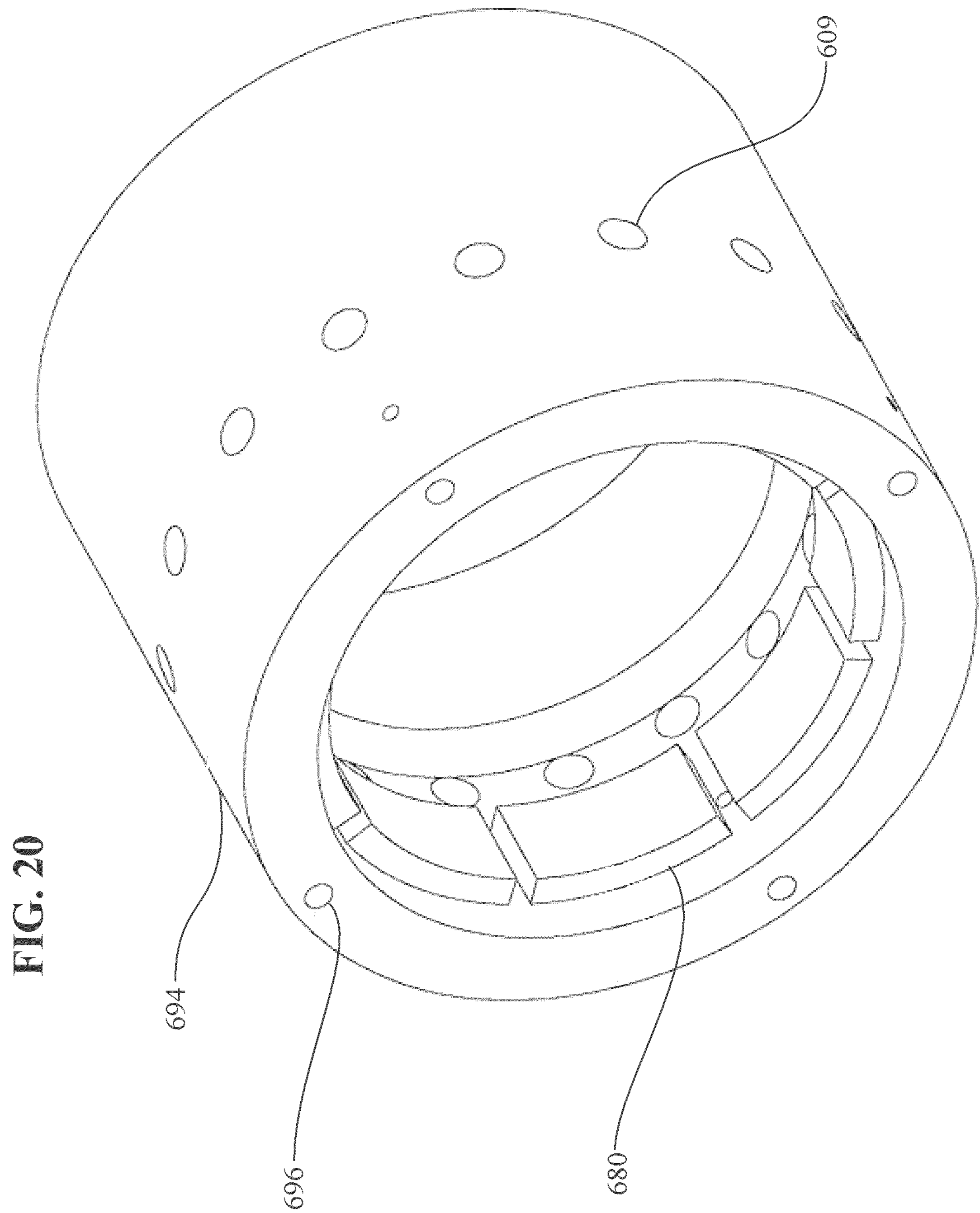
FIG. 20 is a perspective view of the rotor of the transmission of FIG. 9.
Figure 22:
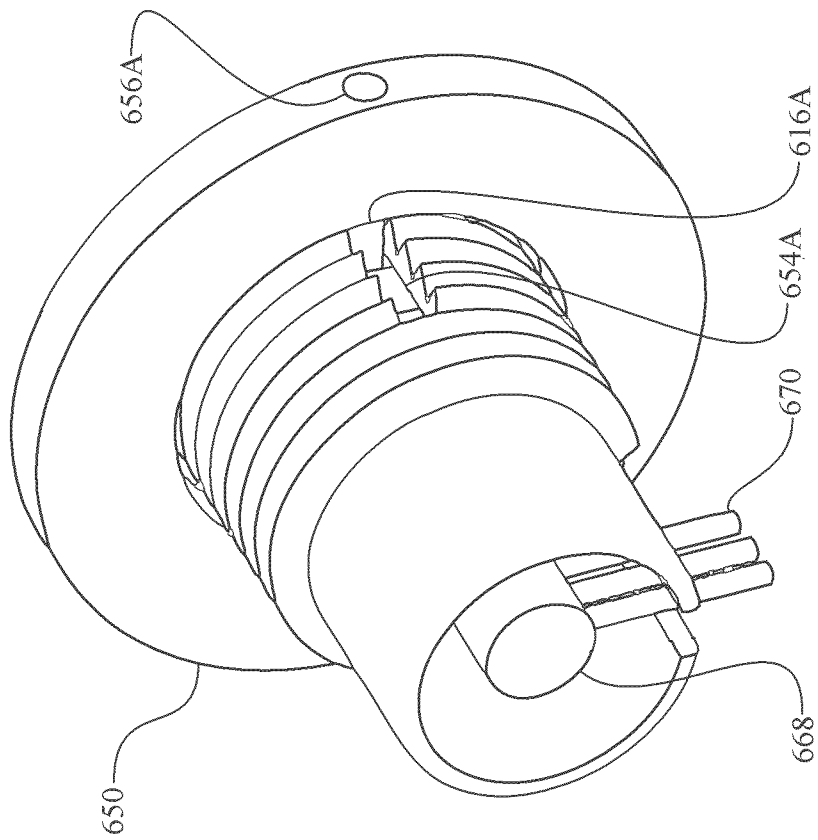
FIG. 22 is a perspective view of a partial shifter assembly of the transmission of FIG. 9.
Figure 21:
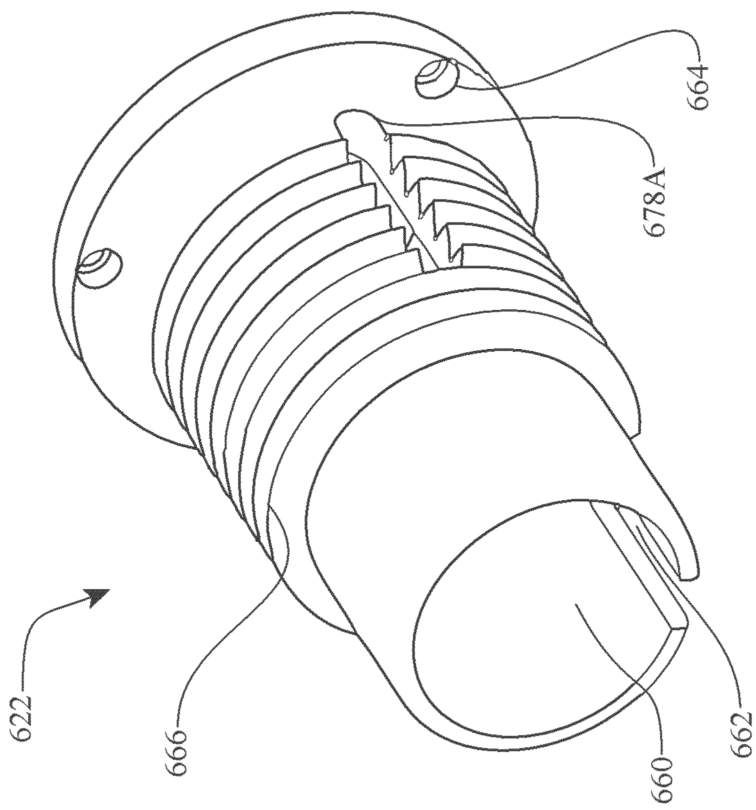
FIG. 21 is a perspective view of the shift screw of the transmission of FIG. 9.

Referring now to FIGS. 9, 10, 11, 18, and 19, the electrical stator 682 and rotor 694 are described. In some embodiments, the MG 601 is of the type that incorporates an iron core, and multiple laminations 686 of the type in FIG. 18 are stacked together, then conducting wire coils 684 are wrapped around each tooth 692 in the space provided by the slots 690 to produce an electrical stator 682 of the type seen in FIG. 19. In some embodiments 18 slots 690 and teeth 692 are used although fewer or more can be used depending upon the application. In some embodiments, lamination holes 688 in each lamination 686 are used to secure the electrical stator 682 to the stator mount 630. Standard fasteners, such as machine screws are inserted through the lamination holes 688 and screwed into the lamination threaded holes 642 of the stator mount 630.

Referring now to FIGS. 9, 10, 11, 18, 19, and 20, in some embodiments eight magnets 680 are used to create an eight pole electrical motor 601, although fewer or more magnets 680 can be used. The magnets 680 are of the permanent magnet type and can be made from any suitable material, including hard ferrite ceramic, samarium cobalt, and neodymium boron iron. The magnets 680 have a radius matching the inside diameter of the rotor 694 at their outside diameter and a radius on their inside diameter which is concentric with the rotor 694 and the electrical stator 682. In some embodiments, the distance between the magnets 680 and the electrical stator 682 is as small as possible to maximize the magnetic flux and thus torque produced by the MG 601. Half of the magnets 680 are magnetized so that the polarity extends radially from south to north and the remaining magnets 680 have a polarity extending radially from north to south. The magnets 680 are arranged so that every other magnet 680 has the same polarity. To aid in the dissipation of heat, one or more vent holes 609, formed into the rotor 694, allow for circulation of air in applications that do not require liquid cooling. In applications where liquid cooling or any liquid is used the vent holes are eliminated 609.

Referring now to FIGS. 9, 10, 14, and 15, the idler 18 and related parts are described. The idler 18, although very similar to the idler 18 of the transmission 100, differs in that it transfers power. The idler 18 is rigidly attached to the idler shaft 602 with an interference fit, welding, standard fasteners, a key, or any other suitable method. The idler bearings 17*a,b* provide for relative movement between the idler 18 and the non-rotating shift guides 13*a,b*. The shift guides 13*a,b* are very similar to the shift guides 13*a,b* of the transmission 100 except that they are formed with clearance between their inside diameters and the idler shaft 602, so that they do not hit the rotating idler shaft 602.

Referring now to FIGS. 9, 10, 21, and 22, the shift screw 622 and related parts are described. In some embodiments one or more flange holes 664 on the shift screw 622 are used to attach rigidly the shift screw 622 to a stationary object, although other methods to attach the shift screw 622 to a rigid, not-rotating object may be used. A shift bore 660 defined by the inside diameter of the shift screw 622 covers and protects the conductor cap 668, the rotating conductor 672, and other components. A shift slot 662 is formed at an end opposite the flange holes 664, and extends axially to confine and prevent the leads 670 from rotating, and to allow the leads 670 to move axially as the transmission 600 is shifted. The shift threads 666 of the shift screw 622 can be of a pitch and size to accommodate manual or automatic shifting, depending on the required speed, as well as the shift force that must be overcome. In some embodiments, the number of threads is of an axial length which is greater than the axial movement of the idler shaft 602 to improve ease of assembly and provide for loose tolerances.

In some embodiments two pin slots 678*a,b* are formed through the shift screw 622, although more or fewer can be used. The pin slots 678*a,b* extend axially along the shift screw 622 and are of a length that is at least as long as the distance that the idler shaft 602 is able to move axially. The width of the pin slots 678*a,b* is slightly larger than the diameter of the shift pins 616*a,b* to allow freedom of movement. The pin mount 650 has a bore slightly larger than the diameter of the shift threads 666 to provide clearance and unrestricted movement. When the transmission 600 is shifted, the shift nut 621 is rotated which causes the pin mount 650 to move axially. Two threaded pin holes 656*a,b* are formed radially in the pin mount 650 and in one embodiment are 180 degrees apart. More or fewer threaded pin holes 656*a,b* can be used depending on the size and torque rating of the transmission 600. Two shift pins 616*a,b* are screwed into the threaded pin holes 656*a,b* until they extend beyond the bore of the pin mount 650 and into the shift bore 660. The shift pins 616*a,b* contact two pin bearings 654*a,b* which are positioned on each side of the shift pins 616*a,b* and provide for relative movement between the idler shaft 602 and the shift pins 616*a,b*, as well as to absorb axial forces. The pin bearings 654*a,b* can be held in position by standard fasteners, and in one embodiment, retaining rings are used and inserted into grooves formed into the surface of the idler shaft 602 on a side of the pin bearings 654*a,b* facing away from the shift pins 616*a,b*.

Figure 12:
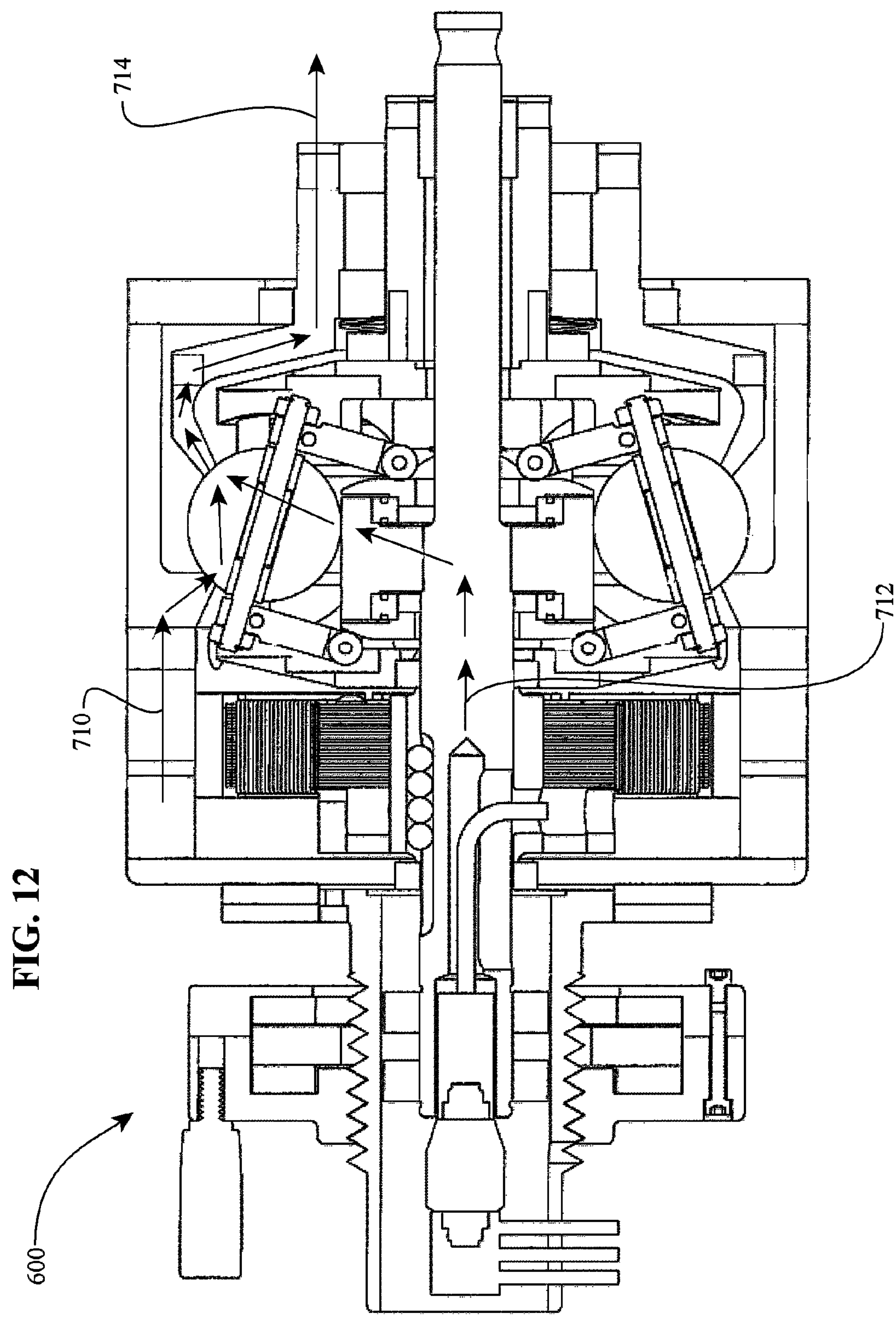
FIG. 12 shows the electrical and mechanical powerpath of the transmission of FIG. 9.
Figure 13:
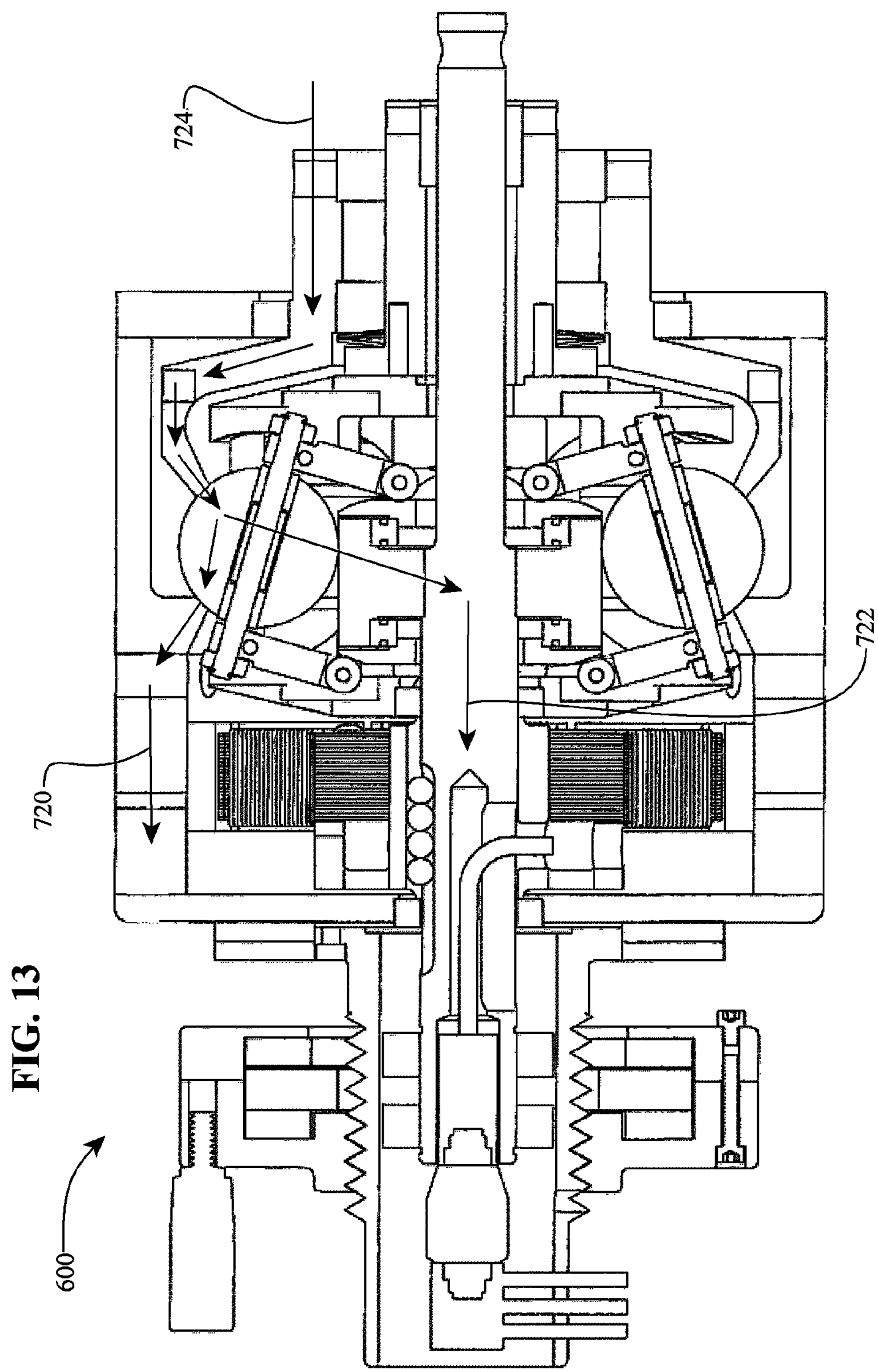
FIG. 13 shows the reverse of the electrical and mechanical powerpath of the transmission of FIG. 9.
Figure 15:
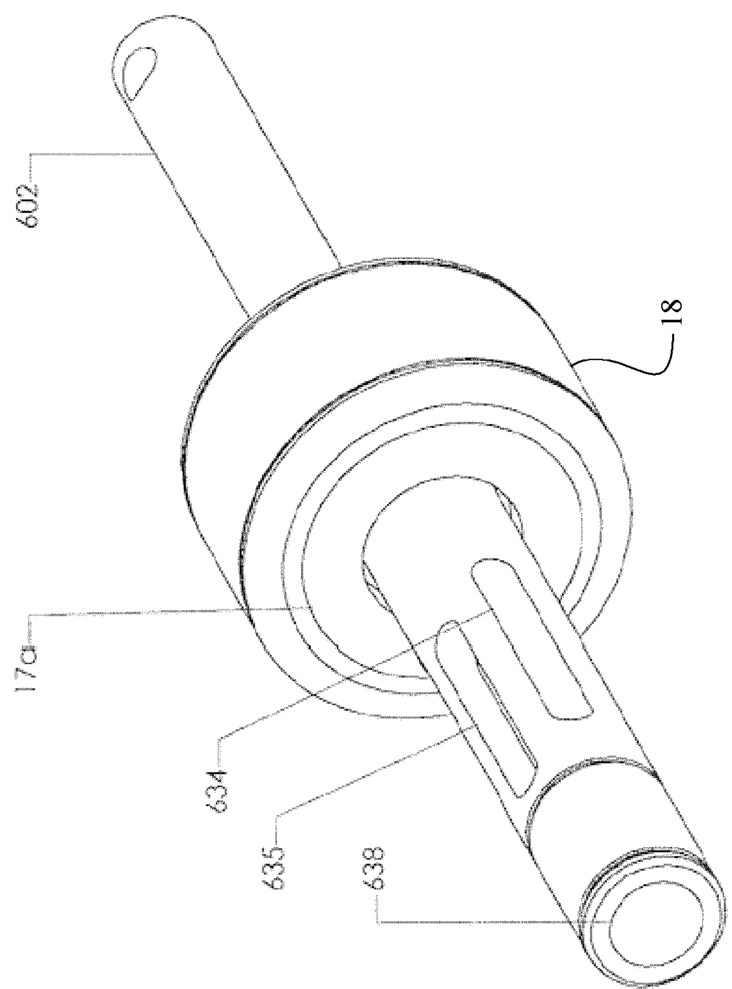
FIG. 15 is a partial schematic perspective view of the idler assembly of the transmission of FIG. 9.
Figure 14:
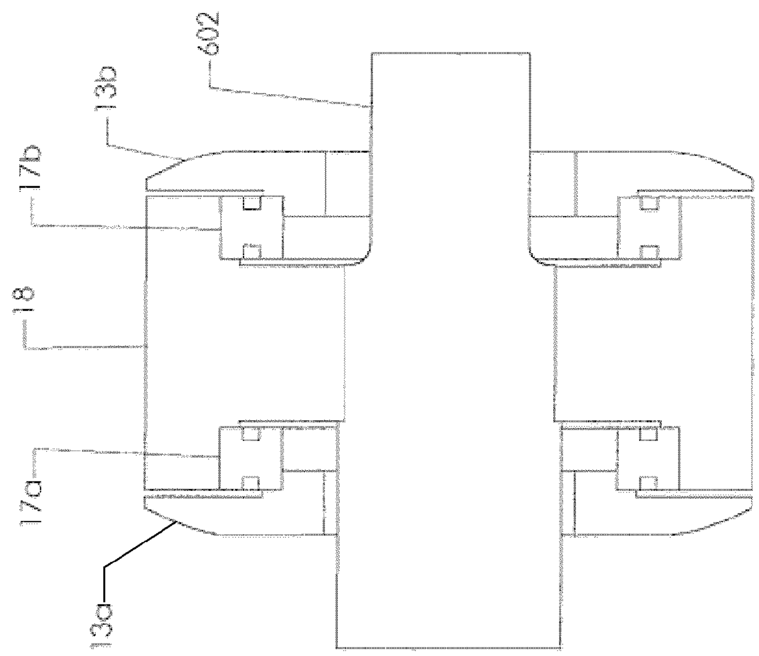
FIG. 14 is a partial cutaway side view of the idler assembly of the transmission of FIG. 9.
Figure 17:
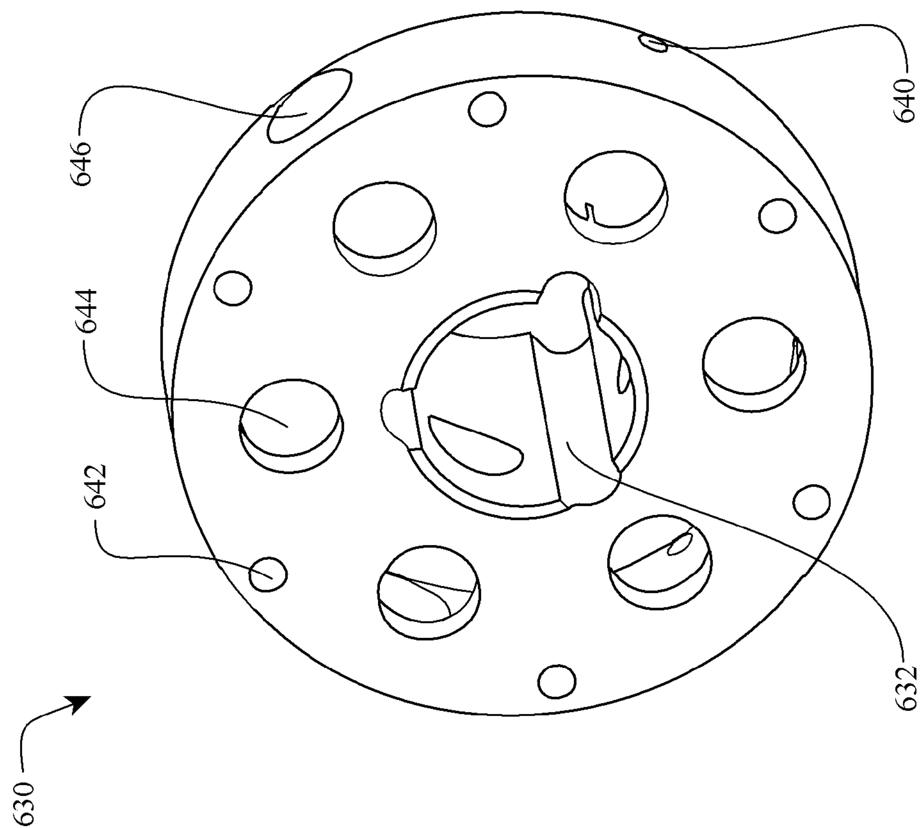
FIG. 17 is a perspective view of the stator mount of the transmission of FIG. 9.
Figure 16:
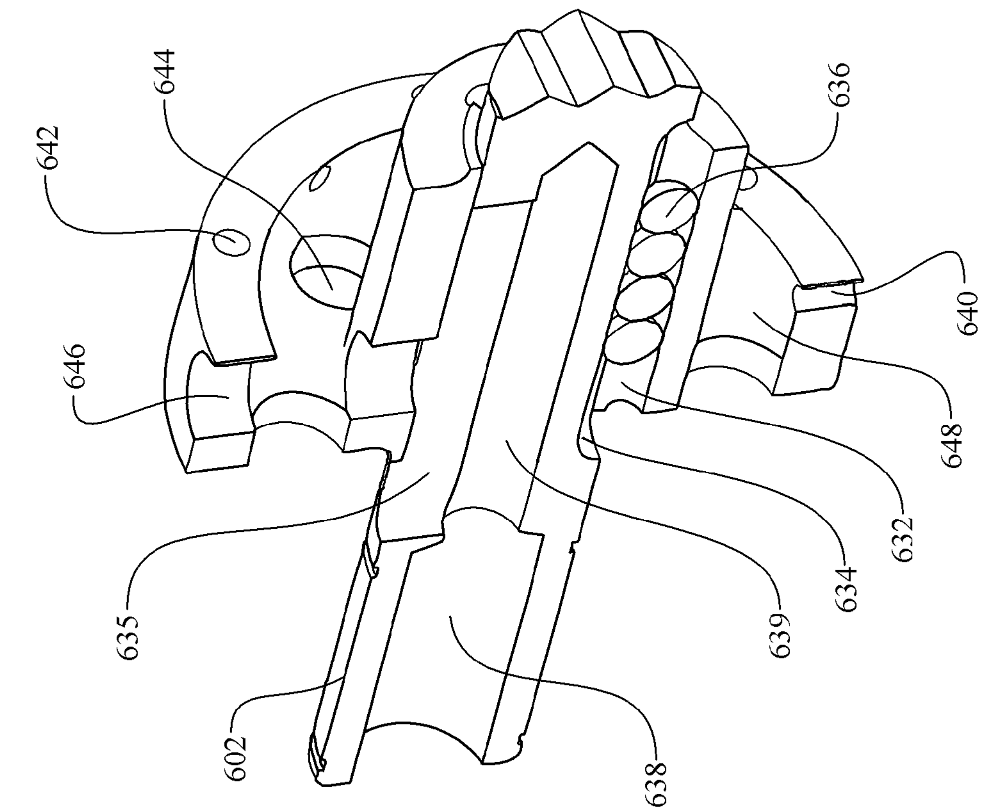
FIG. 16 is a partial cutaway perspective view of the spline assembly of the transmission of FIG. 9.
Figure 19:
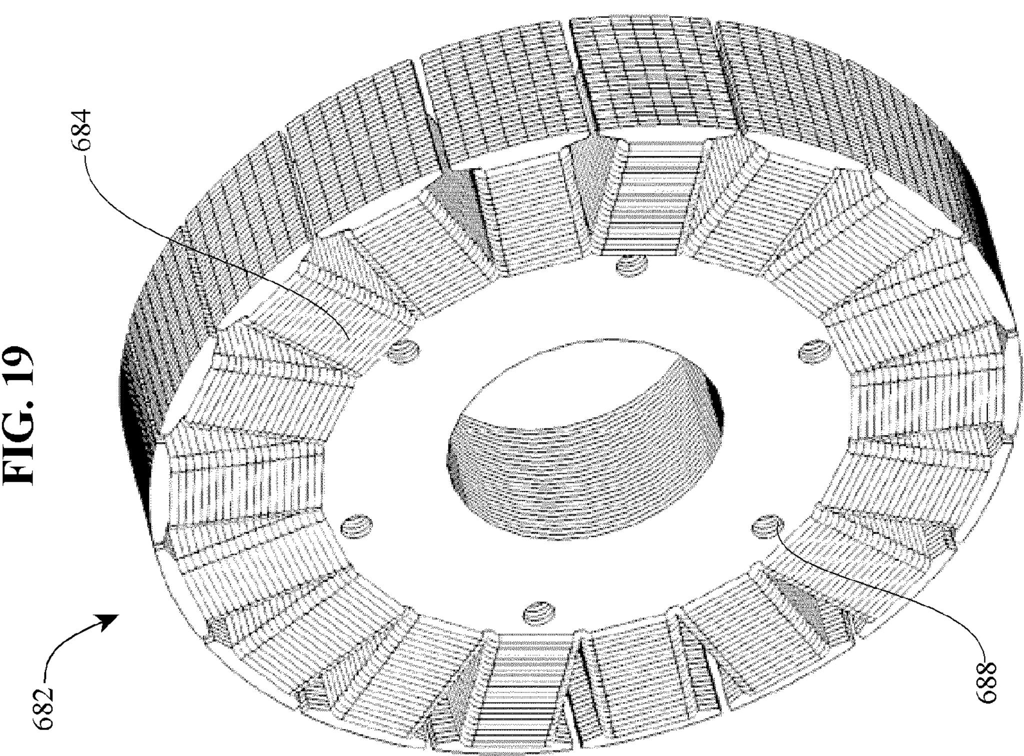
FIG. 19 is a perspective view of the winding of the transmission of FIG. 9.

Referring now to FIGS. 9, 10, and 12, a powerpath for some applications, including industrial equipment such as robots, mixers, drills, mills, conveyors, etc., as well as electric vehicles, is described. Because the rotor 694 and electrical stator 682 rotate in opposite directions at a substantially constant relative speed, both components of the electric motor 601 input power to the transmission 600. Power from the rotor 694 follows the rotor path 710 at the perimeter of the transmission 600, and travels axially towards the output side of the transmission, through the input disc 34, and into the balls 1. It should be noted that although rotor path 710 arrows are only drawn at the top of the section view of FIG. 12, the rotor path 710 follows a symmetrical and identical path at the bottom of the section view of FIG. 12. Power from the electrical stator 682 follows the stator path 712, which begins at the electrical stator 682, travels into the idler shaft 602, and moves axially toward the output side of the transmission 602, then radially out through the idler 18, and into the balls 1. It should be noted that although stator path 712 arrows are only drawn at the top of the section view of FIG. 12, the stator path 712 follows a symmetrical and identical path at the bottom of the section view of FIG. 12. At the balls 1, power received from both the rotor path 710 and stator path 712 merge, and output power is transferred to the output disc 101 and exits the transmission 600 through a speed reduction path 714 wherein there is power from one output component rotating in one direction. Significantly, the speed reduction realized from the rotor path 710 and stator path 712 rotating in opposite directions to a single speed reduction path 714, also creates a torque increase. The torque increase is the inverse of the speed reduction.

Referring now to FIGS. 9, 10, 12, and 13, the reverse powerpath of FIG. 12 is described. If the powerpath of FIG. 12 is reversed, a significant speed increase and torque reduction is realized. Power enters the transmission at the output disc 101, and power follows the speed increaser path 724, moving axially from the output side of the transmission 600 toward the balls 1. Power enters the balls 1 and is then split into two components, the rotor path reversed 720, and the stator path reversed 722. Power along the rotor path reversed 720 enters the input disc 34 and then moves axially toward the input side of the transmission 600 to the rotor 694. Power along the stator path reversed 722 enters the idler 18 and then moves axially toward the input side of the transmission 600 through the idler shaft 602, and into the electrical stator 682. Because the electrical stator 682 and the rotor 694 are receiving mechanical power, the MG 601 becomes a generator, converting mechanical power into electricity. The MG 601 can be advantageously used in some power generating applications which require a speed increase, such as wind turbines.

Figure 23:
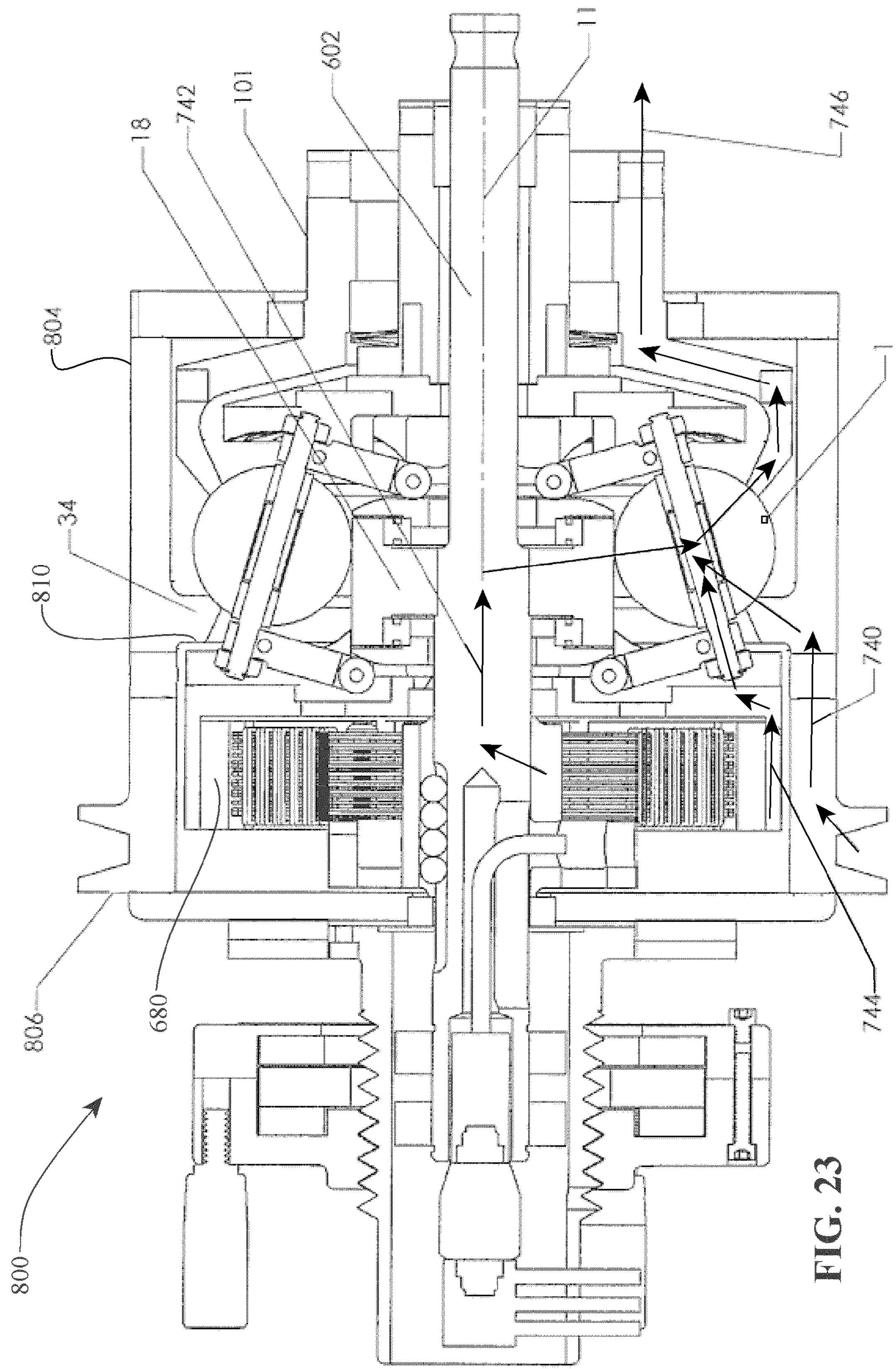
FIG. 23 is a cutaway side view of a transmission which can receive input power through three paths.
Figure 24:
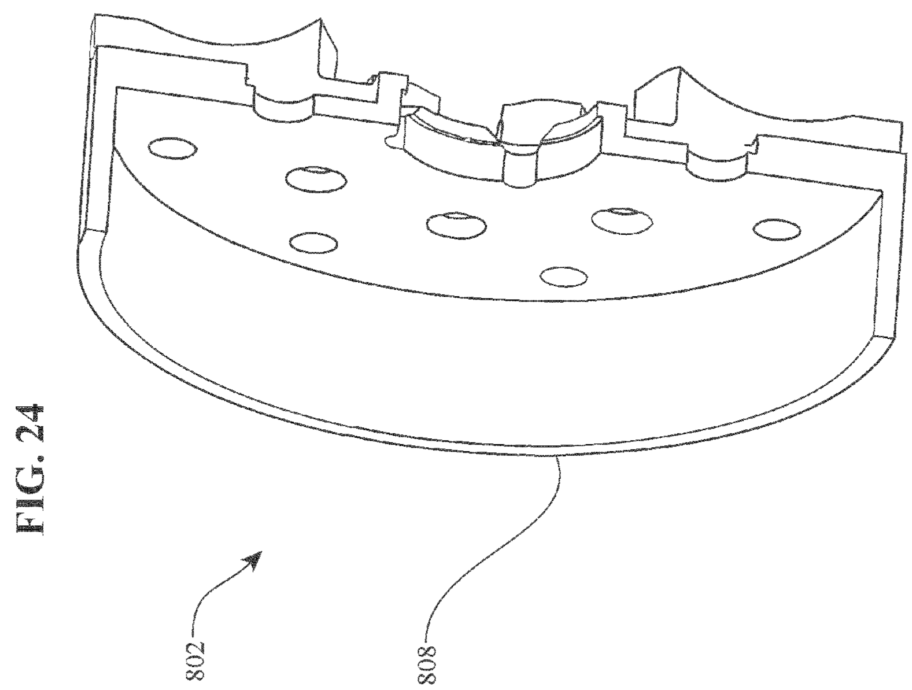
FIG. 24 is a cutaway perspective view of the rotor of the transmission of FIG. 23.

Referring now to FIGS. 23 and 24, a powerpath for an application requiring multiple power inputs, such as a hybrid vehicle, is shown. For simplicity, only the differences between the transmission 800 and the transmission 600 will be described. In the transmission 800 the magnets 680 are attached to a modified hybrid stator 802. The hybrid stator 802 is similar to the input stator 80*a* of the transmission 600 but in addition includes a cylindrical stator boss 808, with an inside diameter to which the magnets 680 are attached. In the transmission 800 the hybrid stator 802 and the cage 89 rotate, and power is transferred through the cage 89 into the balls 1. In some embodiments, the hybrid stator 802 is made from magnetic steel, while in other embodiments the stator boss 808 is made from magnetic steel while the remainder of the hybrid stator 802 is made from another material, such as aluminum, titanium, non-magnetic steel, plastic, or any other suitable material. The magnets 680 and the hybrid stator 802 comprise the hybrid rotor 810.

As in the transmission 600, the electrical stator 682 transfers power through the idler shaft 602 and into the idler 18, and a third power source enters through the hybrid case 804. The hybrid case 804 is a rotating, generally cylindrical component similar to the rotor 694 of the transmission 600, and in some embodiments is made from the same materials. The hybrid case 804 in some embodiments has attached to it a hybrid pulley 806. The hybrid pulley 806 is attached on the input side of the hybrid case 804, and in some embodiments the hybrid pulley 806 is formed so that it and the hybrid case 804 are one part. In other embodiments, the hybrid pulley 806 and the hybrid case 804 are two separate parts and the hybrid pulley 806 is attached over the circumference of the hybrid case 804 with an interference fit, welding, a key, pin, or any other suitable method. In some embodiments, the hybrid pulley 806 is replaced by a sprocket, gear, or any other method where torque can be transferred to the hybrid case 804. In some embodiments, the hybrid pulley 806 is connected to a pulley on the shaft of an internal combustion engine (not shown) by a belt (not shown). In other embodiments, the hybrid pulley 806 is operably attached to a steam engine or any other torque generating machine.

Referring now to FIG. 23, the powerpath through the transmission 800 is described. The electrical stator 682 inputs power to the hybrid stator path 742, which travels through the idler shaft 602, through the idler 18, and into the balls 1. The hybrid rotor 810 inputs power to the hybrid rotor path 744, which rotates the cage 89 and thus the balls 1, inputting power into the balls 1. The hybrid case 804 inputs power to the case path 740, which travels through the input disc 34 and into the balls 1. Unlike the transmission 100 where the cage 89 is fixed and does not rotate, there are no fixed components in the transmission 800. Output power exits the hybrid output 746, which travels from the balls 1, through the output disc 101, and to an external component (not shown), such as a wheel, drive shaft, etc.

Still referring to FIG. 23, the transmission 800 in some embodiments can be configured to be an infinitely variable transmission (IVT), where the speed ratio moves continuously from forward to zero and into reverse. If the hybrid rotor 810 rotates more rapidly than the input disc 34, the cage 89 and the idler 18 rotate in the same direction and an IVT results. It should be noted that the input disc 34, the cage 89, and the idler 18, all rotate in the same direction while the balls 1 rotate in the reverse direction. In a typical hybrid vehicle, the internal combustion engine will rotate at a speed significantly lower than the electric motor/generator. In some embodiments, the internal combustion engine is attached to the hybrid pulley, which drives the input disc 34, and the hybrid rotor 810 is attached to the hybrid stator 802, which rotates the cage 89. The ratio of the IVT in the transmission 800 increases as the speed of the cage 89 increases relative to the speed of the input disc 34. However, as gamma changes, which is the angle of the ball axle 3 relative to the longitudinal axis 11, the idler 18 speed also changes. Because the MG 601 rotates at a generally constant speed, the change in the speed of idler 18, relative to the constant speed of the cage 89, causes the speed of the cage 89 to vary relative to the speed of the input disc 34. As the speed of the cage 89 increases or decreases it increases or decreases the ratio of the transmission 800 when it is configured as an IVT.

In the following chart, various angles of gamma show the resulting ratios and the speed of the idler 18 when the speed of the cage 89 is designed to be three times as fast as the speed of the input disc 34. The ratio is the speed of the output disc 101 compared to the speed of the input disc 34. It can be seen that as the gamma moves from −20 gamma to 20 gamma, the speed of the idler 18 increases. This reduces the speed differential between the cage 89 and the input disc 34, reducing the ratio of the IVT in reverse. A factor can be obtained by subtracting the speed of the cage 89 from the speed of the idler 18. A ratio factor of 1 is obtained by dividing the factor by itself when gamma equals zero. This ratio factor decreases toward negative gamma and increases toward positive gamma. Dividing the ratio by the ratio factor from gammas of −20 to 20 provides the true ratio that can be obtained.

As can be seen in the following chart the true ratio increases in overdrive and decreases in reverse. This is particularly advantageous for hybrid vehicles when they are cruising at highway speeds because it increases the top speed to which the transmission 800 can maintain an optimum speed of an internal combustion engine and the MG 601, it splits power into the transmission 800 which increases efficiency, there are no input shafts which aids packaging and provides for flexible powertrain design, and the speed of the highest speed component (the idler 18) decreases, which also improves efficiency. It is also advantageous in reverse, because high speeds are generally not necessary in reverse. This allows the transmission 800 to be used in all gamma angles, covering all possible surfaces of the balls 1 and the idler 18, increasing the life of the transmission 800. Further, a hybrid vehicle can be operated on either the internal combustion engine alone, or the MG 601 alone, and variable speed through the transmission 800 is maintained.

| gamma | Ratio | Cage 89 speed | Idler 18 speed | Ratio factor | True ratio |
|---|---|---|---|---|---|
| −20 | 2.07 | 3.00 | 11.11 | 0.73 | 2.82 |
| −15 | 1.85 | 3.00 | 11.73 | 0.79 | 2.34 |
| −10 | 1.60 | 3.00 | 12.41 | 0.85 | 1.88 |
| −5 | 1.32 | 3.00 | 13.17 | 0.92 | 1.44 |
| 0 | 1.00 | 3.00 | 14.06 | 1.00 | 1.00 |
| 5 | 0.62 | 3.00 | 15.13 | 1.10 | 0.56 |
| 10 | 0.14 | 3.00 | 16.43 | 1.21 | 0.12 |
| 15 | −0.46 | 3.00 | 18.11 | 1.37 | −0.34 |
| 20 | −1.29 | 3.00 | 20.40 | 1.57 | −0.82 |

Referring now to FIGS. 25-28, a generator 851 of the transmission 850 is described. For simplicity, only the differences between the transmission 850 and the transmission 600 will be described. In the transmission 850, power enters from a sprocket 870 on the input side (right side) of FIG. 25, although in other embodiments torque can be transferred via a gear, pulley, or any other suitable method. The input disc 34 is on the right side of FIG. 25, and power travels from the input disc 34 to the balls 1 to the output disc 101. In the transmission 850 there is a single input and a single output, the cage 89 is fixed (does not rotate), and the idler 18 does not transfer power but freely rotates. A generator 851 is positioned on the output side of the transmission 850 between a rotating hub shell 872 and a non-rotating slotted stator 858.

The output disc 101 is attached to the hub shell 872 with an interference fit, welding, standard fasteners, a key, or any other suitable method. In some embodiments, a magnetic steel ring **856*a* is attached to the hub shell 872 to minimize magnetic field losses. In other embodiments, the hub shell 872 is made of magnetic steel or other magnetic material and the steel ring 856*a* is eliminated. In still other embodiments, a portion of the hub shell 872 that contacts the generator 851** is made from a magnetic material while other portions can be made from aluminum, a composite, titanium, or other suitable material.

Attached to the steel ring **856*a* is a plurality of magnets 852. In some embodiments the magnets 852 are thin, flat components positioned radially around the longitudinal axis of the transmission 850. The magnets 852 in some embodiments are permanent magnets that have a radius on their inside diameter and their outside diameter concentric with the longitudinal axis 11. In some embodiments, a second steel ring 856*b* is attached to the slotted stator 858. In other embodiments the slotted stator 858** is made from magnetic steel or other magnetic material and is solid, to minimize magnetic field losses.

Figure 26:
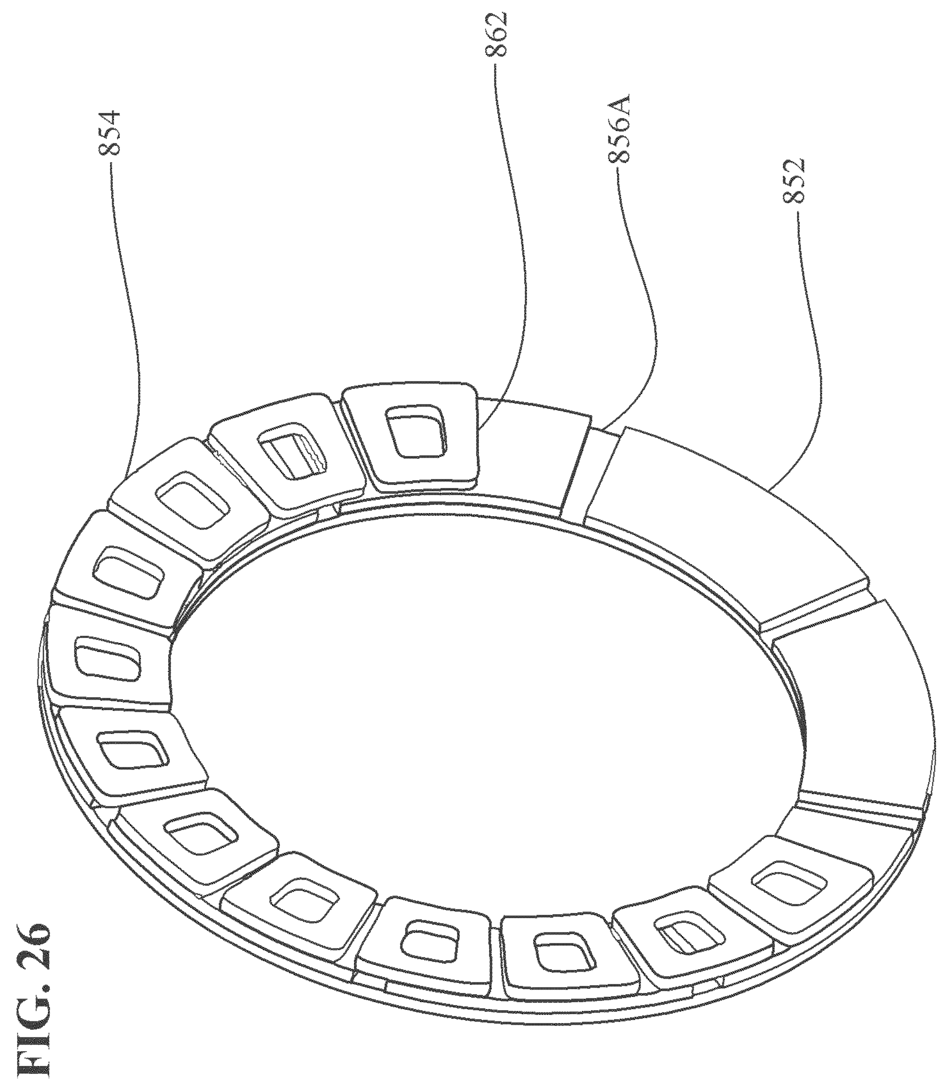
FIG. 26 is a perspective schematic view of the generator of the transmission of FIG. 25.

Attached to the second steel ring **856*b* is the stator 854, composed of a plurality of coils 862 (best seen in FIG. 26). The coils 862 are positioned radially around and concentric with the longitudinal axis 11 of the transmission 850. In some embodiments, the coils 862 are made from wire that is wound to form a substantially trapezoidal shape. In low power applications the coils 862** can be printed, such as on a circuit board.

In still other embodiments, the coils 862 can be formed from sheets of copper, silver, aluminum, or other conducting material. In one embodiment the generator 851 is an 8 pole brushless DC generator with three stator phases, although the generator 851 can be designed to produce electricity by any method known in the art.

Figure 28:
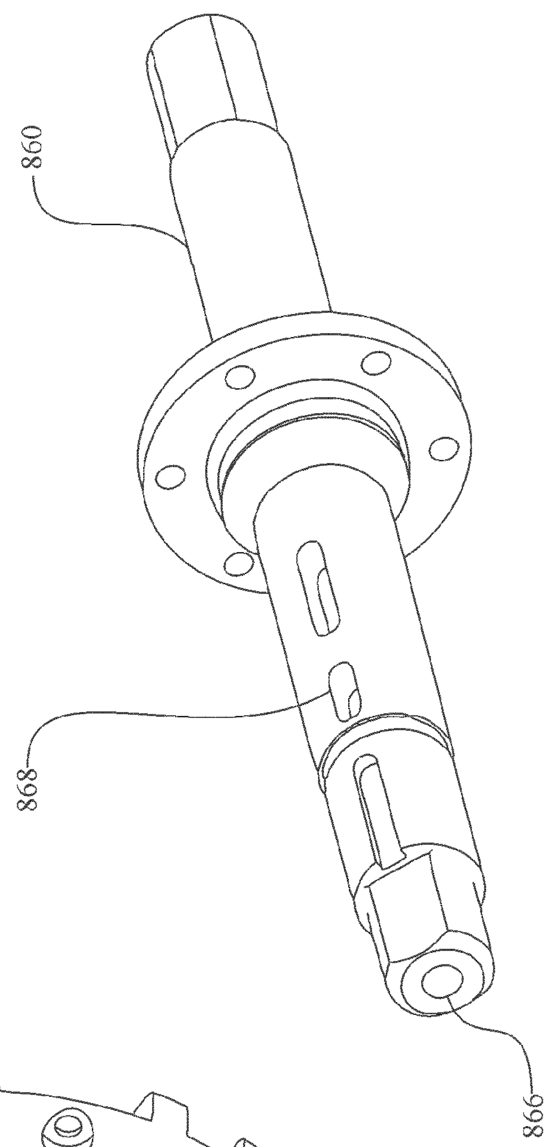
FIG. 28 is a perspective view of an axle of the transmission of FIG. 25.
Figure 27:
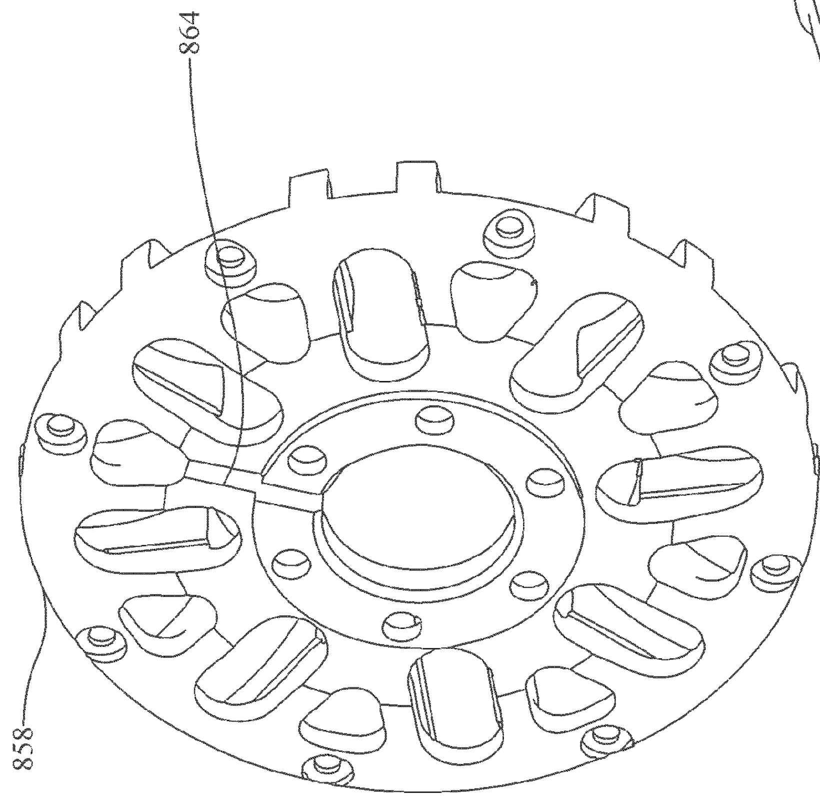
FIG. 27 is a perspective of a stator of the transmission of FIG. 25.

Referring now to FIGS. 27 and 28, the routing of the generator 851 wires is described. Wires (not shown) attached to the coils 862 are routed radially in a wire route 864 formed into the slotted stator 858. The wires travel circumferentially from the coils 862, and join in the wire route 864, where the wires are directed radially inward and through an axle wire slot 868, into a bore 866 in the hollow axle 860. The hollow axle 860, the slotted stator 858, the steel ring 856*b*, and the coils 862 are all stationary, non-rotating components, and are all attached to each other. The wires then travel through the bore 866 of the hollow axle 860 and exit on the output side (left side) of the transmission 850.

Figure 29:
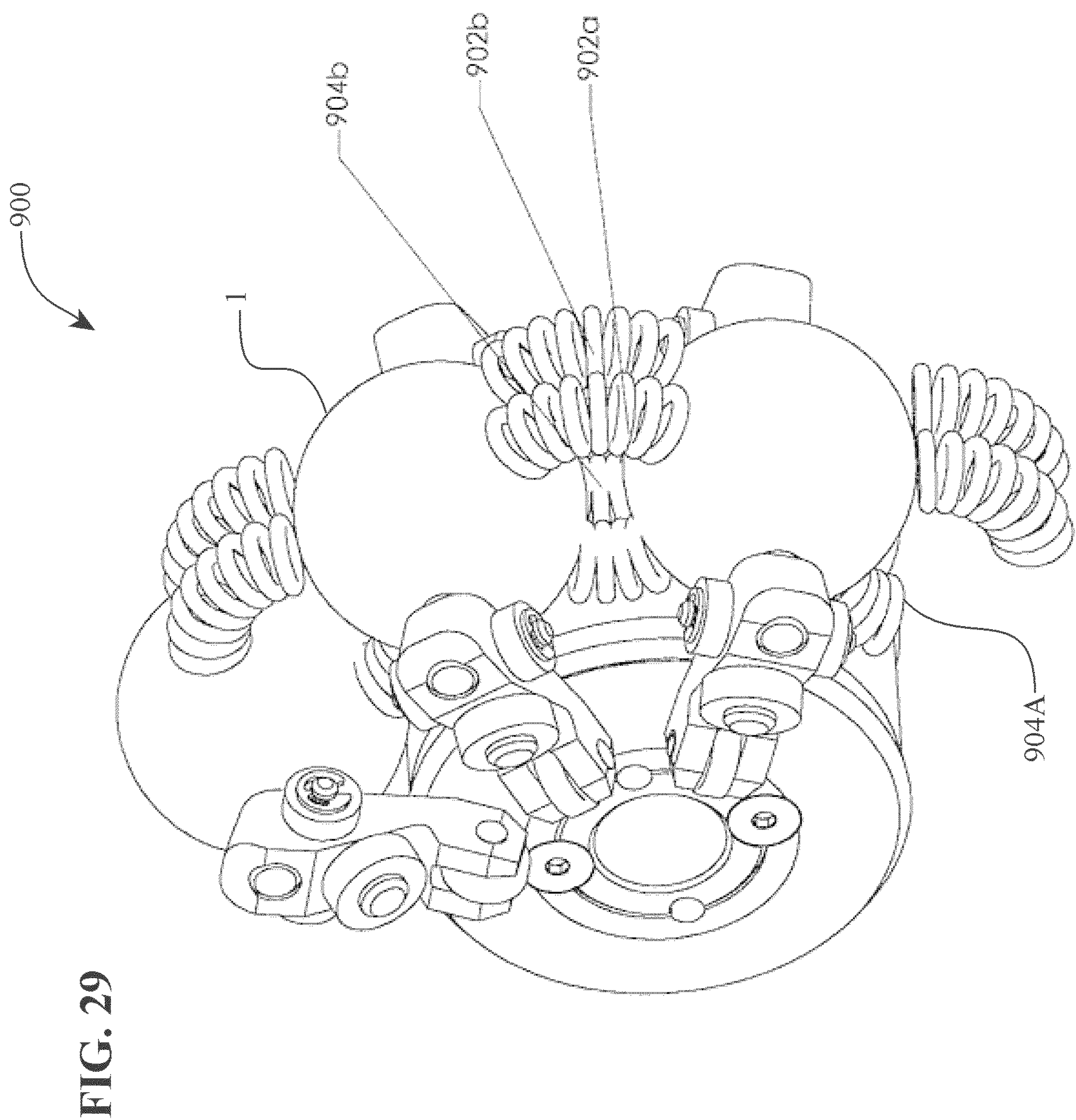
FIG. 29 is a perspective schematic view of the transmission of FIG. 9 with an integrated electric motor.
Figure 30:
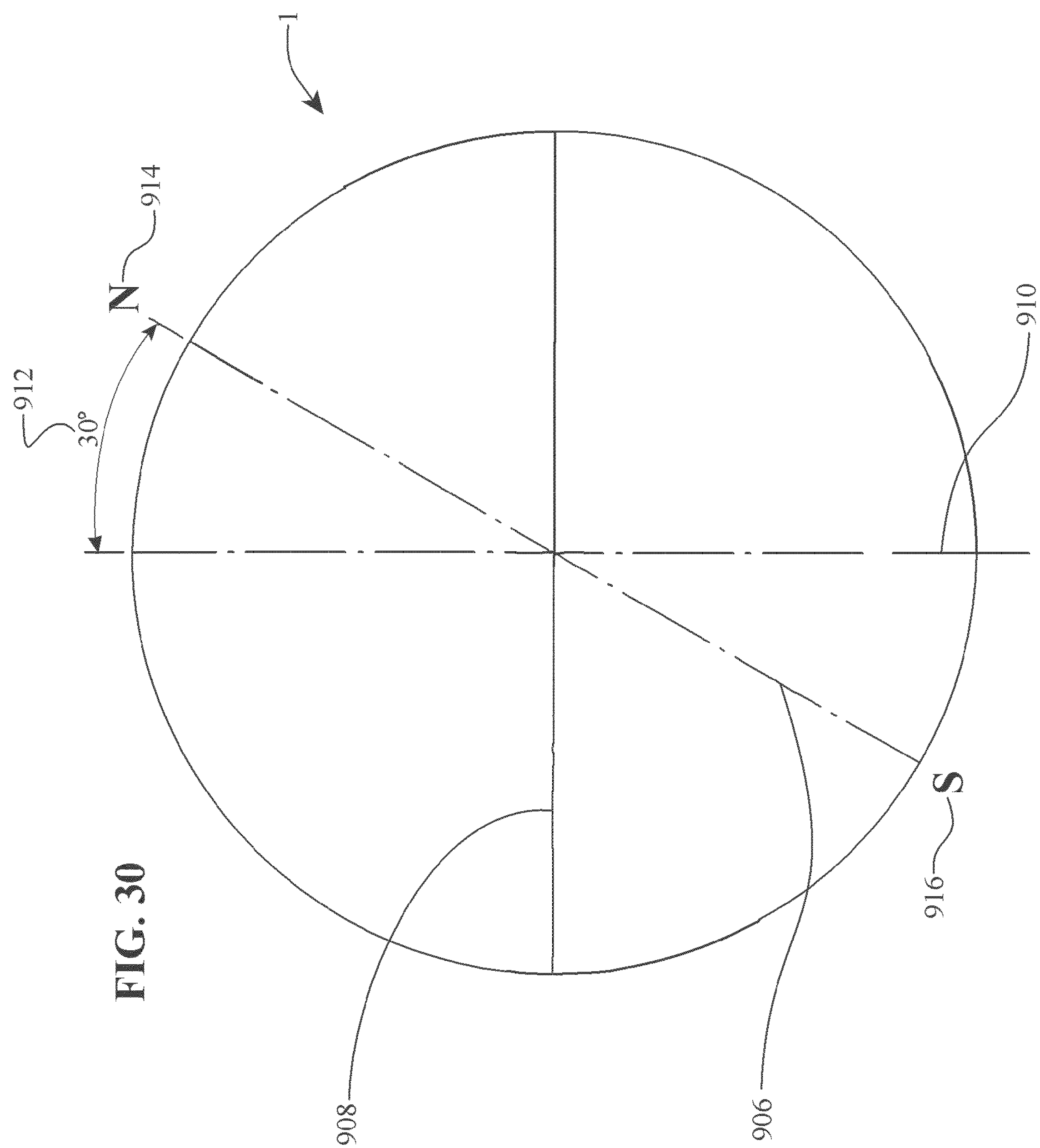
FIG. 30 is a sketch of the magnetic poles of a ball of the motor of FIG. 29.

Referring now to FIGS. 29 and 30, an alternative motor/generator 900 (MG 900) of the transmission 600 is disclosed where the balls 1 are permanent magnets. The MG 900 can be used in place of the MG 601 or in addition to the MG 601. In some embodiments, the balls 1 are made from sintered hard ferrite ceramic magnetic material, such as strontium ferrite, that has been optimized for its mechanical properties as well as magnetic properties. The hard ferrite ceramic magnets can achieve hardness approaching hardened tool steel and the material is significantly lighter than steel. Additionally, the holes in the balls 1 can be formed during the sintering process. In other embodiments, the balls 1 can be made from rare earth neodymium iron boron, which produces extremely strong permanent magnets. The neodymium iron boron material is optimized for its mechanical properties as well as its magnetic properties, and is sintered. Neodymium iron boron magnets can be made very hard, with hardness similar to hardened tool steel. Due to the corrosive nature of neodymium iron boron, in some embodiments the neodymium iron boron undergoes a final process where a corrosion resistant coating is applied. This coating can also be a high friction coating, where a material such as silicon nitride is used. Additionally, the coating can produce a textured service to increase friction in the contact patches between the balls 1, the input disc 34, the output disc 101, and in some embodiments the idler 18. Alternatively, the textured surface on the balls 1 can be formed during the sintering process of either the neodymium iron boron or the hard ferrite ceramic.

Referring to FIG. 30, the forming of the magnetic north 914 and south 916 poles on the balls 1 during the manufacturing process is described. In some embodiments the balls 1 are magnetized so that the pole axis 910 of the north 914 and south 916 poles are not 90 degrees to the ball axis 908 but are angularly offset to maximize the area of the coils out 902 and coils in 904 that can be positioned between the balls 1, and to allow for changes in the position of the pole axis 906 during shifting. In some embodiments, the magnetic axis 906 is angularly offset 30 degrees from the pole axis 910, although in other embodiments the angle of the pole axis 906 can vary from 5-45 degrees from the pole axis 910.

Referring to FIGS. 29 and 30, the north poles 914 and the south poles 916 in some embodiments rotate on either the input or output side only. In FIG. 30, if the north pole 914 is positioned on the input side of the transmission 600, it will always rotate on the input side as long as gamma remains at 30 degrees or less. Similarly, the south pole 916 will always rotate on the output side. This provides room to maximize the amount of current carrying conductors between the balls 1. Two sets of adjacent coils (the perimeter coils 902*a,b* and the inside coils 904*a,b*) are positioned between the balls 1. The perimeter coils 902*b* and the inside coils 904*b* are positioned on the input side of the transmission 600 so that the north pole 914 rotates past these coils 902*b*, 904*b*. The perimeter coils 902*a* and the inside coils 904*a* are positioned on the output side of the transmission 600 so that the south pole 916 rotates past these coils 902*a*, 904*a*.

In some embodiments, the balls 1 and the coils 902*a,b* and 904*a,b* are configured as a brushless DC motor or generator and thus the polarity of the coils 902*a,b* and 904*a,b* is switched electronically. Each coil 902*a,b* and 904*a,b* can thus be controlled to attract two balls 1, if every other ball 1 is positioned so that its north pole 914 is positioned radially away from the longitudinal axis 11, and the remaining balls 1 are positioned so that their south poles 916 are positioned radially away from the longitudinal axis 11. Each ball 1 is positioned 180 degrees apart from its adjacent two balls. Each coil 902*a,b* and 904*a,b* has an iron core (not shown), similar to the laminations 686 in the electric stator 682 of the MG 601.

Referring now to FIGS. 31-35, an alternative MG 950 to the transmission 600 is shown. For simplicity, only the differences between the MG 950 and the MG 601 will be described. The stator 988 of the MG 950 has a generally toroidal shape, and is composed of individual conductors 954 arrayed radially around the longitudinal axis 11. The toroidal shape of the MG 950 increases surface area while allowing the magnets 970, 972 on each side of the stator 988 to have substantially equal surface areas. The conductors 954 in some embodiments are constructed from flat copper sheet, although other conductive materials can be used, including aluminum and silver. The thickness of the sheet metal depends on the amount of current that is run through the conductors 954, but is of sufficient thickness to maintain its final formed shape. The conductors 954 can be stamped or otherwise formed to produce a generally concave shape that widens toward the outside diameter of the stator 988. The conductors 954 transition from a generally axial direction near the inside diameter of the stator 988, to a radial direction at the outside diameter of the stator 988.

In some embodiments, the sides of the conductors 954 produce an angle that equals 360 degrees divided by the number of conductors 954. The conductors 954 have apertures to form a precise shape and for fastening purposes. A mount hole 962, which in some embodiments includes a countersink in the hole to allow for flush insertion of a flat head screw, is used for fastening the conductors 954 to a stator mount 968. In some embodiments, a copper flat head screw (not shown) is used to attach the conductors 954 to the stator mount 968. The copper flat head screw is threaded into a terminal 960 which routes the current to complete a circuit and/or connect a stator phase. At the perimeter of the stator 988, a jumper hole 964 is formed into the conductors 954 for the attachment of jumpers 956 which carry current and connect two conductors 954 that are not adjacent. In some embodiments, the jumper holes 964 are threaded, and a current carrying screw, such as a flat head copper screw is inserted through a jumper and threaded into jumper hole 964. In some embodiments, conductor tabs 966*a,b* are formed into corners of the conductors 954 that are at the perimeter of the stator 988.

Figure 35:
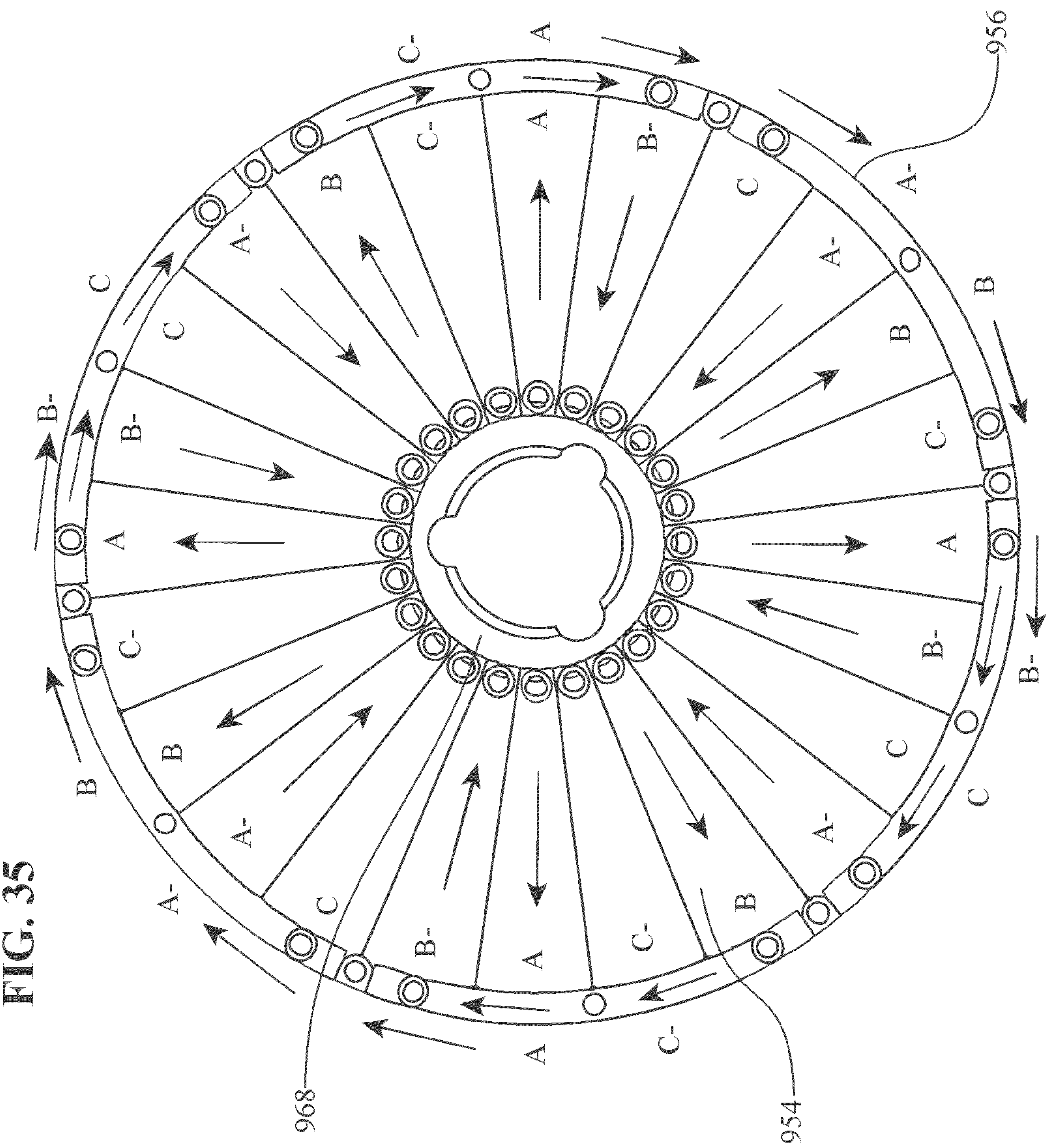
FIG. 35 is a schematic end view of the stator of the electric motor of FIG. 31 showing the current path.

Referring now to FIG. 35, the current path of the stator 988 is described. The stator 988 is made up of three stator phases, A, B, and C, although fewer or more stator phases can be used. Current direction is denoted by arrows pointing radially in or out on each conductor 954. If current is flowing in toward the center of the stator 988, the stator phase letter includes a negative sign, for example, A-, B-, C-. In each stator phase, A, B, and C, current alternately reverses direction, switches off, and then switches on again. Current in stator phase A flows north, then south, then off, then north, etc. In FIG. 35, current in stator phase A flows north, current in stator phase B flows south, and stator phase C is off. Each jumper 956 carries current clockwise from a conductor 954 to a conductor 954 in the same stator phase that is three conductors 954 away. In some embodiments, 24 conductors 954 are used although more or fewer conductors 954 can be employed. Each of the 24 conductors 954 takes up, or occupies 15 degrees of the 360 degree stator 988. In some embodiments, 12 jumpers 956 are used, although this number varies with the number of stator phases and conductors 954. There are 6 jumpers 956 attached to a first, visible, side of the stator 988 and six jumpers attached to a second, back side (not visible) of the stator 988. Letters outside the perimeter of the stator 988 denote the location of jumpers 956 on the second, back side of the stator 988. In some embodiments, the jumpers 956 are made of copper and strengthen the structure of the stator 988. The terminals 960 (seen in FIG. 31) complete the circuit of each coil and connect the stator phases.

Figure 32:
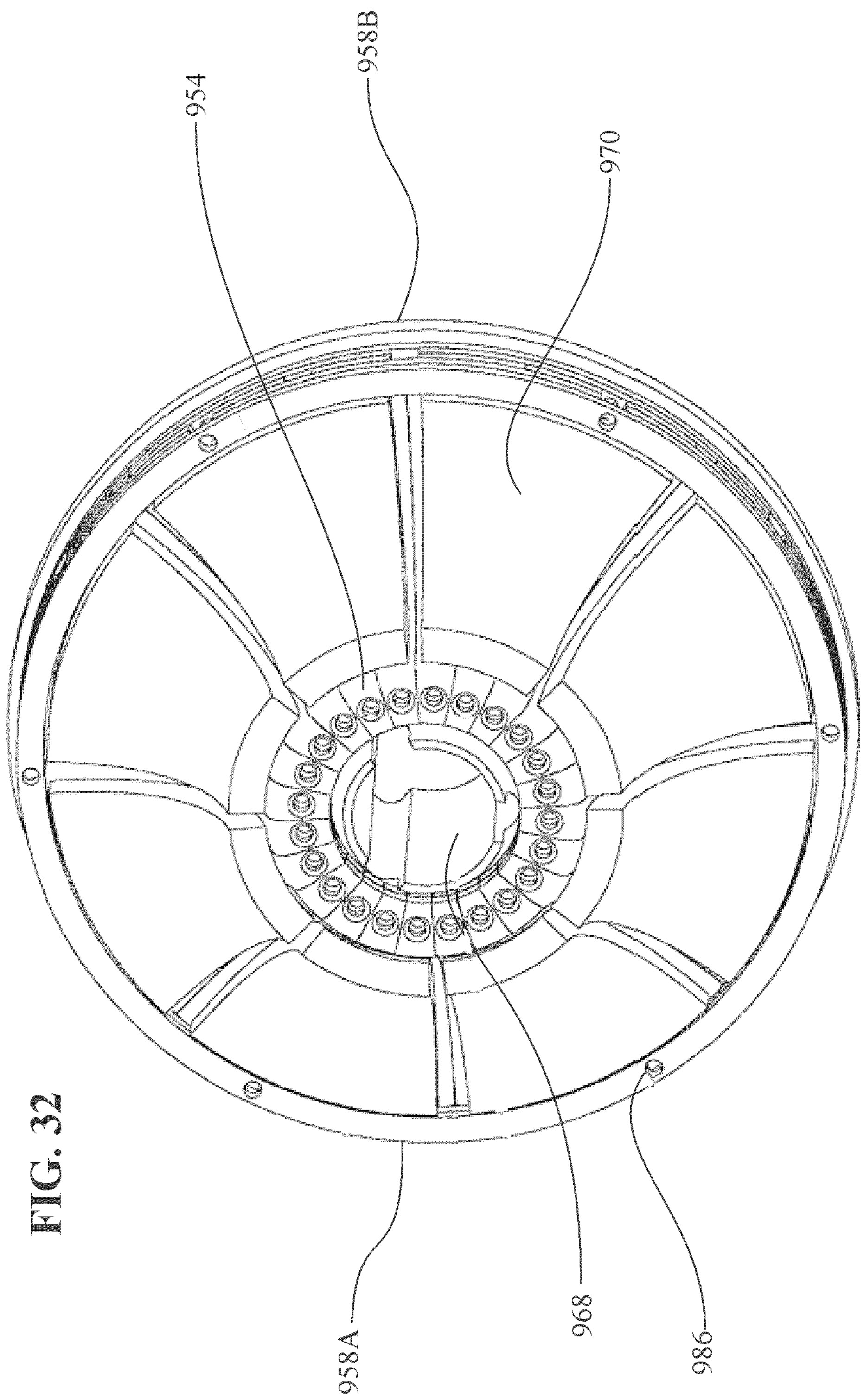
FIG. 32 is a perspective view of the rotor and stator of the electric motor of FIG. 31.
Figure 34:
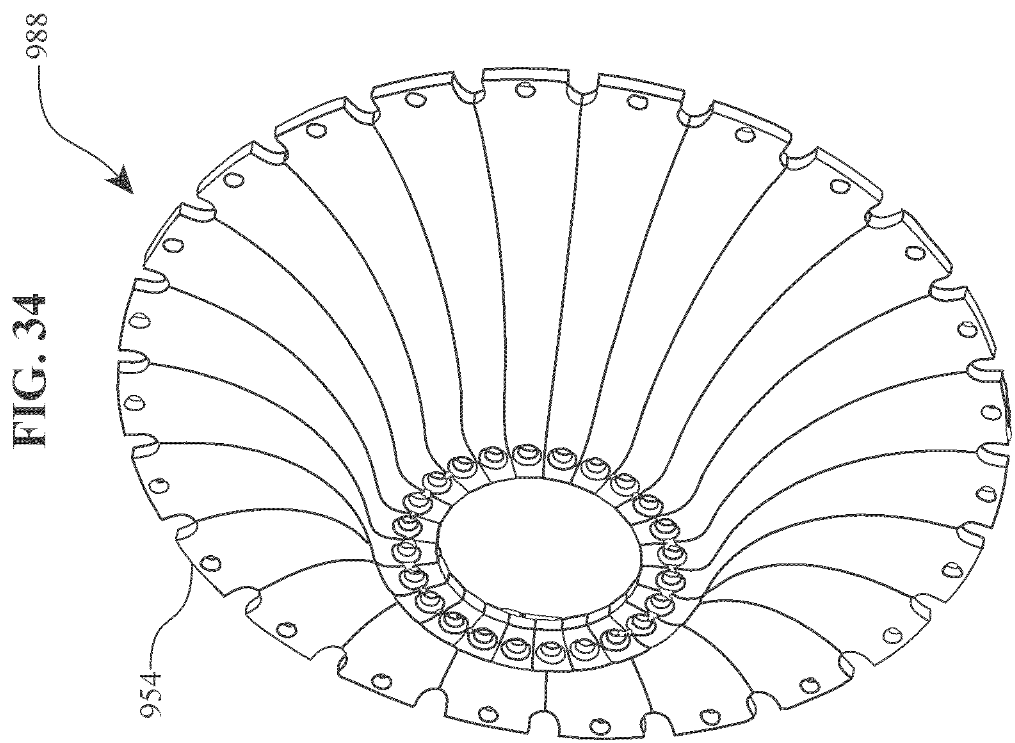
FIG. 34 is a perspective view of the stator of the electric motor of FIG. 31.
Figure 33:
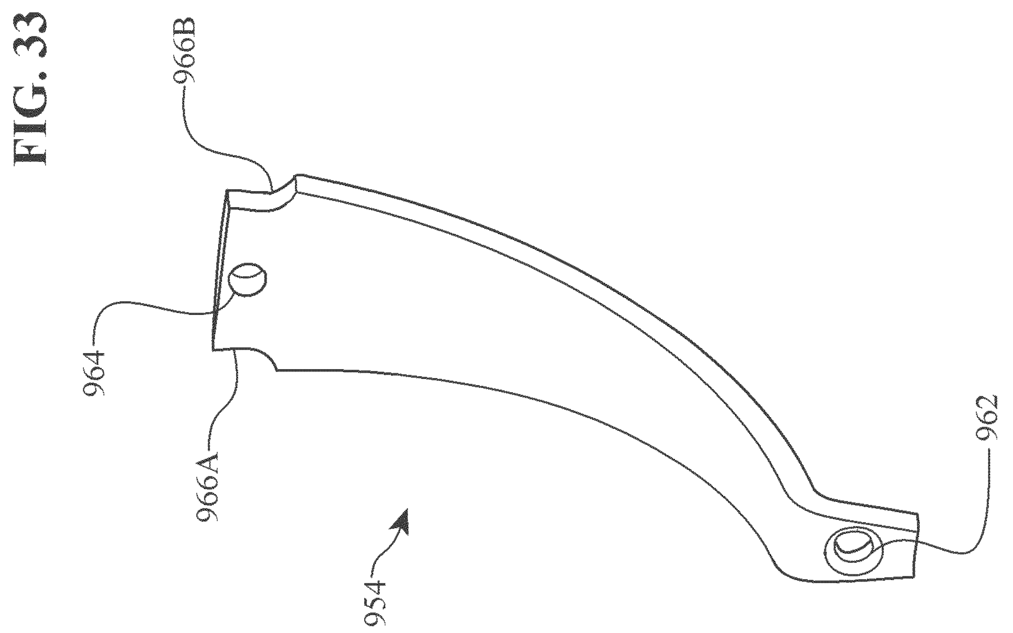
FIG. 33 is a perspective view of the conductor of the electric motor of FIG. 31.

Referring now to FIG. 32, two clamp rings 958*a,b*, which in some embodiments are non-conducting rings such as nylon, another plastic, or a composite, are attached to the stator 988. In some embodiments the clamp rings 958*a,b* are connected to each other with standard fasteners such as screws and nuts that are inserted through ring holes 986 in the clamp rings 958*a,b*, while in other embodiments the clamp rings 958*a,b* are attached to a jumper 956 on the opposite side of the stator 988 with a non-conducting screw. In still other embodiments, the clamp rings 958*a,b* are attached to the conductors 954 by threading a non-conducting screw, such as a nylon screw, through ring holes 986 in the clamp rings 958*a,b* and into a tapped hole in a conductor 954. The clamp rings 958*a,b* hold the conductors 954 in position and strengthen the structure of the stator 988.

Because the conductors 954 are not wires, and because the stator 988 is structural, it does not have to be impregnated with resin or other similar material as is common in the art. This allows the magnets of the rotor 992 to be positioned closer together to maximize the torque developed by the MG 950, and reduces the cost of manufacturing the stator 988. Because the conductors 954 are generally thicker than wires, more current can be carried by the conductors 954, which allows more torque to be produced by the MG 950. Due to the elimination of wires in the MG 950, the cost of winding the coils is eliminated. Tooling to create windings is expensive, and the tooling cost is eliminated.

Figure 31:
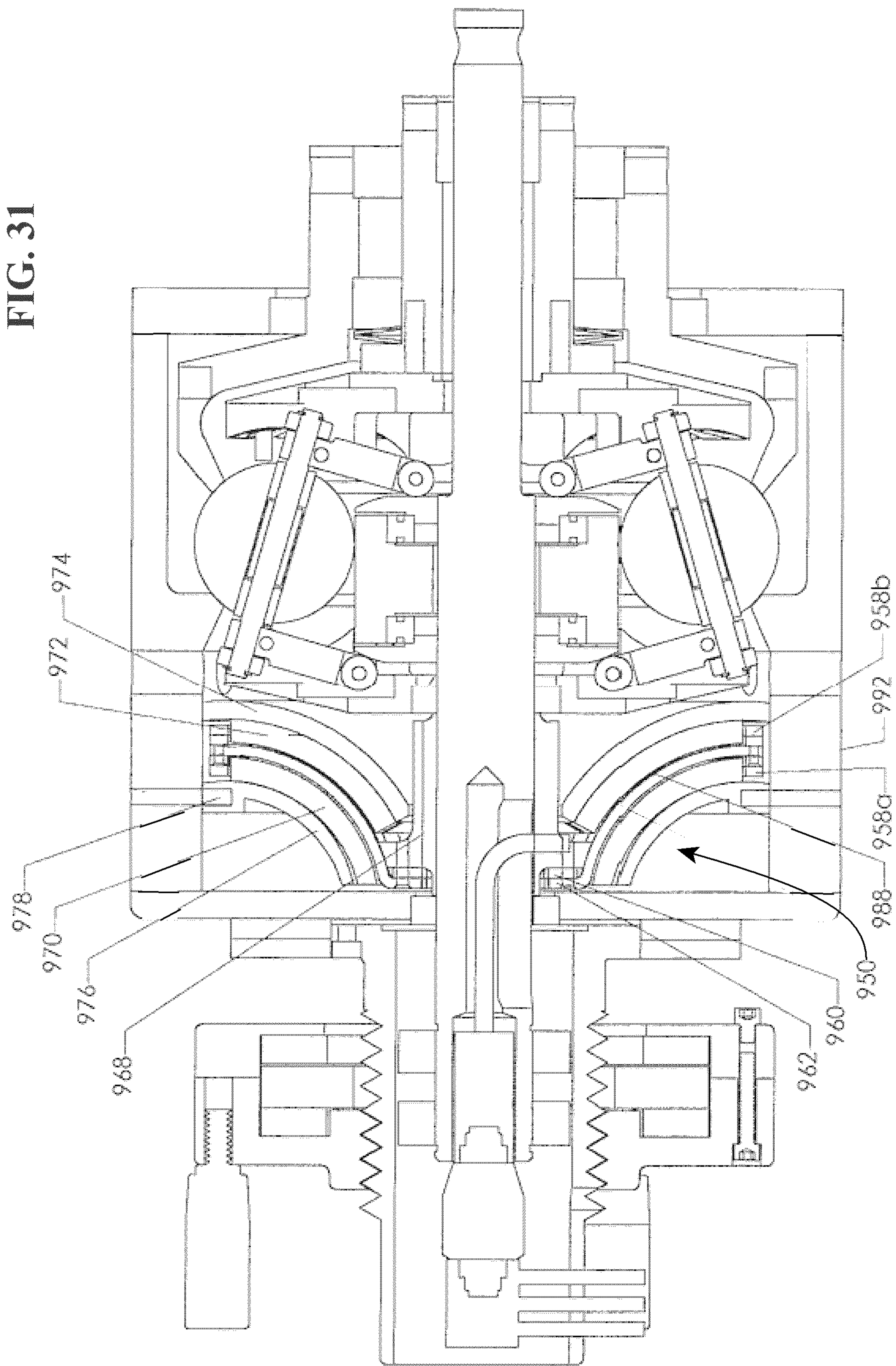
FIG. 31 is a cutaway side view of an alternative electric motor of the transmission of FIG. 9.

Referring to FIGS. 31 and 32, the magnets 970, 972 of the MG 950 are described. Two sets of magnets 970, 972 (the outside magnets 970 and the inside magnets 972) are positioned on first and second sides of the stator 988. In some embodiments the inside magnets 972, the stator 988, and the outside magnets 970 have a cross sectional profile that have concentric radii. The magnets 970, 972 are arrayed radially around the longitudinal axis 11 and form a toroidal shape. The magnets 970, 972 are positioned so that the surface facing the stator 988 is a uniform distance from the stator 988. This distance is as close as possible but provides for manufacturing errors and tolerances to ensure that the magnets 970, 972 do not contact the stator 988. In some embodiments, there are eight outside magnets 970 and eight inside magnets 972, although more or fewer magnets may be used. In some embodiments, the MG 950 is an eight pole brushless DC motor, although AC or DC motors with any frequency and any number of poles can be used.

Attached to the inside magnets 972 using adhesive or any other appropriate method, is a toroid-shaped magnetic inside steel. The inside steel 974 can also be made from other magnetic material and is rigidly attached to the rotor 992 by an interference fit, welding, standard fasteners, or other suitable method. The stator mount 968 and stator 988 in some embodiments are assembled outside of the transmission 600 and inserted as a sub-assembly during assembly. Attached to the outside magnets 970 using adhesive or any other appropriate method is a toroid-shaped magnetic outside steel 976. The outside steel 976 can also be made from other magnetic material and is inserted into the inside diameter of the rotor 992 after the stator 988 has been assembled. In some embodiments the outside steel 976 is rigidly attached to the rotor 992 by inserting machine screws through case steel holes in the rotor 992 and threading them into tapped outside holes 978 formed into perimeter of the outside steel 976.

Figure 37:
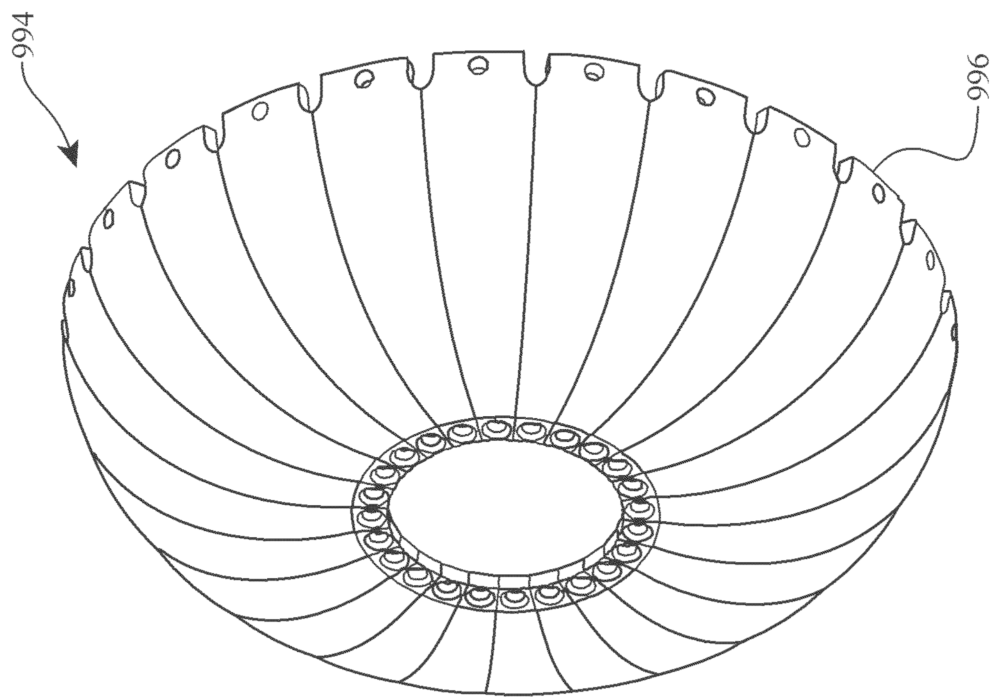
FIG. 37 is an alternative embodiment of the stator of the electric motor of FIG. 31.
Figure 36:
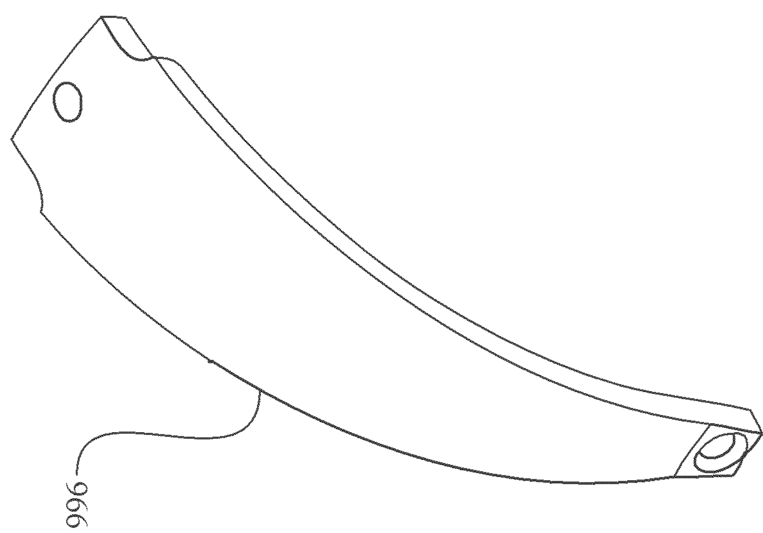
FIG. 36 is an alternative embodiment of the conductor of the electric motor of FIG. 31.

Referring now to FIGS. 36 and 37, an alternative convex stator 994 to the stator 988 is described. The convex stator 994 is otherwise identical to the stator 988 except that the convex conductors 996 are formed into a convex shape, so that at a position closest to the inside diameter of the convex stator 994, the convex conductors 996 curve radially inward and at the perimeter of the convex stator 994, the convex conductors 996 curve in an axial direction. The magnets (not shown) are formed so that the surfaces facing the convex stator 994 is a uniform distance from the convex stator 994.

Figure 38:
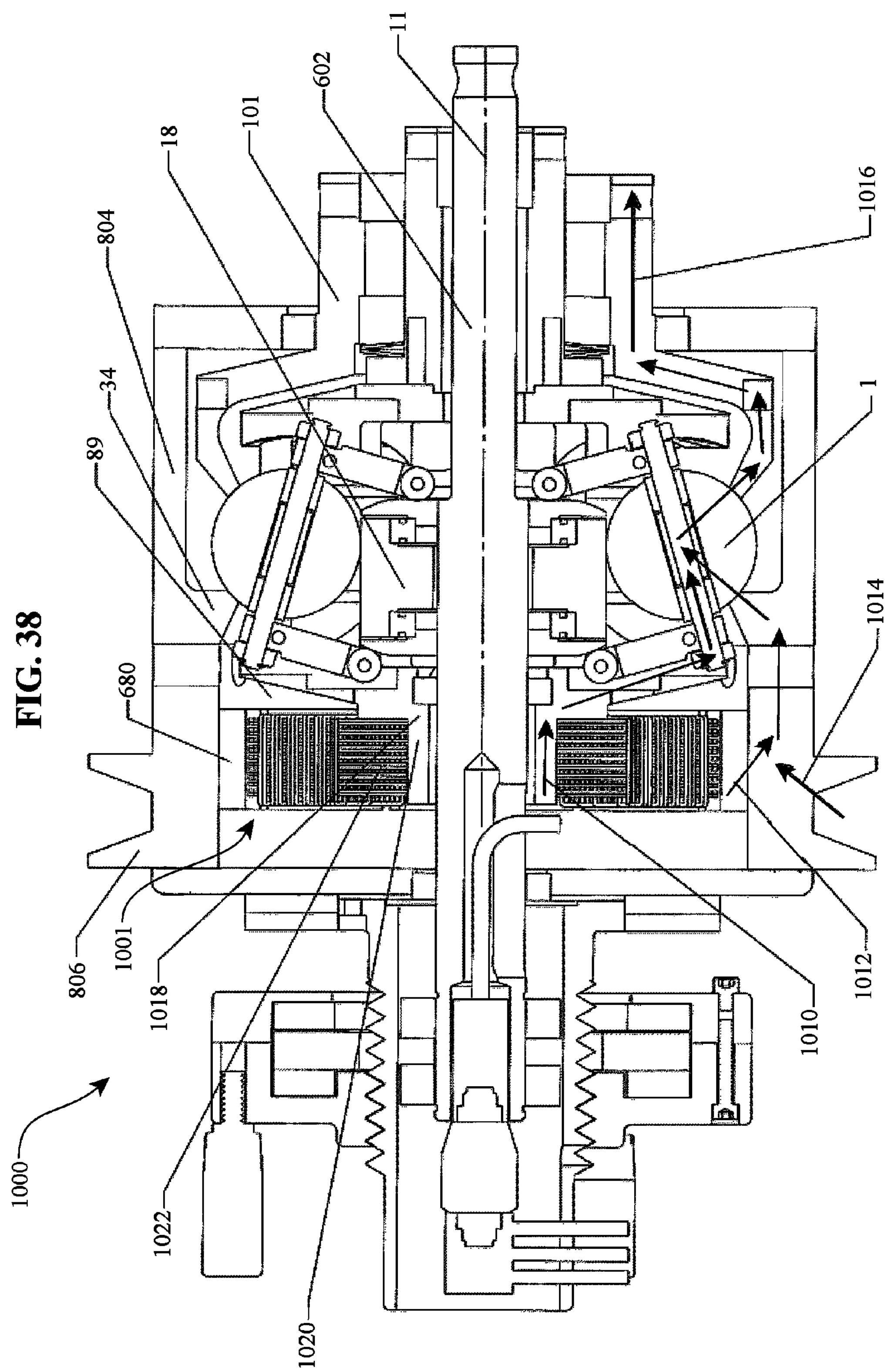
FIG. 38 is a cutaway side view of an alternative embodiment of the transmission of FIG. 23.

Referring now to FIG. 38, an alternative embodiment of the transmission 800 is disclosed. For simplicity, only the differences between the transmission 1000 and the transmission 800 will be disclosed. In the transmission 1000 the magnets 680 attach to the inside diameter of the hybrid case 804. The input disc 34 rigidly attaches to the rotating hybrid case 804, as does the hybrid pulley 806. The electric stator 1022 rigidly attaches to an alternative boss 1020 on the alternative stator 1018. The alternative boss 1020 is a cylindrical protrusion located around and near the perimeter of the inside diameter of the alternative stator 1018. The MG 1001 rotates in the same direction and relative to the input disc 34. As the hybrid case 804 is rotated by an outside source, such as an internal combustion engine, the cage 89 rotates in the same direction.

In some embodiments, the cage 89 rotates at a faster speed than the input disc 34 and thus an IVT results. The speed differential between the rotation of the input disc 34 and the cage 89 can be set by designing the frequency, number of poles, and stator phases of the MG 1001 to produce the desired speed differential. In some embodiments, the cage 89 is designed to rotate at three times the speed of the input disc 34. The transmission 1000 can be driven by the MG 1001 only, the internal combustion engine only, or both simultaneously. For applications involving some electric vehicles, only the MG 1001 is used at startup. Because the input disc 34 is not rotating an IVT results. When only the cage 89 is rotating and the input disc 34 is fixed the transmission 1000 can be shifted into forward or reverse seamlessly. At some forward speed in the ratio of the transmission 1000 being driven by the cage 89 only, the output speed of the transmission 1000 will equal the output speed if the transmission 1000 is driven by the input disc 34 only, at the same gamma. Where the speed ratios meet, the MG 1001 can be turned off, and the internal combustion engine can be turned on. In this powerpath, a CVT results if the cage 89 is not rotating and the input disc 34 is rotating. Since the electric stator 1022 is stationary, and the magnets 680 are rotating, the MG 1001 becomes a generator, and in some embodiments is used to recharge batteries.

Increasing power through the transmission 1000 can be accomplished by turning on both the MG 1001 and the internal combustion engine simultaneously. The MG 1001 can be turned on at any point along the ratio of the CVT when the CVT is in overdrive, when only the input disc 34 is rotating and the cage 89 is not rotating. Operating both the internal combustion engine and the MG 1001 simultaneously increases acceleration and power through the transmission 1000. In some embodiments, a second set of magnets 680 (not shown) is attached to the idler shaft 602 to increase the power density of the electric motor 1001. In some embodiments, the second set of magnets 680 attached to the idler shaft 602 have fewer poles than the magnets 680 attached to the hybrid case 804. In embodiments that use two sets of magnets 680, a compound current is sent to the electric stator 1022.

Still referring to FIG. 38, the paths of power through the transmission 1000 will be described. Power through the cage path 1010 is denoted by arrows which start at the inside diameter of the electric stator 1022 and travel through the alternative stator 1018, through the cage 89, and into the balls 1. Power from the magnet path 1012 begins at the magnets 680, continues through the hybrid case 804, through the input disc 34, and into the balls 1. Power from an outside source, such as an internal combustion engine, begins at the hybrid pulley 806 path 1014, continues through the hybrid case 804, through the input disc 34, and into the balls 1. Output power flows from the balls 1, through the output disc 101, and via a powerpath 1016 to an external driven component, such as a drive shaft or wheel.

The transmission 600 when combined with an MG 601 allows for many powerpath designs. The following charts list four-hundred-and-ten powerpaths. The paths are numbered from 1 to 410. The components of the transmission 600 that can transfer power are the cage 89, the input disc 34, the output disc 101, the idler 18, and the balls 1. The cage 34 and the idler 18 can be both inputs and outputs simultaneously because they can be designed to extend from the input side of the transmission 600 through the output side. In a powerpath where either the cage 89 or the idler 18 is both an input and an output it is designated with the term "In/Out." The balls 1 can only be an intermediate torque transferring component or serve as an input, such as in the case where the balls 1 are magnets and are part of the MG 900. If the power transferring component is an input (that is, it receives power entering the transmission 600), it is designated with the term "In," and if it transfers power out of the transmission it is designated with the term "Out." If the power transferring component does not transfer power and is free to rotate it is designated with the term "Free," and if it is fixed it is designated with the term "Fix."

Following are the powerpaths when the cage 89 is fixed.

| Path | 89 | 34 | 101 | 18 | 1 |
|---|---|---|---|---|---|
| 1 | Fix | In | In | Out | |
| 2 | Fix | In | In | In/Out | |
| 3 | Fix | In | Out | In | |
| 4 | Fix | In | Out | Out | |
| 5 | Fix | In | Out | Free | |
| 6 | Fix | In | Out | In/Out | |
| 7 | Fix | In | Free | Out | |
| 8 | Fix | In | Free | In/Out | |
| 9 | Fix | Out | In | In | |
| 10 | Fix | Out | In | Out | |
| 11 | Fix | Out | In | Free | |
| 12 | Fix | Out | In | In/Out | |
| 13 | Fix | Out | Out | In | |
| 14 | Fix | Out | Out | In/Out | |

-continued

| Path | 89 | 34 | 101 | 18 | 1 |
|---|---|---|---|---|---|
| 15 | Fix | Out | Free | In | |
| 16 | Fix | Out | Free | In/Out | |
| 17 | Fix | Free | In | Out | |
| 18 | Fix | Free | In | In/Out | |
| 19 | Fix | Free | Out | In | |
| 20 | Fix | Free | Out | In/Out | |
| 21 | Fix | In | In | Out | In |
| 22 | Fix | In | In | In/Out | In |
| 23 | Fix | In | Out | In | In |
| 24 | Fix | In | Out | Out | In |
| 25 | Fix | In | Out | Free | In |
| 26 | Fix | In | Out | In/Out | In |
| 27 | Fix | In | Free | Out | In |
| 28 | Fix | In | Free | In/Out | In |
| 29 | Fix | Out | In | In | In |
| 30 | Fix | Out | In | Out | In |
| 31 | Fix | Out | In | Free | In |
| 32 | Fix | Out | In | In/Out | In |
| 33 | Fix | Out | Out | In | In |
| 34 | Fix | Out | Out | In/Out | In |
| 35 | Fix | Out | Free | In | In |
| 36 | Fix | Out | Free | In/Out | In |
| 37 | Fix | Free | In | Out | In |
| 38 | Fix | Free | In | In/Out | In |
| 39 | Fix | Free | Out | In | In |
| 40 | Fix | Free | Out | In/Out | In |
| 41 | Fix | Out | Out | Out | In |

Following are the powerpaths when the input disc 34 is fixed.

| Path | 89 | 34 | 101 | 18 | 1 |
|---|---|---|---|---|---|
| 42 | In | Fix | In | In | |
| 43 | In | Fix | In | Out | |
| 44 | In | Fix | In | Free | |
| 45 | In | Fix | In | In/Out | |
| 46 | In | Fix | Out | In | |
| 47 | In | Fix | Out | Out | |
| 48 | In | Fix | Out | Free | |
| 49 | In | Fix | Out | In/Out | |
| 50 | In | Fix | Free | In | |
| 51 | In | Fix | Free | Out | |
| 52 | In | Fix | Free | In/Out | |
| 53 | Out | Fix | In | In | |
| 54 | Out | Fix | In | Out | |
| 55 | Out | Fix | In | Free | |
| 56 | Out | Fix | In | In/Out | |
| 57 | Out | Fix | Out | In | |
| 58 | Out | Fix | Out | Out | |
| 59 | Out | Fix | Out | Free | |
| 60 | Out | Fix | Out | In/Out | |
| 61 | Out | Fix | Free | In | |
| 62 | Out | Fix | Free | Out | |
| 63 | Out | Fix | Free | In/Out | |
| 64 | Free | Fix | In | Out | |
| 65 | Free | Fix | In | In/Out | |
| 66 | Free | Fix | Out | In | |
| 67 | Free | Fix | Out | In/Out | |
| 68 | In/Out | Fix | In | In | |
| 69 | In/Out | Fix | In | Out | |
| 70 | In/Out | Fix | In | Free | |
| 71 | In/Out | Fix | In | In/Out | |
| 72 | In/Out | Fix | Out | In | |
| 73 | In/Out | Fix | Out | Out | |
| 74 | In/Out | Fix | Out | Free | |
| 75 | In/Out | Fix | Out | In/Out | |
| 76 | In/Out | Fix | Free | In | |
| 77 | In/Out | Fix | Free | Out | |
| 78 | In/Out | Fix | Free | In/Out | |
| 79 | In | Fix | In | In | In |
| 80 | In | Fix | In | Out | In |
| 81 | In | Fix | In | Free | In |
| 82 | In | Fix | In | In/Out | In |
| 83 | In | Fix | Out | In | In |

-continued

| Path | 89 | 34 | 101 | 18 | 1 |
|---|---|---|---|---|---|
| 84 | In | Fix | Out | Out | In |
| 85 | In | Fix | Out | Free | In |
| 86 | In | Fix | Out | In/Out | In |
| 87 | In | Fix | Free | In | In |
| 88 | In | Fix | Free | Out | In |
| 89 | In | Fix | Free | In/Out | In |
| 90 | Out | Fix | In | In | In |
| 91 | Out | Fix | In | Out | In |
| 92 | Out | Fix | In | Free | In |
| 93 | Out | Fix | In | In/Out | In |
| 94 | Out | Fix | Out | In | In |
| 95 | Out | Fix | Out | Out | In |
| 96 | Out | Fix | Out | Free | In |
| 97 | Out | Fix | Out | In/Out | In |
| 98 | Out | Fix | Free | In | In |
| 99 | Out | Fix | Free | Out | In |
| 100 | Out | Fix | Free | In/Out | In |
| 101 | Free | Fix | In | Out | In |
| 102 | Free | Fix | In | In/Out | In |
| 103 | Free | Fix | Out | In | In |
| 104 | Free | Fix | Out | In/Out | In |
| 105 | In/Out | Fix | In | In | In |
| 106 | In/Out | Fix | In | Out | In |
| 107 | In/Out | Fix | In | Free | In |
| 108 | In/Out | Fix | In | In/Out | In |
| 109 | In/Out | Fix | Out | In | In |
| 110 | In/Out | Fix | Out | Out | In |
| 111 | In/Out | Fix | Out | Free | In |
| 112 | In/Out | Fix | Out | In/Out | In |
| 113 | In/Out | Fix | Free | In | In |
| 114 | In/Out | Fix | Free | Out | In |
| 115 | In/Out | Fix | Free | In/Out | In |
| 116 | Out | Fix | Out | Out | In |

Following are the powerpaths when the output disc 101 is fixed.

| Path | 89 | 34 | 101 | 18 | 1 |
|---|---|---|---|---|---|
| 117 | In | In | Fix | In | |
| 118 | In | In | Fix | Out | |
| 119 | In | In | Fix | Free | |
| 120 | In | In | Fix | In/Out | |
| 121 | In | Out | Fix | In | |
| 122 | In | Out | Fix | Out | |
| 123 | In | Out | Fix | Free | |
| 124 | In | Out | Fix | In/Out | |
| 125 | In | Free | Fix | In | |
| 126 | In | Free | Fix | Out | |
| 127 | In | Free | Fix | In/Out | |
| 128 | Out | In | Fix | In | |
| 129 | Out | In | Fix | Out | |
| 130 | Out | In | Fix | Free | |
| 131 | Out | In | Fix | In/Out | |
| 132 | Out | Out | Fix | In | |
| 133 | Out | Out | Fix | Out | |
| 134 | Out | Out | Fix | Free | |
| 135 | Out | Out | Fix | In/Out | |
| 136 | Out | Free | Fix | In | |
| 137 | Out | Free | Fix | Out | |
| 138 | Out | Free | Fix | In/Out | |
| 139 | Free | In | Fix | Out | |
| 140 | Free | In | Fix | In/Out | |
| 141 | Free | Out | Fix | In | |
| 142 | Free | Out | Fix | In/Out | |
| 143 | In/Out | In | Fix | In | |
| 144 | In/Out | In | Fix | Out | |
| 145 | In/Out | In | Fix | Free | |
| 146 | In/Out | In | Fix | In/Out | |
| 147 | In/Out | Out | Fix | In | |
| 148 | In/Out | Out | Fix | Out | |
| 149 | In/Out | Out | Fix | Free | |
| 150 | In/Out | Out | Fix | In/Out | |
| 151 | In/Out | Free | Fix | In | |
| 152 | In/Out | Free | Fix | Out | |

-continued

| Path | 89 | 34 | 101 | 18 | 1 |
|---|---|---|---|---|---|
| 153 | In/Out | Free | Fix | In/Out | |
| 154 | In | In | Fix | In | In |
| 155 | In | In | Fix | Out | In |
| 156 | In | In | Fix | Free | In |
| 157 | In | In | Fix | In/Out | In |
| 158 | In | Out | Fix | In | In |
| 159 | In | Out | Fix | Out | In |
| 160 | In | Out | Fix | Free | In |
| 161 | In | Out | Fix | In/Out | In |
| 162 | In | Free | Fix | In | In |
| 163 | In | Free | Fix | Out | In |
| 164 | In | Free | Fix | In/Out | In |
| 165 | Out | In | Fix | In | In |
| 166 | Out | In | Fix | Out | In |
| 166 | Out | In | Fix | Out | In |
| 167 | Out | In | Fix | Free | In |
| 168 | Out | In | Fix | In/Out | In |
| 169 | Out | Out | Fix | In | In |
| 170 | Out | Out | Fix | Out | In |
| 171 | Out | Out | Fix | Free | In |
| 172 | Out | Out | Fix | In/Out | In |
| 173 | Out | Free | Fix | In | In |
| 174 | Out | Free | Fix | Out | In |
| 175 | Out | Free | Fix | In/Out | In |
| 176 | Free | In | Fix | Out | In |
| 177 | Free | In | Fix | In/Out | In |
| 178 | Free | Out | Fix | In | In |
| 179 | Free | Out | Fix | In/Out | In |
| 180 | In/Out | In | Fix | In | In |
| 181 | In/Out | In | Fix | Out | In |
| 182 | In/Out | In | Fix | Free | In |
| 183 | In/Out | In | Fix | In/Out | In |
| 184 | In/Out | Out | Fix | In | In |
| 185 | In/Out | Out | Fix | Out | In |
| 186 | In/Out | Out | Fix | Free | In |
| 187 | In/Out | Out | Fix | In/Out | In |
| 188 | In/Out | Free | Fix | In | In |
| 189 | In/Out | Free | Fix | Out | In |
| 190 | In/Out | Free | Fix | In/Out | In |
| 191 | Out | Out | Fix | Out | In |

Following are the powerpaths when the idler 18 is fixed.

| Path | 89 | 34 | 101 | 18 | 1 |
|---|---|---|---|---|---|
| 192 | In | In | Out | Fix | |
| 193 | In | Out | In | Fix | |
| 194 | In | Out | Free | Fix | |
| 195 | In | Out | Out | Fix | |
| 196 | In | Free | Out | Fix | |
| 197 | Out | In | In | Fix | |
| 198 | Out | In | Out | Fix | |
| 199 | Out | In | Free | Fix | |
| 200 | Out | Out | In | Fix | |
| 201 | Out | Free | In | Fix | |
| 202 | Free | In | Out | Fix | |
| 203 | Free | Out | In | Fix | |
| 204 | In/Out | In | Out | Fix | |
| 205 | In/Out | Out | In | Fix | |
| 206 | In/Out | Out | Free | Fix | |
| 207 | In/Out | Out | Out | Fix | |
| 208 | In/Out | Free | Out | Fix | |
| 209 | In/Out | In | In | Fix | |
| 210 | In/Out | In | Out | Fix | |
| 211 | In | In | Out | Fix | In |
| 212 | In | Out | In | Fix | In |
| 213 | In | Out | Free | Fix | In |
| 214 | In | Out | Out | Fix | In |
| 215 | In | Free | Out | Fix | In |
| 216 | Out | In | In | Fix | In |
| 217 | Out | In | Out | Fix | In |
| 218 | Out | In | Free | Fix | In |
| 219 | Out | Out | In | Fix | In |
| 220 | Out | Free | In | Fix | In |
| 221 | Free | In | Out | Fix | In |

-continued

| Path | 89 | 34 | 101 | 18 | 1 |
| --- | --- | --- | --- | --- | --- |
| 222 | Free | Out | In | Fix | In |
| 223 | In/Out | In | Out | Fix | In |
| 224 | In/Out | Out | In | Fix | In |
| 225 | In/Out | Out | Free | Fix | In |
| 226 | In/Out | Out | Out | Fix | In |
| 227 | In/Out | Free | Out | Fix | In |
| 228 | In/Out | In | In | Fix | In |
| 229 | In/Out | In | Out | Fix | In |
| 230 | Out | Out | Out | Fix | In |

Following are the powerpaths when no power transferring components are fixed.

| Path | 89 | 34 | 101 | 18 | 1 |
| --- | --- | --- | --- | --- | --- |
| 231 | In | In | In | Out | |
| 232 | In | In | In | In/Out | |
| 233 | In | In | Out | In | |
| 234 | In | In | Out | Out | |
| 235 | In | In | Out | Free | |
| 236 | In | In | Out | In/Out | |
| 237 | In | In | Free | Out | |
| 238 | In | In | Free | In/Out | |
| 239 | In | Out | In | In | |
| 240 | In | Out | In | Out | |
| 241 | In | Out | In | Free | |
| 242 | In | Out | In | In/Out | |
| 243 | In | Out | Out | In | |
| 244 | In | Out | Out | In/Out | |
| 245 | In | Out | Free | In | |
| 246 | In | Out | Free | In/Out | |
| 247 | In | Free | In | Out | |
| 248 | In | Free | In | In/Out | |
| 249 | In | Free | Out | In | |
| 250 | In | Free | Out | In/Out | |
| 251 | In | Free | Free | In/Out | |
| 252 | Out | In | In | In | |
| 253 | Out | In | In | Out | |
| 254 | Out | In | In | Free | |
| 255 | Out | In | In | In/Out | |
| 256 | Out | In | Out | In | |
| 257 | Out | In | Out | In/Out | |
| 258 | Out | In | Free | In | |
| 259 | Out | In | Free | In/Out | |
| 260 | Out | Out | In | In | |
| 261 | Out | Out | In | Out | |
| 262 | Out | Out | In | In/Out | |
| 263 | Out | Free | In | In | |
| 264 | Out | Free | In | In/Out | |
| 265 | Free | In | In | Out | |
| 266 | Free | In | In | In/Out | |
| 267 | Free | In | Out | In | |
| 268 | Free | In | Out | In/Out | |
| 269 | Free | In | Free | In/Out | |
| 270 | Free | Out | In | In | |
| 271 | Free | Out | In | In/Out | |
| 272 | Free | Free | In | In/Out | |
| 273 | In/Out | In | In | In | |
| 274 | In/Out | In | In | Out | |
| 275 | In/Out | In | In | Free | |
| 276 | In/Out | In | In | In/Out | |
| 277 | In/Out | In | Out | In | |
| 278 | In/Out | In | Out | Out | |
| 279 | In/Out | In | Out | Free | |
| 280 | In/Out | In | Out | In/Out | |
| 281 | In/Out | In | Free | In | |
| 282 | In/Out | In | Free | Out | |
| 283 | In/Out | In | Free | Free | |
| 284 | In/Out | In | Free | In/Out | |
| 285 | In/Out | Out | In | In | |
| 286 | In/Out | Out | In | Out | |
| 287 | In/Out | Out | In | Free | |
| 288 | In/Out | Out | In | In/Out | |
| 289 | In/Out | Out | Out | In | |
| 290 | In/Out | Out | Out | In/Out | |

-continued

| Path | 89 | 34 | 101 | 18 | 1 |
| --- | --- | --- | --- | --- | --- |
| 291 | In/Out | Out | Free | In | |
| 292 | In/Out | Out | Free | In/Out | |
| 293 | In/Out | Free | In | In | |
| 294 | In/Out | Free | In | Out | |
| 295 | In/Out | Free | In | Free | |
| 296 | In/Out | Free | In | In/Out | |
| 297 | In/Out | Free | Out | In | |
| 298 | In/Out | Free | Out | In/Out | |
| 299 | In/Out | Free | Free | In | |
| 300 | In/Out | Free | Free | In/Out | |

Following are the powerpaths with no components fixed and an input is through the balls 1.

| Path | 89 | 34 | 101 | 18 | 1 |
| --- | --- | --- | --- | --- | --- |
| 301 | In | In | In | Out | In |
| 302 | In | In | In | In/Out | In |
| 303 | In | In | Out | In | In |
| 304 | In | In | Out | Out | In |
| 305 | In | In | Out | Free | In |
| 306 | In | In | Out | In/Out | In |
| 307 | In | In | Free | Out | In |
| 308 | In | In | Free | In/Out | In |
| 309 | In | Out | In | In | In |
| 310 | In | Out | In | Out | In |
| 311 | In | Out | In | Free | In |
| 312 | In | Out | In | In/Out | In |
| 313 | In | Out | Out | In | In |
| 314 | In | Out | Out | In/Out | In |
| 315 | In | Out | Free | In | In |
| 316 | In | Out | Free | In/Out | In |
| 317 | In | Free | In | Out | In |
| 318 | In | Free | In | In/Out | In |
| 319 | In | Free | Out | In | In |
| 320 | In | Free | Out | In/Out | In |
| 321 | In | Free | Free | In/Out | In |
| 322 | Out | In | In | In | In |
| 323 | Out | In | In | Out | In |
| 324 | Out | In | In | Free | In |
| 325 | Out | In | In | In/Out | In |
| 326 | Out | In | Out | In | In |
| 327 | Out | In | Out | In/Out | In |
| 328 | Out | In | Free | In | In |
| 329 | Out | In | Free | In/Out | In |
| 330 | Out | Out | In | In | In |
| 331 | Out | Out | In | Out | In |
| 332 | Out | Out | In | In/Out | In |
| 333 | Out | Free | In | In | In |
| 334 | Out | Free | In | In/Out | In |
| 335 | Free | In | In | Out | In |
| 336 | Free | In | In | In/Out | In |
| 337 | Free | In | Out | In | In |
| 338 | Free | In | Out | In/Out | In |
| 339 | Free | In | Free | In/Out | In |
| 340 | Free | Out | In | In | In |
| 341 | Free | Out | In | In/Out | In |
| 342 | Free | Free | In | In/Out | In |
| 343 | In/Out | In | In | In | In |
| 344 | In/Out | In | In | Out | In |
| 345 | In/Out | In | In | Free | In |
| 346 | In/Out | In | In | In/Out | In |
| 347 | In/Out | In | Out | In | In |
| 348 | In/Out | In | Out | Out | In |
| 349 | In/Out | In | Out | Free | In |
| 350 | In/Out | In | Out | In/Out | In |
| 351 | In/Out | In | Free | In | In |
| 352 | In/Out | In | Free | Out | In |
| 353 | In/Out | In | Free | Free | In |
| 354 | In/Out | In | Free | In/Out | In |
| 355 | In/Out | Out | In | In | In |
| 356 | In/Out | Out | In | Out | In |
| 357 | In/Out | Out | In | Free | In |
| 358 | In/Out | Out | In | In/Out | In |
| 359 | In/Out | Out | Out | In | In |

-continued

| Path | 89 | 34 | 101 | 18 | 1 |
|---|---|---|---|---|---|
| 360 | In/Out | Out | Out | In/Out | In |
| 361 | In/Out | Out | Free | In | In |
| 362 | In/Out | Out | Free | In/Out | In |
| 363 | In/Out | Free | In | In | In |
| 364 | In/Out | Free | In | Out | In |
| 365 | In/Out | Free | In | Free | In |
| 366 | In/Out | Free | In | In/Out | In |
| 367 | In/Out | Free | Out | In | In |
| 368 | In/Out | Free | Out | In/Out | In |
| 369 | In/Out | Free | Free | In | In |
| 370 | In/Out | Free | Free | In/Out | In |
| 371 | In | Out | Out | Out | In |
| 372 | In | Out | Out | Free | In |
| 373 | In | Out | Free | Out | In |
| 374 | In | Out | Free | Free | In |
| 375 | In | Free | Out | Out | In |
| 376 | In | Free | Out | Free | In |
| 377 | In | Free | Free | Out | In |
| 378 | Out | In | Out | Out | In |
| 379 | Out | In | Out | Free | In |
| 380 | Out | In | Free | Out | In |
| 381 | Out | In | Free | Free | In |
| 382 | Out | Out | Out | In | In |
| 383 | Out | Out | Free | In | In |
| 384 | Out | Out | Free | In/Out | In |
| 385 | Out | Out | In | Out | In |
| 386 | Out | Out | In | Free | In |
| 387 | Out | Free | In | Out | In |
| 388 | Out | Free | In | Free | In |
| 389 | Out | Free | Out | In | In |
| 390 | Out | Free | Out | In/Out | In |
| 391 | Free | In | Out | Out | In |
| 392 | Free | In | Out | Free | In |
| 393 | Free | In | Free | Out | In |
| 394 | Free | Out | In | Out | In |
| 395 | Free | Out | In | Free | In |
| 396 | Free | Out | Out | In | In |
| 397 | Free | Out | Out | In/Out | In |
| 398 | Free | Out | Free | In | In |
| 399 | Free | Out | Free | In/Out | In |
| 400 | Free | Free | In | Out | In |
| 401 | Free | Free | Out | In | In |
| 402 | Free | Free | Out | In/Out | In |
| 403 | In/Out | Out | Out | Out | In |
| 404 | In/Out | Out | Out | Free | In |
| 405 | In/Out | Out | Free | Out | In |
| 406 | In/Out | Out | Free | Free | In |
| 407 | In/Out | Free | Out | Out | In |
| 408 | In/Out | Free | Out | Free | In |
| 409 | In/Out | Free | Free | Out | In |
| 410 | In/Out | Free | Free | Free | In |

What is claimed is:

1. An electromotive device comprising:

a plurality of power adjusters arranged angularly about an axis, each power adjuster rotatable about a tiltable axle having a first end and a second end;

a cage having a first disc and a second disc, wherein the first and second discs are positioned relative to one another on opposite sides of the plurality of power adjusters, each of the first disc and the second disc having a plurality of slots, each slot being adapted for the first end of the axle or the second end of the axle;

a plurality of electrical coils coupled to the cage;

a rotatable hub shell; and a plurality of magnets coupled to the rotatable hub shell.

2. The electromotive device of claim 1, further comprising a first disc and a second disc in contact with the plurality of power adjusters.

3. The electromotive device of claim 2, further comprising an idler in contact with the plurality of power adjusters and positioned radially inward of the plurality of power adjusters.

4. The electromotive device of claim 1, wherein the cage is non-rotatable.

5. The electromotive device of claim 1, wherein the plurality of electrical coils and the plurality of magnets are positioned radially around and concentric with the axis.

6. The electromotive device of claim 1, wherein the plurality of electrical coils and the plurality of magnets are positioned on planes that are substantially perpendicular to the axis.

7. The electromotive device of claim 1, wherein the cage comprises a slotted stator having a wire route.

8. The electromotive device of claim 1, further comprising a hollow axle having an axle wire slot.

9. The electromotive device of claim 1, wherein the hub shell comprises a disc internal to the hub shell, the disc adapted to contact the plurality of power adjusters.

10. The electromotive device of claim 1, wherein the plurality of magnets and the hub shell are formed as one integral part.

11. The electromotive device of claim 1, further comprising an idler shaft and stator mount assembly.

12. The electromotive device of claim 11, wherein the idler shaft comprises:

a first bore adapted to receive at least one electrical conductor;

a second bore adapted to house an electrical receptacle that couples to the at least one electrical conductor;

at least one slot, in communication with the first bore, that allows passage of the at least one electrical conductor to an external side of the idler shaft; and a first plurality of axial grooves adapted to receive a plurality of bearings.

13. A system, comprising:

an input shaft for receiving power;

an electromotive device comprising a plurality of power adjusters arranged angularly about an axis, each power adjuster rotatable about a tiltable axle having a first end and a second end, a cage having a first disc and a second disc, wherein the first and second discs are positioned relative to one another on opposite sides of the plurality of power adjusters, each of the first disc and the second disc having a plurality of slots, each slot being adapted for the first end of the axle or the second end of the axle, a plurality of electrical coils coupled to the cage, a rotatable hub shell, and a plurality of magnets coupled to the rotatable hub shell; and an output shaft for transferring power.

14. The system of claim 13, wherein the input shaft is coupled to an internal combustion engine.

15. The system of claim 14, wherein the system comprises a drive train.

* * * * *